United States Patent
Shirai

(10) Patent No.: US 6,169,615 B1
(45) Date of Patent: Jan. 2, 2001

(54) WAVELENGTH DIVISION MULTIPLEX OPTICAL TRANSMISSION APPARATUS

(75) Inventor: Katsuhiro Shirai, Kawasaki (JP)

(73) Assignee: Fujitsu Limited, Kanagawa (JP)

(*) Notice: Under 35 U.S.C. 154(b), the term of this patent shall be extended for 0 days.

(21) Appl. No.: 09/042,419

(22) Filed: Mar. 13, 1998

(30) Foreign Application Priority Data

Oct. 20, 1997 (JP) .................................................. 9-287487

(51) Int. Cl.[7] .................................................. H04J 14/02
(52) U.S. Cl. .................. 359/124; 359/133; 359/134; 359/177; 359/341; 359/110
(58) Field of Search .................................. 359/124, 133, 359/134, 110, 177, 341

(56) References Cited

U.S. PATENT DOCUMENTS

| | | | | |
|---|---|---|---|---|
| 5,225,922 | * | 7/1993 | Chraplyvy et al. | 359/124 |
| 5,598,491 | * | 1/1997 | Ohya et al. | 385/24 |
| 5,764,404 | * | 6/1998 | Yamane et al. | 359/341 |
| 5,812,307 | * | 9/1998 | Naganuma | 359/341 |
| 5,812,710 | * | 9/1998 | Sugaya | 385/27 |
| 5,835,259 | * | 11/1998 | Kakui et al. | 359/341 |
| 5,850,302 | * | 12/1998 | Strasser et al. | 359/127 |
| 5,859,725 | * | 1/1999 | Sugiya et al. | 359/341 |
| 5,861,974 | * | 1/1999 | Shirai | 359/341 |
| 5,864,423 | * | 1/1999 | Kosaka | 359/341 |
| 5,900,969 | * | 5/1999 | Srivastava et al. | 359/341 |
| 5,907,420 | * | 5/1999 | Chraplyvy et al. | 359/179 |
| 5,986,800 | * | 11/1999 | Kosaka | 359/341 |
| 5,995,259 | * | 12/1999 | Meli et al. | 359/341 |

FOREIGN PATENT DOCUMENTS

| | | |
|---|---|---|
| 58-85588 | 5/1983 | (JP) . |
| 7202306 | 8/1995 | (JP) . |
| 8149084 | 6/1996 | (JP) . |
| 8265299 | 10/1996 | (JP) . |

* cited by examiner

Primary Examiner—Leslie Pascal
Assistant Examiner—Hanh Phan
(74) Attorney, Agent, or Firm—Helfgott & Karas, P.C.

(57) ABSTRACT

The present invention relates to a wavelength division multiplex optical transmission apparatus including an optical sending system having at least a plurality of optical sending sections to generate and transmit optical signals having different wavelengths [hereinafter referred to as optical signals], a plurality of optical amplifying sections to amplify the optical signals, and a wavelength division multiplexing section to process by wavelength division multiplexing the optical signals after optical amplification. An optical output level control section is mounted in the apparatus to control, for the wavelengths, optical output levels of the optical signals output to the optical transmission line through the wavelength division multiplexing section by individually varying amplification factors of the optical amplifying sections in the optical sending system. It is thereby possible to adjust, for the wavelengths, send optical output levels of the optical signals having the plurality of different wavelengths, to be transmitted after the wavelength division multiplexing so as to transmit, for the wavelengths, the optical signals at optimal optical output levels.

40 Claims, 48 Drawing Sheets

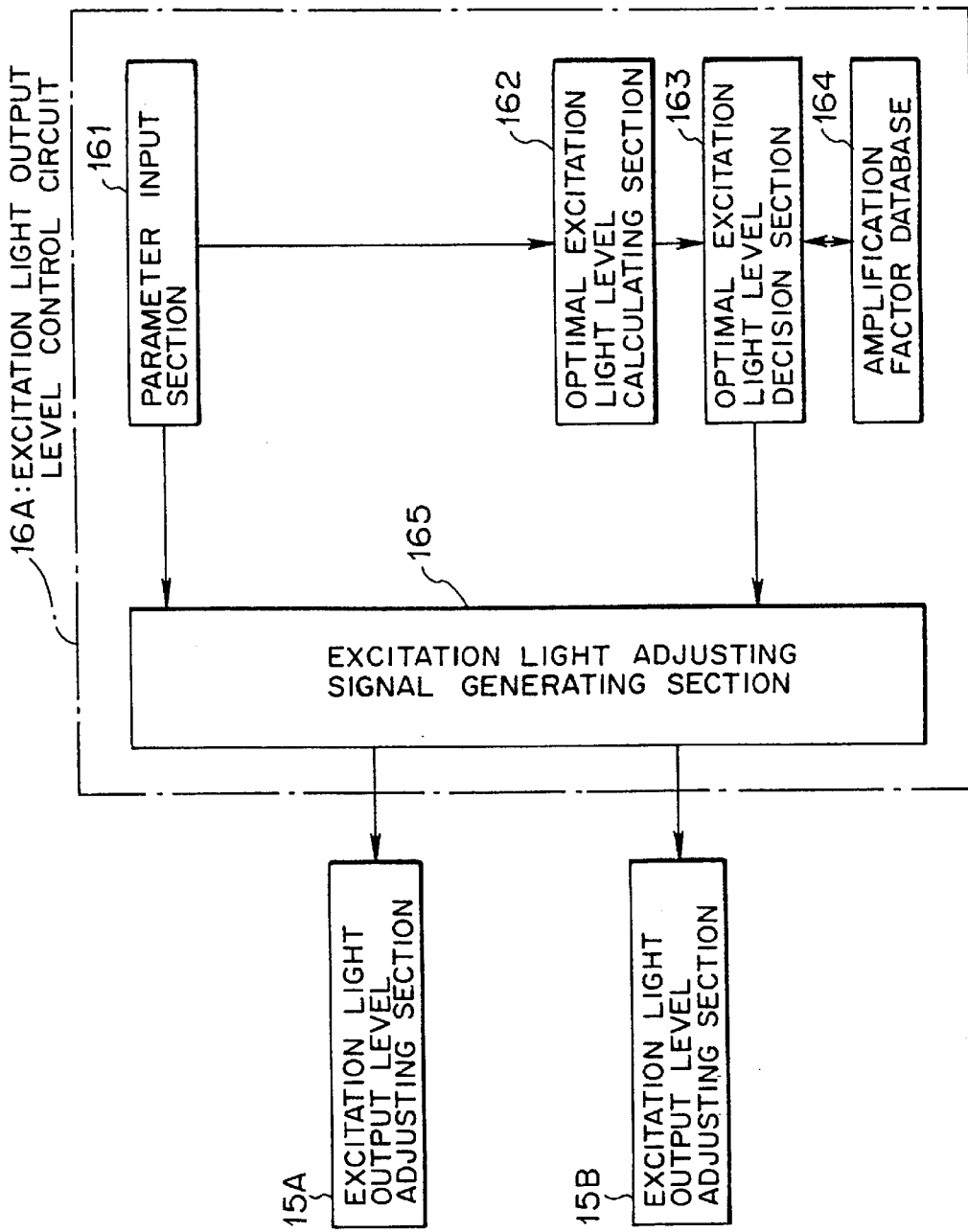

| λ1 SEND OPTICAL LEVEL | EXCITATION LIGHT LEVEL FOR λ1 | λ1 OPTICAL LEVEL AFTER AMPLIFICATION |
|---|---|---|
| 1dBm | 1dBm | 5dBm |
| 1dBm | 2dBm | 7dBm |
| . | . | . |
| . | . | . |
| 1dBm | 20dBm | 50dBm |
| 2dBm | 1dBm | 7dBm |
| 2dBm | 2dBm | 9dBm |
| . | . | . |
| . | . | . |
| 2dBm | 20dBm | 60dBm |
| . | . | . |
| . | . | . |

○: INPUT SIGNAL POWER -27dBm
□: INPUT SIGNAL POWER -8dBm
△: INPUT SIGNAL POWER -4dBm

WAVELENGTH DIVISION MULTIPLEX OPTICAL TRANSMISSION APPARATUS

BACKGROUND OF THE INVENTION (1) Field of the Invention

The present invention relates to a wavelength division multiplex optical transmission apparatus in which a plurality of optical signals having different wavelengths are processed by wavelength division multiplexing, and are transmitted to an optical transmission line.

(2) Description of the Related Art

In the optical transmission technical field, an attempt has conventionally been made to process by wavelength division multiplexing (WDM) and transmit a plurality of optical signals having different wavelengths $\lambda 1$ to $\lambda n$ (where n: natural number more than or equal to 2) corresponding to the number of channels, thereby making an effective use of a band in one optical transmission line (optical fiber). In particular, in recent years, as the number of channels for the optical transmission has been increased, the WDM technique has become greatly important. Thus, active research and development have progressed on various types of WDM units (wavelength division multiplex optical transmission apparatuses).

Under the current circumstances, among the various types of WDM units described above, the most dominant type is a WDM unit in which, for example, a WDM coupler is used to process by the wavelength division multiplexing the plurality of optical signals having the different wavelengths $\lambda 1$ to $\lambda n$, and a concurrent optical amplification is subsequently made to the optical signals with the wavelengths $\lambda 1$ to $\lambda n$ to desired optical signal levels so as to output the optical signals to the optical transmission line, thereby transmitting all the optical signals with the wavelengths $\lambda 1$ to $\lambda n$ to an opposite side.

However, in such a wavelength division multiplex optical transmission apparatus, the concurrent optical amplification is made though distances for which the optical signals with the wavelengths $\lambda 1$ to $\lambda n$ can be transmitted may be varied for the wavelengths $\lambda 1$ to $\lambda n$ depending upon states (such as loss) of the optical transmission line. Hence, according to another optical signal with a wavelength providing a short transmission distance, a higher optical output level must be provided for an optical signal with the wavelength which can ensure a sufficiently long transmission distance even at a low send optical output level. Therefore, an increase in power consumption of the transmission apparatus results in a significantly high transmission cost.

Further, in general, the optical signal is amplified by using an optical amplification fiber such as erbium-doped fiber, and launching, together with a transmit optical signal, an excitation optical signal having desired power into the optical amplification fiber. For example, as shown in FIG. 48, there is a complicated correlation between an amplification factor (signal net gain) and incident excitation light power at a time of optical amplification. Thus, under the present circumstances, it is substantially impossible to adjust the optical output level of the optical signal after the optical amplification according to the transmission distance of each of the wavelengths $\lambda 1$ to $\lambda n$.

That is, when only the send optical output level is varied, the variation causes a variation in optical amplification factor, thereby varying the optical output level after the optical amplification. Consequently, the optical signals with the wavelengths $\lambda 1$ to $\lambda n$ cannot have optical output levels suitable for the transmission distances of the wavelengths $\lambda 1$ to $\lambda n$. Accordingly, it is impossible to employ a simple method of adjusting the optical output level after the amplification by using an optical attenuator or the like.

SUMMARY OF THE INVENTION

In view of the foregoing problems, it is an object of the present invention to provide a wavelength division multiplex optical transmission apparatus in which it is possible to adjust, for wavelengths, send optical output levels of optical signals having a plurality of different wavelengths, to be transmitted after wavelength division multiplexing so as to transmit, for the wavelengths, the optical signals at optimal optical output levels.

According to the present invention, for achieving the above-mentioned object, there is provided a wavelength division multiplex optical transmission apparatus in which a plurality of optical signals having different wavelengths are processed by wavelength division multiplexing, and are transmitted through an optical transmission line. The apparatus includes an optical sending system having a plurality of optical sending sections to generate and transmit the optical signals having the different wavelengths, a plurality of optical amplifying sections to amplify the optical signals with the wavelengths from the optical sending sections, and a wavelength division multiplexing section to process by the wavelength division multiplexing and output to the optical transmission line the optical signals amplified in the optical amplifying sections, and an optical receiving system having a wavelength division demultiplexing section to demultiplex the wavelength division multiplexed optical signals transmitted through the optical transmission line into the optical signals with the wavelengths, and a plurality of optical receiving sections to receive the optical signals demultiplexed in the wavelength division demultiplexing section. Concurrently, an optical output level control section is mounted to control, for the wavelengths, optical output levels of the optical signals output to the optical transmission line through the wavelength division multiplexing section by individually varying amplification factors of the optical amplifying sections in the optical sending system.

Further, there is provided a wavelength division multiplex optical transmission apparatus in which a plurality of optical signals having different wavelengths are processed by wavelength division multiplexing, and are transmitted through an optical transmission line. The apparatus includes an optical sending system having a plurality of optical sending sections to generate and transmit the optical signals having the different wavelengths, and a wavelength division multiplexing section to process by the wavelength division multiplexing and output to the optical transmission line the optical signals with the wavelengths from the optical sending sections. Concurrently, an optical output level adjusting section is mounted to control, for the wavelengths, optical output levels of the optical signals with the wavelengths, sent to the optical transmission line before the wavelength division multiplexing by the wavelength division multiplexing section in the optical sending system.

Here, the optical output level adjusting section may include a plurality of optical amplifying sections interposed between the optical sending sections and the wavelength division multiplexing section to amplify the optical signals with the wavelengths from the optical sending sections, and an optical output level control section to control, for the wavelengths, optical output levels of the optical signals output to the optical transmission line through the wavelength division multiplexing section by individually varying amplification factors in the optical amplifying sections.

Thus, according the wavelength division multiplex optical transmission apparatus of the present invention, the optical output level control section controls, for the wavelengths, the optical output levels of the optical signals to the optical transmission line (that is, adjusts, for the wavelengths, the optical output levels of the optical signals with the wavelengths before the wavelength division multiplexing) by individually varying the amplification factors in the plurality of optical amplifying sections to respectively amplify the optical signals with the plurality of wavelengths, to be transmitted after the wavelength division multiplexing in the optical sending system. Therefore, it is possible to transmit the respective optical signals at the optical output levels most suitable for the optical signals with consideration given to characteristics inherent in the optical signals with the wavelengths. Thereby, the respective optical signals can always be sent at the minimum optical output levels. As a result, it is possible to significantly reduce power consumption at a time of optical transmission, and realize the optical transmission at a lower cost as compared with the case where the optical signals with the wavelengths are concurrently amplified after the wavelength division multiplexing.

Further, the optical output level control section may include a plurality of excitation light sources to generate excitation light signals for varying the amplification factors in the optical amplifying sections, a plurality of excitation light output level adjusting sections which can adjust optical output levels of the excitation light signals generated in the excitation light sources, and an excitation light output level operation control section to find optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals.

Consequently, the optical signals with the wavelengths can always be sent at the optimal optical output levels according to the transmission distances of the respective wavelengths. Thus, unlike the prior art, it is unnecessary to provide higher optical output levels of the optical signals with all the wavelengths to an optical signal with a wavelength providing a short transmission distance for concurrent amplification of the optical signals with the respective wavelengths. The optical signals can be sent at the minimum optical output levels required for a predetermined optical transmission distance.

Further, the excitation light output level operation control section may include a parameter input section to take as inputs predetermined parameter information about the optical transmission line, containing at least information about the transmission distances of the optical signals with the wavelengths, to be output to the optical transmission line, an optimal optical output level operation section to find by predetermined arithmetic operations optimal optical output levels of the optical signals according to the transmission distances of the optical signals with the wavelengths depending upon the parameter information input through the parameter input section, and an excitation light adjusting signal generating section to generate excitation light adjusting signals for adjusting the optical output levels of the excitation light signals depending upon the optimal optical output levels obtained by the optimal optical output level operation section.

Thereby, in the excitation light output level operation control section, simply by, for example, inputting the predetermined parameter information about the optical transmission line, the optical output levels most suitable for the optical signals with the respective wavelengths are automatically calculated to generate the excitation light adjusting signals for adjusting the optical output levels of the excitation light signals (the type finding the optimal optical output level depending upon the parameter information will hereinafter be referred to as "parameter information type") Consequently, it is possible to significantly easily and accurately adjust the optical output levels of the optical signals with the wavelengths.

Further, the optical output level control section may include a plurality of excitation light sources to generate excitation light signals for varying the amplification factors in the optical amplifying sections, a plurality of excitation light output level adjusting sections which can adjust optical output levels of the excitation light signals generated in the excitation light sources, an excitation light output level operation control section to find by arithmetic operations optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals, and a plurality of input signal light receiving sections to respectively receive the optical signals with the wavelengths, input through the optical transmission line and demultiplexed in the wavelength division demultiplexing section. Concurrently, the excitation light output level operation control section may include a transmission loss operation section to find by predetermined arithmetic operations transmission loss information of the optical signals actually transmitted through the optical transmission line for a predetermined transmission distance depending upon the optical signals with the wavelengths, received in the input signal light receiving sections, an optimal optical output level operation section to find by predetermined arithmetic operations optimal optical output levels of the optical signals with the wavelengths depending upon the transmission loss information obtained in the transmission loss operation section, and an excitation light adjusting signal generating section to generate excitation light adjusting signals for adjusting the optical output levels of the excitation light signals depending upon the optimal excitation light levels obtained in the optimal optical output level operation section.

Thereby, in the excitation light output level operation control section, the optimal optical output levels of the optical signals with the respective wavelengths are respectively found by the predetermined arithmetic operations depending upon the transmission loss information of the optical signals with the respective wavelengths, actually transmitted through the optical transmission line for the predetermined transmission distance. Further, it is possible to generate the excitation light adjusting signals for adjusting the optical output levels of the excitation light signals depending upon the obtained optimal optical output levels (the type finding the optimal optical output level depending upon the transmission loss information will hereinafter be referred to as "transmission loss type"). Consequently, it is possible to adjust the optical output levels of the optical signals with the respective wavelengths with consideration given to an actual state (loss) of the optical transmission line. Besides, it is possible to more accurately adjust to the optimal values the optical output levels of the optical signals with the respective wavelengths.

Further, the optical output level control section may include a plurality of excitation light sources to generate excitation light signals for varying the amplification factors in the optical amplifying sections, a plurality of excitation light output level adjusting sections which can adjust optical output levels of the excitation light signals generated in the excitation light sources, an excitation light output level operation control section to find by arithmetic operations optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals, a plurality of input signal light receiving sections to receive the optical signals with the wavelengths, input through the optical transmission line and demultiplexed in the wavelength division demultiplexing section, and a plurality of output signal light receiving sections to respectively receive parts of the optical signals with the wavelengths, to be output to the optical transmission line through the wavelength division multiplexing section after amplification in the optical amplifying sections. Concurrently, the excitation light output level operation control section may include a transmission loss operation section to find by predetermined arithmetic operations transmission loss information of the optical signals actually transmitted through the optical transmission line for a predetermined transmission distance depending upon the optical signals with the wavelengths, received in the input signal light receiving sections, an optimal optical output level operation section to find by predetermined arithmetic operations optimal optical output levels of the optical signals with the wavelengths depending upon the transmission loss information obtained in the transmission loss operation section, an excitation light adjusting signal generating section to generate excitation light adjusting signals for the excitation light output level adjusting sections depending upon the optimal excitation light levels obtained in the optimal optical output level operation section, a level comparing section to compare the optimal optical output levels with optical signal levels of the optical signals received in the output signal light receiving sections, and a level error correcting section to correct, if errors are caused between the respective levels as a result of comparison in the level comparing section, generation processing for the excitation light adjusting signals so as to minimize the errors.

Thereby, in the "transmission loss information type" of excitation light output level operation control section, if the errors are caused between the optimal optical output levels P found by the arithmetic operations and the actual optical output levels, adjustments of the excitation light levels can be corrected so as to set the errors to zeros (hereinafter referred to as "correcting function"). Consequently, even when the optical output levels of the optical signals with the wavelengths are varied due to the characteristics of the optical amplifiers, disturbance, and so forth, it is possible to continuously stabilize the optical output levels of the respective wavelengths at the optimal levels while following the variations, resulting in significantly enhanced performance of the transmission apparatus.

Further, the optical output level control section may include a plurality of excitation light sources to generate excitation light signals for varying the amplification factors in the optical amplifying sections, a plurality of excitation light output level adjusting sections which can adjust optical output levels of the excitation light signals generated in the excitation light sources, an excitation light output level operation control section to find by arithmetic operations optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals, and excitation light signal receiving sections which can receive the excitation light signals returning from the optical transmission line through the wavelength division demultiplexing section when the optical transmission line is in a disconnection state. Concurrently, the optical sending system may be provided to output both the optical signals from the optical amplifying sections and the excitation light signals from the excitation light sources to the optical transmission line through the wavelength division multiplexing section. Additionally, the excitation light output level operation control section may include a parameter input section to take as inputs predetermined parameter information about the optical transmission line, containing at least information about the transmission distances of the optical signals with the wavelengths, to be output to the optical transmission line, an optimal optical output level operation section to find by predetermined arithmetic operations optimal optical output levels of the optical signals according to the transmission distances of the optical signals with the wavelengths, generated in the optical sending sections depending upon the parameter information input through the parameter input section, an excitation light adjusting signal generating section to generate excitation light adjusting signals for adjusting the optical output levels of the excitation light signals depending upon the optimal optical output levels obtained by the optimal optical output level operation section, an excitation light adjusting signal generating section to generate excitation light adjusting signals for adjusting the optical output levels of the excitation light signals depending upon the optimal optical output levels obtained by the optimal optical output level operation section, an excitation light reception decision section to decide whether or not the excitation light signals have been received in the excitation light signal receiving sections, a disconnection state control section to decide that the optical transmission line is in the disconnection state when it is decided in the excitation light reception decision section that the excitation light signals have been received, and control generation processing for the excitation light adjusting signals so as to set the optical output levels of the excitation light signals to zeros, and an alarm generating section to give an alarm indicating that the optical transmission line is in the disconnection state when it is decided in the excitation light reception decision section that the excitation light signals have been received.

Thereby, when the excitation light signals used to amplify the optical signals with the wavelengths are sent to the optical transmission line together with the optical signals with the respective wavelengths, and return through the optical transmission line, the "parameter information type" of excitation light output level operation control section decides that the optical transmission line is in the disconnection state, and can set the optical output levels of the excitation light signals to zeros and can give the alarm (hereinafter referred to as optical transmission line disconnection state detecting function). Consequently, it is possible to reduce unnecessary output of the excitation light signals so as to reduce power consumption when the optical transmission line is in the disconnection state. Concurrently, it is possible to more surely post the disconnection state of the optical transmission line to the outside. Further, it is possible to realize the optical transmission line disconnection state detecting function at a lower cost since the disconnection state of the optical transmission line is detected by using detection (receive) of return optical signals of the excitation light signals.

Further, the optical output level control section may include a plurality of excitation light sources to generate excitation light signals for varying the amplification factors in the optical amplifying sections, a plurality of excitation light output level adjusting sections which can adjust optical output levels of the excitation light signals generated in the excitation light sources, an excitation light output level operation control section to find by arithmetic operations optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals, a plurality of input signal light receiving sections to respectively receive the optical signals with the wavelengths, input through the optical transmission line and demultiplexed in the wavelength division demultiplexing section, and excitation light signal receiving sections which can receive the excitation light signals returning from the optical transmission line through the wavelength division demultiplexing section when the optical transmission line is in a disconnection state. Concurrently, the optical sending system may be provided to output both the optical signals from the optical amplifying sections and the excitation light signals from the excitation light sources to the optical transmission line through the wavelength division multiplexing section. Additionally, the excitation light output level operation control section may include a transmission loss operation section to find by predetermined arithmetic operations transmission loss information of the optical signals actually transmitted through the optical transmission line for a predetermined transmission distance depending upon the optical signals with the wavelengths, received in the input signal light receiving sections, an optimal optical output level operation section to find by predetermined arithmetic operations optimal optical output levels of the optical signals with the wavelengths depending upon the transmission loss information obtained by the transmission loss operation section, an excitation light adjusting signal generating section to generate excitation light adjusting signals for the excitation light output level adjusting sections depending upon the optimal excitation light levels obtained in the optimal optical output level operation section, an excitation light reception decision section to decide whether or not the excitation light signals have been received in the excitation light signal receiving sections, a disconnection state control section to decide that the optical transmission line is in the disconnection state when it is decided in the excitation light reception decision section that the excitation light signals have been received, and control generation processing for the excitation light adjusting signals so as to set the optical output levels of the excitation light signals to zeros, and an alarm generating section to give an alarm indicating that the optical transmission line is in the disconnection state when it is decided in the excitation light reception decision section that the excitation light signals have been received.

Thereby, the "transmission loss information type" of excitation light output level operation control section may have the "optical transmission line disconnection state detecting function" as in the "parameter information type" of that. It is thereby possible to reduce power consumption when the optical transmission line is in the disconnection state, and more surely post the disconnection state of the optical transmission line to the outside. Further, in this case, it is also possible to realize the optical transmission line disconnection state detecting function at a lower cost since the disconnection state of the optical transmission line is detected by using detection (receive) of the return optical signals of the excitation light signals.

Further, the optical output level control section may include a plurality of excitation light sources to generate excitation light signals for varying the amplification factors in the optical amplifying sections, a plurality of excitation light output level adjusting sections which can adjust optical output levels of the excitation light signals generated in the excitation light sources, an excitation light output level operation control section to find by arithmetic operations optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals, a plurality of input signal light receiving sections to respectively receive the optical signals with the wavelengths, input through the optical transmission line and demultiplexed in the wavelength division demultiplexing section, a plurality of output signal light receiving sections to respectively receive parts of the optical signals with the wavelengths, to be output to the optical transmission line through the wavelength division multiplexing section after amplification in the optical amplifying sections, excitation light signal receiving sections which can receive the excitation light signals returning from the optical transmission line through the wavelength division demultiplexing section when the optical transmission line is in a disconnection state. Concurrently, the optical sending system may be provided to output both the optical signals from the optical amplifying sections and the excitation light signals from the excitation light sources to the optical transmission line through the wavelength division multiplexing section. Additionally, the excitation light output level operation control section may include a transmission loss operation section to find by predetermined arithmetic operations transmission loss information of the optical signals actually transmitted through the optical transmission line for a predetermined transmission distance depending upon the optical signals with the wavelengths, received in the input signal light receiving sections, an optimal optical output level operation section to find by predetermined arithmetic operations optimal optical output levels of the optical signals with the wavelengths depending upon the transmission loss information obtained in the transmission loss operation section, an excitation light adjusting signal generating section to generate excitation light adjusting signals for the excitation light output level adjusting sections depending upon the optimal excitation light output levels obtained in the optimal optical output level operation section, a level comparing section to compare the optimal optical output levels with optical signal levels of the optical signals received in the output signal light receiving sections, a level error correcting section to correct, if errors are caused between the levels as a result of comparison in the level comparing section, generation processing for the excitation light adjusting signals so as to minimize the errors, an excitation light reception decision section to decide whether or not the excitation light signals have been received in the excitation light signal receiving sections, a disconnection state control section to decide that the optical transmission line is in the disconnection state when it is decided in the excitation light reception decision section that the excitation light signals have been received, and control generation processing for the excitation light adjusting signals so as to set the optical output levels of the excitation light signals to zeros, and an alarm generating section to give an alarm indicating that the optical transmission line is in the disconnection state when it is decided in the excitation light reception decision section that the excitation light signals have been received.

That is, the "transmission loss information type" of excitation light output level operation control section includes the "correcting function," and the "optical transmission line disconnection state detecting function." Consequently, it is possible to continuously stabilize the optical output levels of the respective wavelengths at the optimal levels while following the variations in optical output levels, while reducing power consumption when the optical transmission line is in the disconnection state, and posting the disconnection state of the optical transmission line to the outside.

Further, the excitation light output level adjusting sections may each include a polarization section which can vary a polarization factor of the excitation optical signal from the excitation light source, and can adjust the polarization factor of the excitation optical signal by varying polarization factor of the polarization section. In this case, the excitation light adjusting signal generating section of the excitation light output level operation control section is provided to generate polarization factor adjusting signals for adjusting the polarization factors of the polarization sections as the excitation light adjusting signals for the excitation light output level adjusting sections.

Thereby, the excitation light output level adjusting section may generate, as the excitation light adjusting signals for the excitation light output level adjusting sections, the polarization factor adjusting signals for adjusting the polarization factors of the polariscopes. Consequently, it is possible to adjust the optical output levels of the excitation light signals at a very high speed.

Further, the excitation light output level adjusting sections may each include a lens which can vary a refractive index of the excitation light signal according to an incident position of the excitation light signal from the excitation light source, and can vary the incident position of the excitation light signal on the lens to vary the refractive index of the excitation light signal so as to vary the optical output level of the excitation light signal. In this case, the excitation light adjusting signal generating section of the excitation light output level operation control section may be provided to generate lens incident position adjusting signals for adjusting the incident positions of the excitation light signals on the lenses as the excitation light adjusting signals for the excitation light output level adjusting sections.

Thereby, the excitation light output level adjusting section can vary in an analog manner the refractive indexes of the excitation light signals on the lenses by varying the incident positions of the excitation light signals. Consequently, it is possible to more precisely adjust the optical output levels of the excitation light signals.

Further, the excitation light output level adjusting sections may each include a liquid crystal section which can vary a transmission factor of the excitation light signal from the excitation light source according to an applied voltage, and can vary the applied voltage to the liquid crystal section so as to vary the optical output level of the excitation light signal. In this case, the excitation light adjusting signal generating section of the excitation light output level operation control section is provided to generate applied voltage adjusting signals for adjusting the applied voltages to the liquid crystal sections as the excitation light adjusting signals for the excitation light output level adjusting sections.

Thereby, the excitation light output level adjusting sections can vary in an analog manner the transmission factors of the liquid crystal sections by varying the applied voltages to the liquid crystal sections. Consequently, it is possible to more precisely adjust the optical output levels of the excitation light signals in a simpler configuration.

Further, the excitation light output level adjusting sections may each include bias circuit which can vary level of the excitation light signal generated in the excitation light source according to amounts of fed bias current, and can vary the amounts of bias current to the bias circuit so as to vary the optical output level of the excitation light signal. In this case, the excitation light adjusting signal generating section of the excitation light output level operation control section is provided to generate bias current adjusting signals for adjusting the amounts of bias currents to the bias circuits as the excitation light adjusting signals for the excitation light output level adjusting sections.

Thereby, the excitation light output level adjusting sections can vary the amounts of currents from the bias circuits to the excitation light sources by varying the amounts of bias currents to the bias circuits. Consequently, it is possible to directly adjust the optical output levels of the excitation light signals, and more accurately adjust the optical output levels of the excitation light signals.

BRIEF DESCRIPTION OF THE DRAWINGS

FIG. 3 is a block diagram showing a configuration of an excitation light output level control circuit in the first embodiment;

FIG. 5 is a diagram showing one illustrative amplification factor correspondence table in the first embodiment;

DESCRIPTION OF THE PREFERRED EMBODIMENTS

A description will now be given of embodiments of the present invention referring to the accompanying drawings.

(A) Description of First Embodiment

Figure 1:
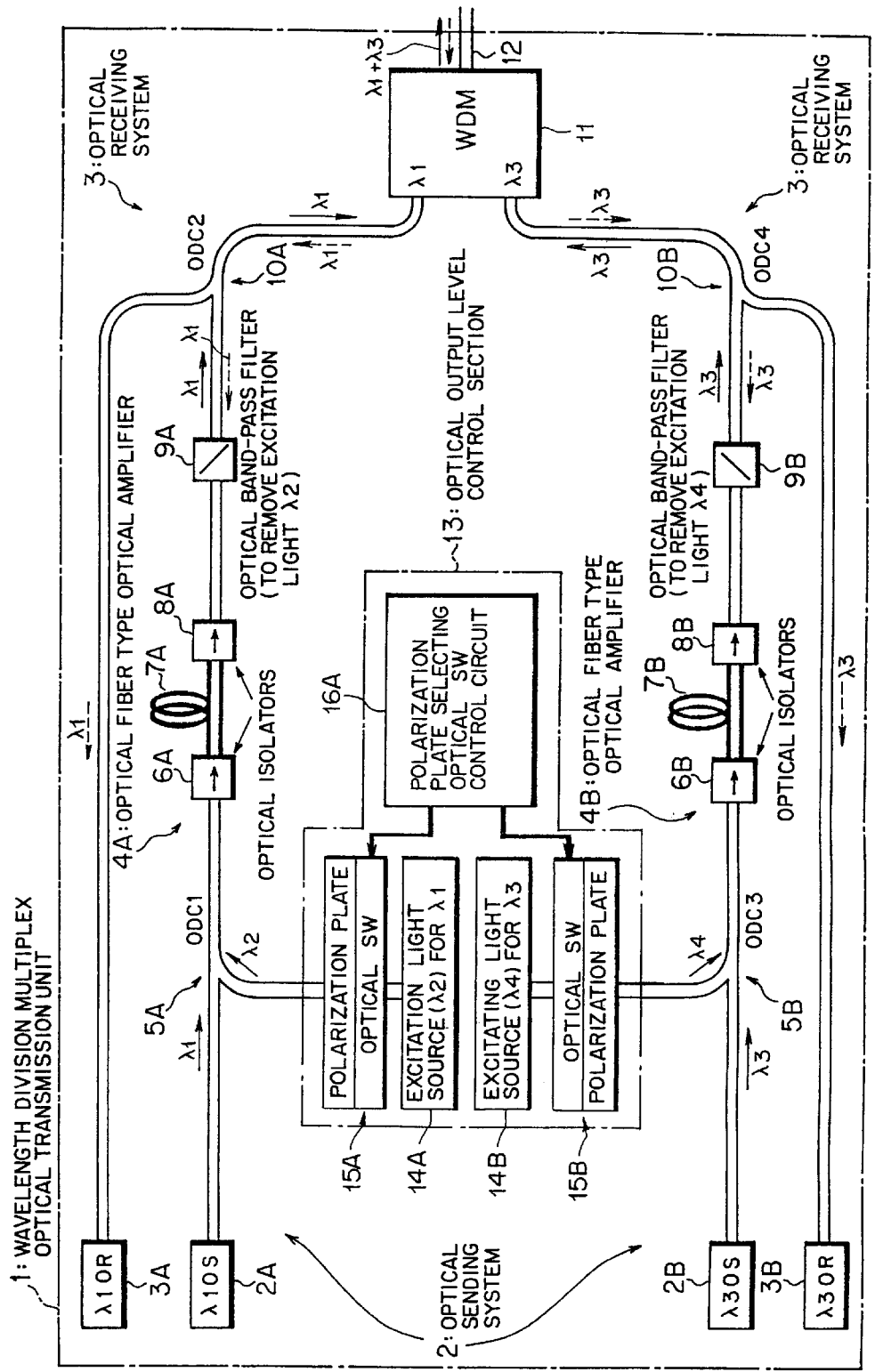
FIG. 1 is a block diagram showing a configuration of a wavelength division multiplex optical transmission apparatus according to the first embodiment of the present invention.

FIG. 1 is a block diagram showing a configuration of a wavelength division multiplex optical transmission apparatus according to the first embodiment of the present invention. A wavelength division multiplex optical transmission apparatus 1 of the embodiment shown in FIG. 1 mainly includes, as an optical sending system 2, optical sending sections (OSs) 2A, 2B, optical fiber type optical amplifies 4A, 4B, and a WDM (Wavelength Division Multiplex) coupler 11, while mainly including, as an optical receiving system 3, optical receiving sections (ORs) 3A, 3B, and optical fiber fusion splice type optical couplers (ODCs) 10A, 10B, and further including an optical output level control section 13.

Here, in the optical sending system 2, the optical sending section 2A generates, by a laser diode (LD) or the like, an optical signal having a wavelength $\lambda 1$ (hereinafter often referred to as send optical signal $\lambda 1$) as an optical signal to be sent, and sends the optical signal. The optical sending section 2B similarly generates, by a LD or the like, an optical signal having a wavelength $\lambda 3$ (hereinafter often referred to as send optical signal $\lambda 3$) different from the wavelength $\lambda 1$ as an optical signal to be sent, and sends the optical signal.

Further, the optical amplifier (optical amplifying section) 4A is interposed between the optical sending section 2A and the WDM coupler 11 to amplify the send optical signal $\lambda 1$ from the optical sending section 2A to a desired optical level. The optical amplifier (optical amplifying section) 4B is interposed between the optical sending section 2B and the WDM coupler 11 to amplify the send optical signal $\lambda 3$ from the optical sending section 2B to a desired optical level.

However, in the embodiment, the optical amplifiers 4A, 4B are respectively configured as an erbium-doped fiber type optical amplifier. As shown in FIG. 1, the optical amplifier 4A includes an optical fiber fusion splice type optical coupler 5A (ODC1), optical isolators 6A, 8A, an optical fiber 7A, and an optical band-pass filter 9A. The optical amplifier 4B includes an optical fiber fusion splice type optical coupler 5B (ODC3), optical isolators 6B, 8B, an optical fiber 7B, and an optical band-pass filter 9B.

Here, in the optical amplifier 4A (4B), the optical coupler 5A (5B) processes by wavelength division multiplexing the send optical signal $\lambda 1$ ($\lambda 3$) from the optical sending section 2A (2B) and an excitation light signal with a wavelength $\lambda 2$ ($\lambda 3$) (hereinafter often referred to as excitation light signal $\lambda 2$ ($\lambda 3$)) generated in an excitation light source 14A (14B) described infra, thereby adding the excitation light signal $\lambda 2$ ($\lambda 4$) to the send optical signal $\lambda 1$ ($\lambda 3$). The optical fiber 7A (7B) amplifies a gain (optical level) of the send optical signal $\lambda 1$ ($\lambda 3$) passing therethrough by the addition of the excitation light signal $\lambda 2$ ($\lambda 4$).

Further, the optical isolators 6A, 8A (6B, 8B) respectively prevent an optical signal [with a wavelength $\lambda 1+\lambda 3$ ($\lambda 2+\lambda 4$)] from the optical coupler 5A (5B) from being reflected off I/O portions of the optical fiber 7A (7B). The optical isolators 6A, 8A (6B, 8B) can minimize occurrence of noise at the optical fiber 7A (7B), and results in efficient amplification of the send optical signal $\lambda 1$ ($\lambda 3$).

Additionally, the optical band-pass filter 9A (9B) removes the excitation light signal $\lambda 2$ ($\lambda 4$) added through the excitation light source 14A (14B) from the optical signal after the optical amplification, thereby outputting only the send optical signal $\lambda 1$ ($\lambda 3$) to an optical transmission line (optical cable) 12 through the WDM coupler 11. Moreover, the optical band-pass filter 9A (9B) also has the function of removing an optical signal with the wavelength $\lambda 1$ ($\lambda 3$) input from a reverse direction, thereby preventing the receive optical signal with the wavelength $\lambda 1$ ($\lambda 3$) demultiplexed in the WDM coupler 11 as will be described infra from being input into the optical fiber 7A (7B).

Besides, the WDM coupler 11 processes by the wavelength division multiplexing and sends to the optical transmission line 12 the send optical signals $\lambda 1$, $\lambda 3$ amplified in the optical amplifiers 4A, 4B, while demultiplexing an optical signal transmitted from an opposite side through the optical transmission line 12 into the optical signals with the wavelengths $\lambda 1$, $\lambda 3$. That is, the optical sending system 2 and the optical receiving system 3 share the WDM coupler 11 of the embodiment having both the function as a wavelength division multiplexing section to process by the wavelength division multiplexing and output to the optical transmission line 12 the respective send optical signals $\lambda 1$, $\lambda 3$ amplified in the optical amplifiers 4A, 4B, and the function as a wavelength division demultiplexing section to demultiplex into the optical signals with the wavelengths $\lambda 1$, $\lambda 3$ the optical signal processed by the wavelength division multiplexing and transmitted from the opposite side through the optical transmission line 12.

On the other hand, in the optical receiving system 3, the optical coupler 10A (10B) causes the receive optical signal $\lambda 1$ ($\lambda 3$) demultiplexed in the WDM coupler 11 to branch to the side of the optical sending section 2A (2B) and the side of the optical receiving section 3A (3B) in two directions. Since the receive optical signal $\lambda 1$ ($\lambda 3$) branching to the optical sending section 2A (2B) is removed in the optical band-pass filter 9A (9B) as described above, the result is that the receive optical signal $\lambda 1$ ($\lambda 3$) branches only to the optical receiving section 3A (3B).

Further, the optical receiving section 3A receives the optical signal with the wavelength $\lambda 1$ from the opposite side, demultiplexed in the WDM coupler 11 to branch at the optical coupler 10A. The optical receiving section 3B receives the optical signal with the wavelength $\lambda 3$ from the opposite side, demultiplexed in the WDM coupler 11 to branch at the optical coupler 10B.

That is, in the wavelength division multiplex optical transmission apparatus 1 of the embodiment, the optical signals with the different wavelengths $\lambda 1$, $\lambda 3$ are processed by the wavelength division multiplexing, and are transmitted through the optical transmission line 12. It is thereby possible to establish bidirectional communication of the optical signals with the wavelengths $\lambda 1$, $\lambda 3$.

Further, the above optical output level control section 13 controls optical output levels of the send optical signals $\lambda 1$, $\lambda 3$ output to the optical transmission line 12 in the optical sending system 2 for the wavelengths $\lambda 1$, $\lambda 3$ before the wavelength division multiplexing in the WDM coupler 11. In the embodiment, individual controls (adjustments) are made to optical levels of the excitation light signals $\lambda 2$, $\lambda 4$ added to the send optical signals $\lambda 1$, $\lambda 3$. It is thereby possible to individually vary amplification factors in the optical amplifiers 4A, 4B so as to adjust optical levels of the send optical signals $\lambda 1$, $\lambda 2$ after the amplification.

Hence, as shown in FIG. 1, the optical output level control section 13 of the embodiment includes the excitation light sources 14A, 14B, excitation light output level adjusting sections 15A, 15B, and an excitation light output level control circuit 16A.

Here, the excitation light source 14A generates the excitation light signal $\lambda 2$ to be added to the send optical signal $\lambda 1$ so as to vary the amplification factor in the optical amplifier 4A, and the excitation light source 14B generates the excitation light signal $\lambda 4$ to be added to the send optical signal $\lambda 3$ so as to vary the amplification factor in the optical amplifier 4B. The excitation light output level adjusting section 15A adjusts the optical output level of the excitation light signal $\lambda 2$ generated in the excitation light source 14A, and the excitation light output level adjusting section 15B adjusts the optical output level of the excitation light signal $\lambda 4$ generated in the excitation light source 14B.

Figure 2:
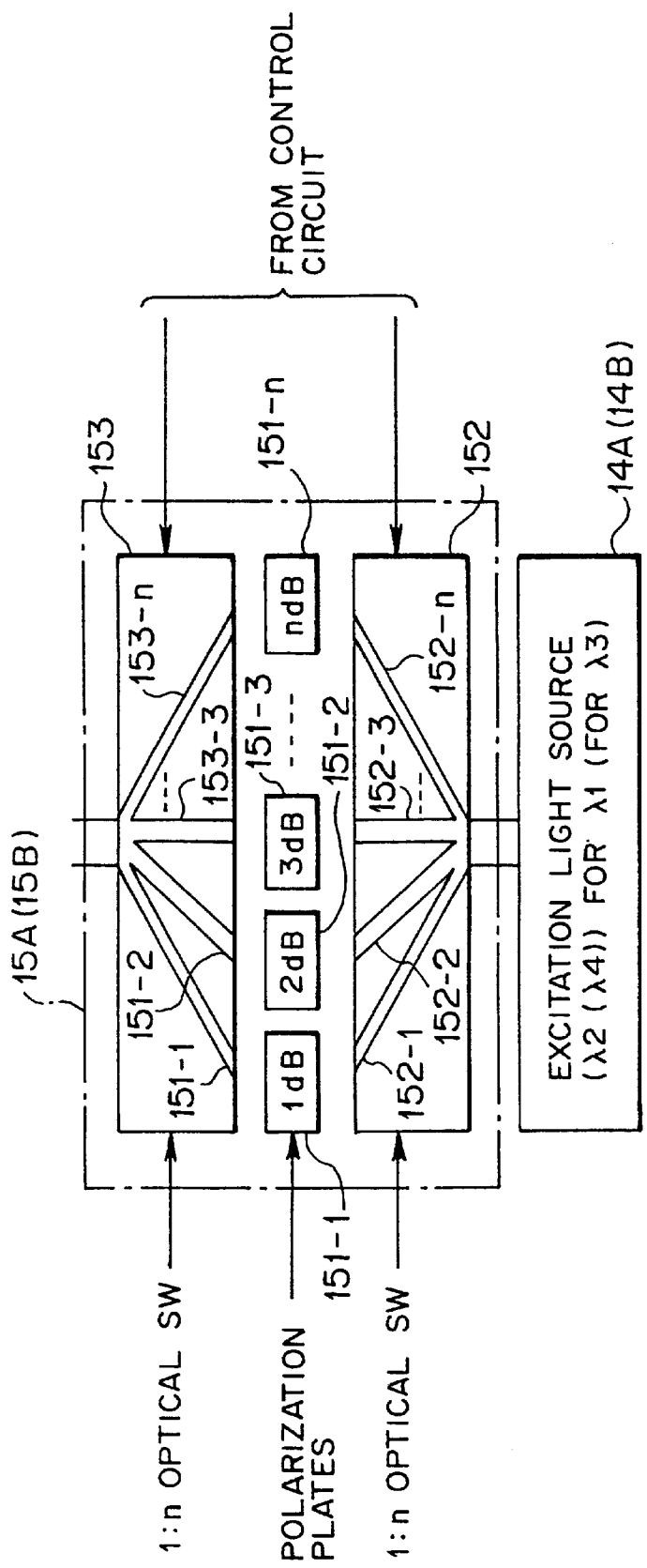
FIG. 2 is a block diagram showing a configuration of an excitation light output level adjusting section in the first embodiment.

However, as shown in, for example, FIG. 2, the excitation light output level adjusting sections 15A, 15B of the embodiment respectively include a plurality of polarization sections 151-1 to 151-n (where n: natural number more than or equal to 2), and polarization plate selecting optical switches (optical SWs) 152, 153 to select the polarization section 151-i (where i: 1 to n) to pass the excitation light signal $\lambda 2$ ($\lambda 4$) therethrough. As will be described infra, an optical output port 152-i of the optical switch 152 and an optical input port 153-i of the optical switch 153 are selected in response to a polarization plate selecting signals fed from the excitation light output level control circuit 16A. It is thereby possible to allow the excitation light signal $\lambda 2$ ($\lambda 4$) to pass through the selected polarization section 151-i so as to adjust the optical level of the excitation light according to polarization factor thereof.

That is, the above excitation light output level adjusting sections 15A, 15B each include polarization section 151-I as a polarization section which can vary polarization factors of the excitation light signals $\lambda 2$, $\lambda 4$ from the excitation light sources 14A, 14B. It is possible to adjust the optical output levels of the excitation light signals $\lambda 2$, $\lambda 4$ by varying the polarization factors of the polarization section. Moreover, though the polarization factors of the excitation light signals $\lambda 2$, $\lambda 4$ are varied by respectively selecting any one of the plurality of polarization sections 151-i having the different polarization factors in the discussion, it is to be noted that any other methods may be employed to vary the polarization factors of the excitation light signals $\lambda 2$, $\lambda 4$.

Further, the excitation light output level control circuit (excitation light output level operation control section) 16A finds optimal optical output levels of the respective send optical signals $\lambda 1$, $\lambda 3$ according to transmission distances (characteristics) of the send optical signals $\lambda 1$, $\lambda 3$ generated in the optical sending sections 2A, 2B, and controls the excitation light output level adjusting sections 15A, 15B (polarization plate selecting optical switches 152, 153) according to the optimal optical output levels so as to respectively adjust the optical output levels of the excitation light signals $\lambda 2$, $\lambda 4$. Here, the excitation light output level control circuit 16A is configured as a polarization plate selecting optical switch control circuit.

Hence, as shown in, for example, FIG. 3, the excitation light output level control circuit 16A of the embodiment includes a parameter input section 161, an optimal excitation light level calculating section 162, an optimal excitation light level decision section 163, an amplification factor database 164, and an excitation light adjusting signal generating section 165.

Here, the parameter input section 161 takes as inputs predetermined parameter information about the optical transmission line 12, containing at least information about the transmission distances of the respective send optical signals $\lambda 1$, $\lambda 3$ to be output to the optical transmission line 12 through a maintenance terminal or the like. In the embodiment, the following parameter information (1) to (11) are input:

(1) System margin M (dB: margin value to compensate for the degree of deterioration of an optical level due to a lifetime of the optical cable 12);

(2) Minimum receive level Prmin (dBm: minimum optical receive levels which can be detected by the optical receiving sections 3A, 3B);

(3) Maximum receive level Prmax (dBm: maximum optical receive levels which can be detected by the optical receiving sections 3A, 3B);

(4) Power penalty D (dB: dispersion and reflection in the LD or the like);

(5) Send optical output level Pt (dB);

(6) Splice loss Ls [dB: loss per splice (fusion splice of optical fiber)];

(7) Connector loss Lc (dB: loss per optical connector);

(8) Optical cable loss Lo per kilometer;

(9) Splice number N per kilometer in optical cable;

(10) Transmission distance (Km) L; and

(11) Excitation optical output level $P_L$ (dBm)

Further, the optimal excitation light level calculating section (optimal optical output level operation section) 162 finds optimal optical output levels (optical levels after amplification) P of the respective send optical signals $\lambda 1$, $\lambda 3$ according to the transmission distances of the optical signals having the wavelengths $\lambda 1$, $\lambda 3$ depending upon the parameter information input through the above parameter input section 161 by arithmetic operation shown by the following expression (1):

Optimal optical output level P=Transmission distance L×(Cable loss Lo+Splice number N×Splice loss Ls)+Optimal receive level Pr+(System margin M+Connector loss Lc+Power penalty D)] (1)

where the optimal receive level Pr is set as an intermediate value between the maximum receive level Prmax and the minimum receive level Prmin. That is, the optimal receive level Pr can be found by the following expression (2):

Optimal receive level Pr=(Maximum receive level Prmax+Minimum receive level Prmin)/2 (2)

However, the optimal optical output levels P obtained by the above expression (1) must always be greater than optimal optical output levels P' when the optical receiving sections 3A, 3B have the minimum optical receive levels found by the expression (3):

Optimal optical output level P'=Transmission distance L×(Cable loss Lo+Splice number N×Splice loss Ls)+Minimum receive level Prmin+(System margin M+Connector loss Lc+Power penalty D)] (3)

Figure 4A:
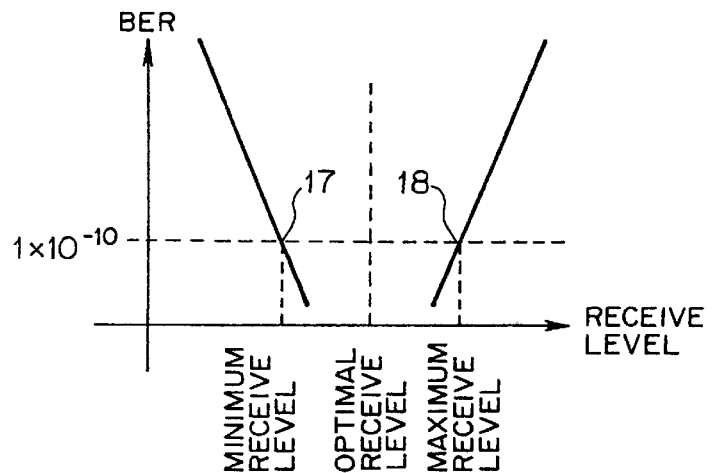
FIGS. 4(a) to 4(c) are diagrams respectively showing relationships between a receive optical level and a bit error rate (BER)

Moreover, the minimum receive level Prmin and the maximum receive level Prmax are determined according to a bit error rate (BER) predetermined as a unit standard. For example, when the BER of $1 \times 10^{-10}$ is defined as the unit standard, and a relationship as shown in FIG. 4(a) is provided between the optical receive level and the BER, the minimum receive level Prmin corresponds to a position shown by reference numeral 17, and the maximum receive level Prmax corresponds to a position shown by reference numeral 18.

Figure 4B:
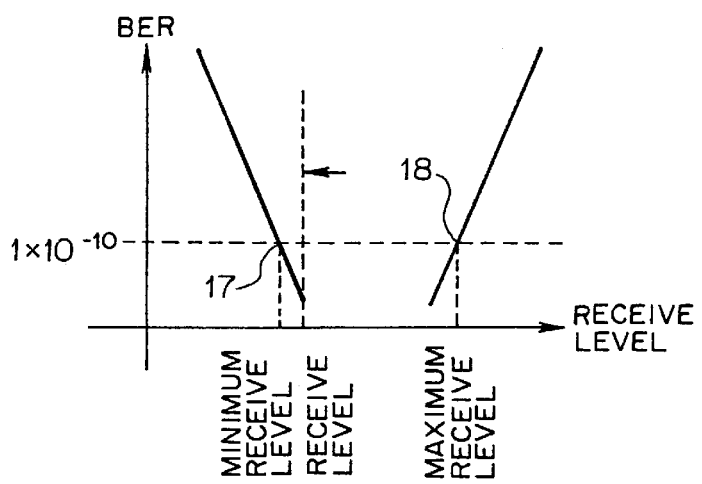
Figure 4C:
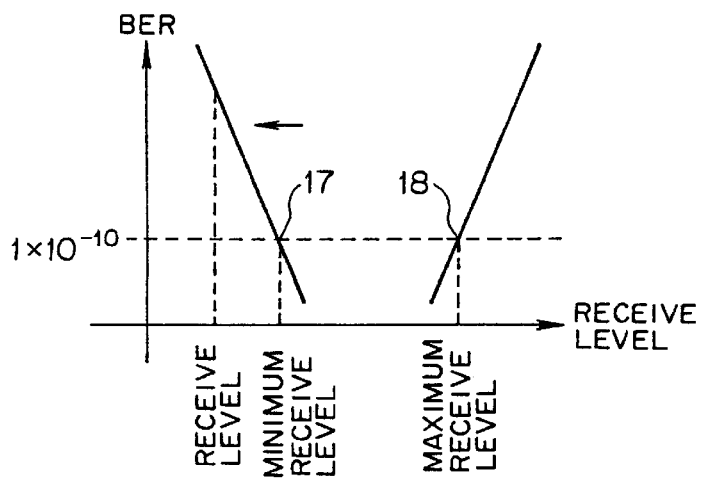

Additionally, as stated above, the optimal receive level Pr is set as the intermediate value between the maximum receive level Prmax and the minimum receive level Prmin. This is because, when the optical receive level exceeds the maximum receive level Prmax or the minimum receive level Prmin, a rapid increase in bit error rate (BER) causes significant deterioration of signal quality as shown in, for example, FIGS. 4(b), 4(c).

Next, in FIG. 3, the optimal excitation light level decision section 163 makes a decision (determination) of the optical output levels (hereinafter referred to as optimal excitation light levels) of the excitation light signals $\lambda 2$, $\lambda 4$, which provide optimal values of the amplification factors in the optical amplifiers 4A, 4B depending upon the optimal optical output levels P found by the calculations in the above optimal excitation light level calculating section 162. Here, as shown in, for example, FIG. 5, the optimal excitation light levels are determined by referring to, with the optimal optical output levels P obtained by the above calculations as keys, amplification factor correspondence tables 164a showing relationships between the send optical signal levels in the optical sending sections 2A, 2B, the optical output levels of the excitation light signals λ2, λ4, and the optical levels after the amplification. Moreover, the amplification factor database 164 contains the amplification factor correspondence tables 164a respectively corresponding to the wavelengths λ1, λ3.

Further, the excitation light adjusting signal generating section 165 generates excitation light adjusting signals for adjusting the optical output levels of the excitation light signals λ2, λ4 depending upon the optimal excitation light levels determined in the optimal excitation light level decision section 163. In the embodiment, as described above referring to FIG. 2, the excitation light level adjusting sections 15A, 15B include the polarization sections 151-i, and the optical switches 152, 153 so that the excitation light adjusting signal generating section 165 generates as the excitation light adjusting signals and feeds to the optical switches 152, 153 polarization plate selecting signals for selecting the polarization sections 151-i to pass the excitation light signals λ2, λ4 therethrough.

That is, the above-mentioned excitation light adjusting signal generating section 165 generates, as the excitation light adjusting signals for the excitation light output level adjusting sections 15A, 15B, polarization factor adjusting signals for adjusting the polarization factors of the polarization section (polarization sections 151-i).

Figure 6:
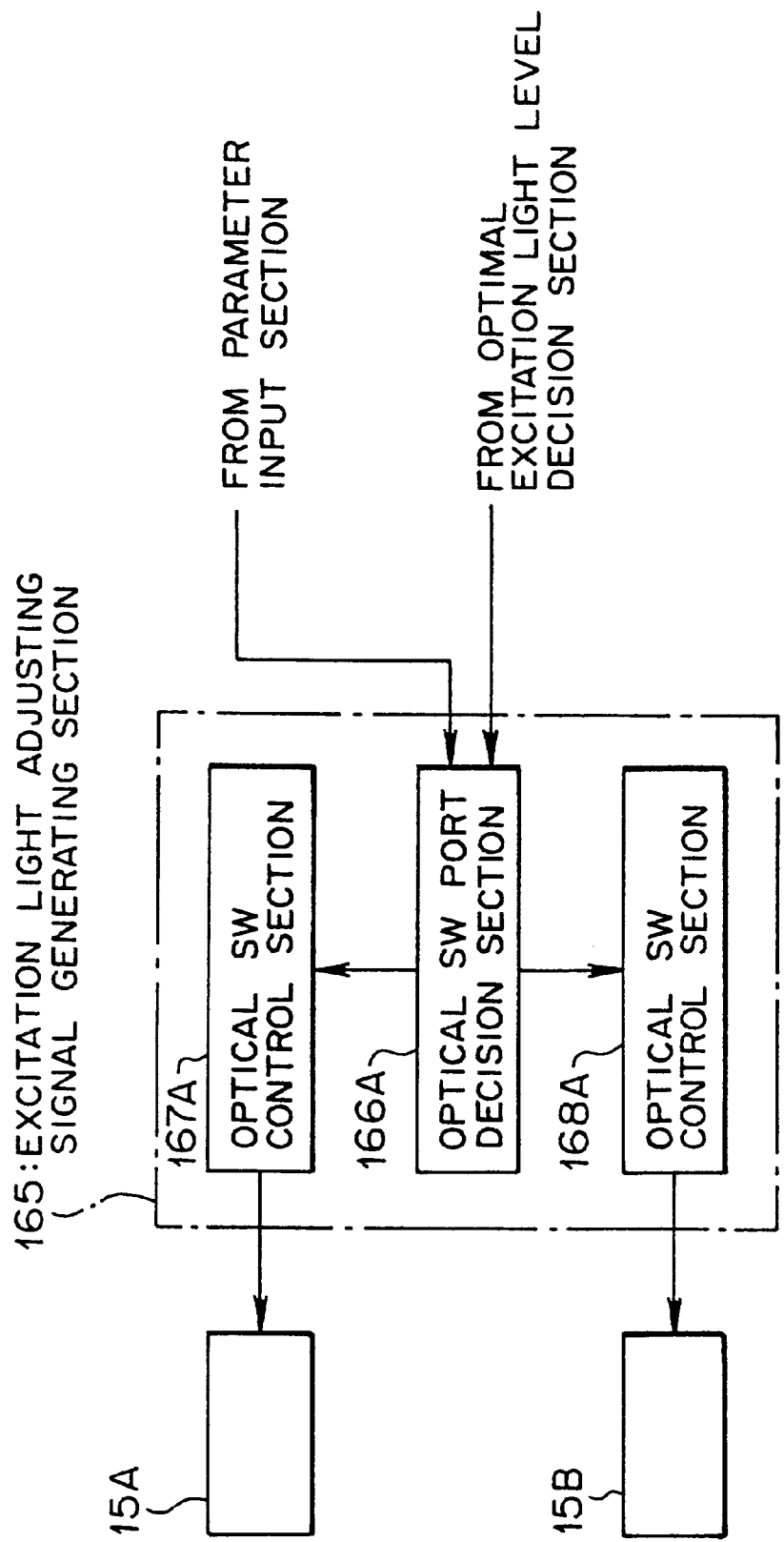
FIG. 6 is a block diagram showing a configuration of an excitation light adjusting signal generating section in the first embodiment.

Hence, as shown in, for example, FIG. 6, the excitation light adjusting signal generating section 165 of the embodiment includes an optical switch port decision section 166A, and optical switch control sections 167A, 168A.

Here, the optical switch port decision section 166A compares excitation light source optical output levels $P_L$ input through the above parameter input section 161 with the optimal excitation light levels from the optimal excitation light level decision section 163 so as to find differences therebetween. If there are the differences, the optical switch port decision section 166A decides by how many decibels the current excitation light source optical output levels $P_L$ should be increased or decreased in order to set the differences to zeros, and determines polarization plate numbers (optical switch port numbers) corresponding thereto so as to pass the polarization plate numbers to the optical switch control sections 167A, 168A.

Further, depending upon the optical switch port numbers posted from the optical switch port decision section 166A, the optical switch control sections 167A, 168A feed to the excitation light level adjusting sections 15A, 15B polarization plate selecting signals for placing in excitation light conducting states the ports 152-i, 153-i of the respective optical switches 152, 153 of the corresponding excitation light level adjusting sections 15A, 15B.

Referring to the flowcharts (Steps A1 to A10) shown in FIGS. 7 and 8, a description will now be given of an operation of the wavelength division multiplex optical transmission apparatus 1 of the embodiment having the above configuration (hereinafter often briefly referred to as "transmission apparatus 1") with attention to excitation light output level adjusting processing.

Figure 7:
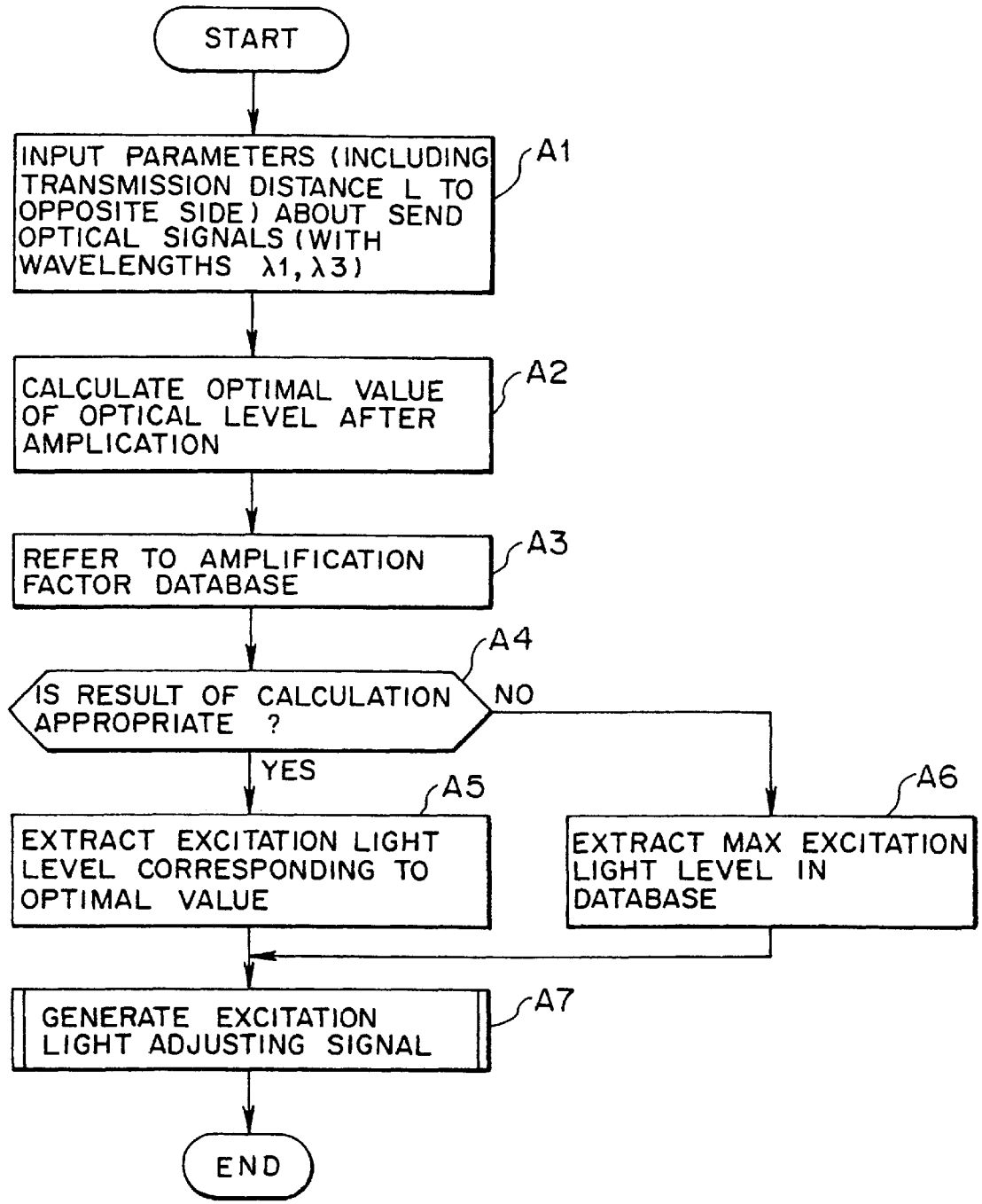
FIGS. 7 and 8 are flowcharts for respectively illustrating excitation light output level adjusting processing in the wavelength division multiplex optical transmission apparatus in the first embodiment.
Figure 8:
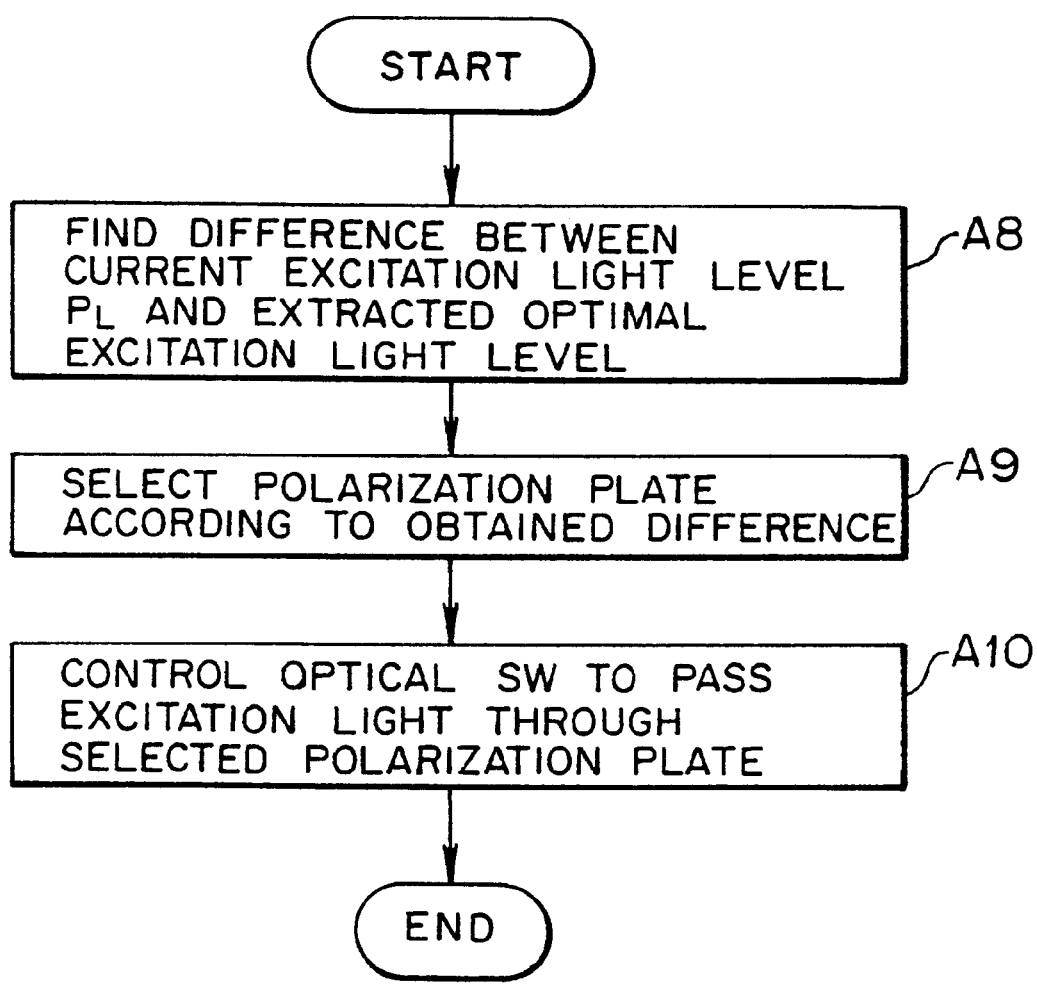

First, as shown in FIG. 7, in the transmission apparatus 1, various types of parameter information about the above-mentioned optical transmission line 12 are input into the parameter input section 161 of the excitation light output level control circuit 16A through the maintenance terminal or the like (Step A1). Subsequently, the optimal excitation light level calculating section 162 calculates, depending upon the input parameter information, the optimal optical output levels P for the send optical signals λ1, λ3 according to the above expression (1) (Step A2).

The optimal optical output levels P of the respective send optical signals λ1, λ3, obtained in the optimal excitation light level calculating section 162, are fed to the optimal excitation light level decision section 163. The optimal excitation light level decision section 163 refers to, with the given optimal optical output levels P as the keys, the amplification factor correspondence tables 164a corresponding to the wavelengths λ1, λ3, contained in the amplification factor database 164 (Step A3), and decides whether or not the optimal optical output levels P found by the calculations are appropriate values [whether or not the optimal optical output levels P are present (recorded) in the items "Optical level after amplification"] (Step A4).

As a result, if the optimal optical output levels P, the appropriate values, are recorded in the amplification factor correspondence tables 164a (if a decision of YES is given in Step A4), the optimal excitation light level decision section 163 extracts excitation light levels (optimal excitation light levels) corresponding to the optimal optical output levels P (Step A5).

On the other hand, if the optimal optical output levels P are not the appropriate values (if the optimal optical output levels P are not recorded in the amplification factor correspondence tables 164a), for example, optical receive levels cannot be set to intermediate values between the maximum receive levels Prmax and the minimum receive levels Prmin due to, for example, long transmission distances even when the maximum amplification factors are provided in the optical amplifiers 4A, 4B. In this case, the optimal excitation light level decision section 163 extracts from the amplification factor correspondence tables 164a excitation light levels (maximum excitation light levels) providing the maximum optical levels after amplification so as to set the optical receive levels closer to the intermediate values (from No route in Step A4 to Step A6).

Subsequently, both the excitation light levels extracted in such a manner are passed to the excitation light adjusting signal generating section 165 as the optimal excitation light levels (Step A7). Then, as shown in FIG. 8, in the excitation light adjusting signal generating section 165, the optical switch port decision section 166A first finds differences between the excitation light output levels $P_L$ (current excitation light levels) from the parameter input section 161 and the optimal excitation light levels obtained by the optimal excitation light level decision section 163 as described above (Step A8).

If there are the differences, the optical switch port decision section 166A decides by how many decibels the current excitation light levels should be increased or decreased in order to set the differences to zeros, and selects the polarization plate numbers (optical switch port numbers) corresponding thereto (Step A9) so as to post the polarization plate numbers to the optical switch control sections 167A, 168A. The optical switch control sections 167A, 168A generate and feed to the excitation light level adjusting sections 15A, 15B polarization plate selecting signals (electric signals) depending upon the optical switch port numbers from the optical switchport decision section 166A. Thereby, the ports 152-i, 153-i of the respective optical switches 152, 153 are placed in the excitation light conducting states such that excitation lights can pass through the selected polarization sections 151-i (Step A10).

This controls to optimal optical levels the optical output levels of the respective excitation light signals $\lambda 2$, $\lambda 4$ generated in the respective excitation light sources 14A, 14B. The respective send optical signals $\lambda 1$, $\lambda 3$ generated in the respective optical sending sections 2A, 2B are amplified in the optical amplifiers 4A, 4B to the optimal optical output levels according to the transmission distances of the optical signals with the wavelengths $\lambda 1$, $\lambda 3$, and are sent to the optical transmission line 12.

As stated above, according the wavelength division multiplex optical transmission apparatus 1 of the first embodiment, the amplification factors in the optical amplifiers 4A, 4B to amplify the send optical signals $\lambda 1$, $\lambda 3$ to be sent after the wavelength division multiplexing are individually varied by adjusting the optical output levels of the excitation light signals $\lambda 2$, $\lambda 4$ added according to the transmission distances (characteristics) of the optical signals with the wavelengths $\lambda 1$, $\lambda 3$, thereby controlling the optical output levels of the optical signals to the optical transmission line 12 for the wavelengths $\lambda 1$, $\lambda 3$ (that is, adjusting the optical output levels of the respective send optical signals $\lambda 1$, $\lambda 3$ for the wavelengths $\lambda 1$, $\lambda 3$ before the wavelength division multiplexing in the WDM coupler 11). Consequently, it is possible to send the respective send optical signals $\lambda 1$, $\lambda 3$ at the optical output levels most suitable for the optical signals with the wavelengths $\lambda 1$, $\lambda 3$ with consideration given to the transmission distances of the optical signals with the wavelengths $\lambda 1$, $\lambda 3$.

Accordingly, the respective send optical signals $\lambda 1$, $\lambda 3$ can always be sent at the minimum optical output levels. Thus, unlike the prior art, it is unnecessary to provide higher optical output levels of the optical signals with all the wavelengths $\lambda 1$, $\lambda 3$ to an optical signal with a wavelength providing a short transmission distance for concurrent amplification of the optical signals with the respective wavelengths. Each optical signal can be sent at the minimum optical output level required for a predetermined optical transmission distance. It is thereby possible to significantly reduce power consumption at a time of optical transmission, and realize the optical transmission at a lower cost.

Further, in the embodiment, simply by inputting the predetermined parameter information about the optical transmission line 12, the excitation light output level control circuit 16A automatically calculates the optical output levels most suitable for the optical signals with the respective wavelengths $\lambda 1$, $\lambda 3$ so as to adjust the optical output levels of the excitation light signals $\lambda 2$, $\lambda 4$ from the excitation light sources 14A, 14B. Therefore, it is possible to extremely easily and accurately adjust the optical output levels of the optical signals with the wavelengths $\lambda 1$, $\lambda 3$.

Additionally, in the embodiment, the optical switches 152, 153 of the excitation light output level adjusting sections 15A, 15B are controlled by the electric signals, thereby selecting the polarization sections 151-i to pass the excitation light signals $\lambda 2$, $\lambda 4$ therethrough. Hence, it is possible to adjust the optical levels of the send optical signals $\lambda 1$, $\lambda 3$ after the optical amplification to the optimal optical levels at a very high speed.

(A1) Description of First Modification of First Embodiment

Figure 9:
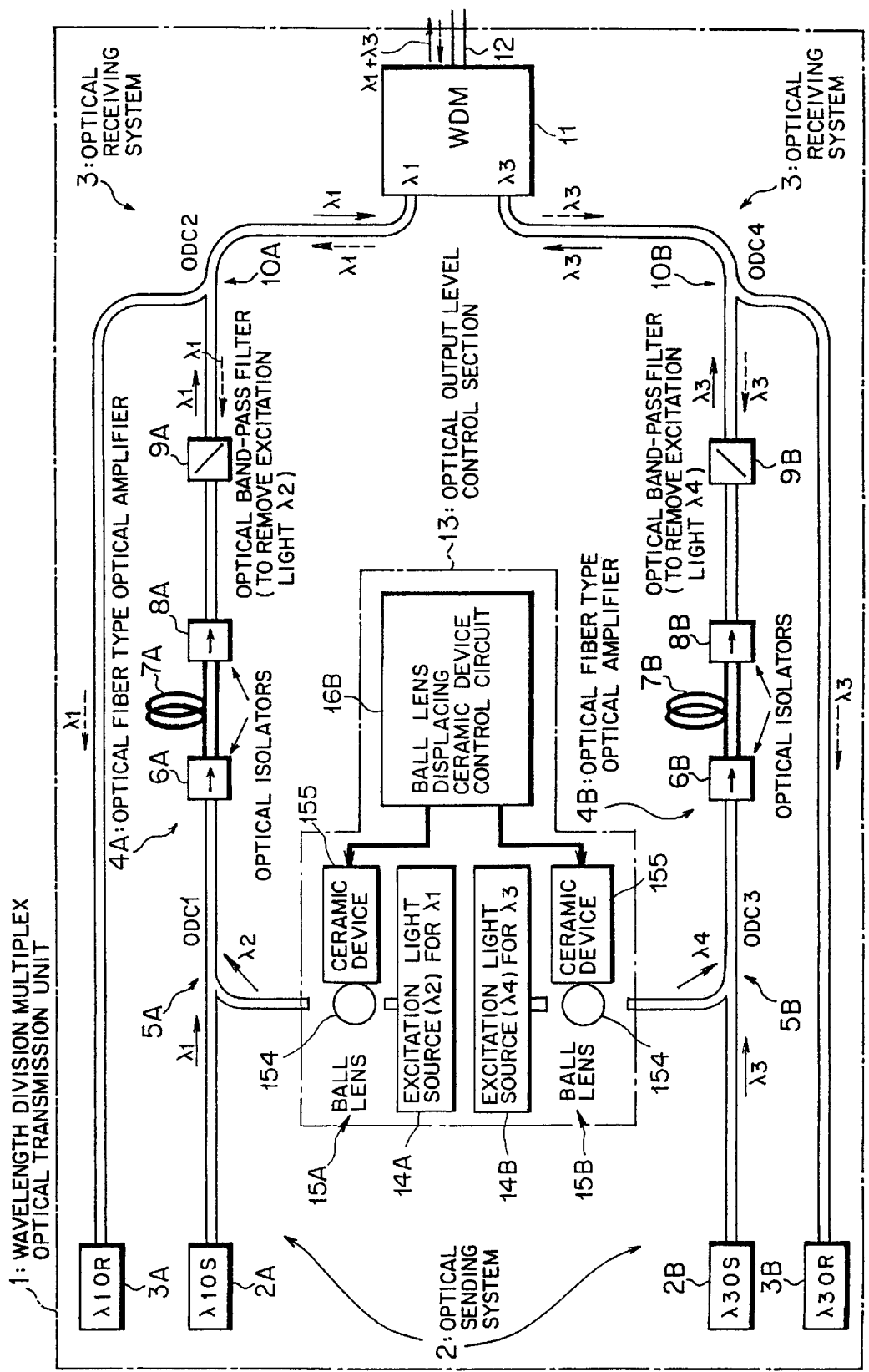
FIG. 9 is a block diagram showing a configuration of a wavelength division multiplex optical transmission apparatus serving as a first modification of the first embodiment of the present invention.

FIG. 9 is a block diagram showing a configuration of a wavelength division multiplex optical transmission apparatus 1 serving as a first modification of the first embodiment. The transmission apparatus 1 shown in FIG. 9 is different from that shown in FIG. 1 in that an optical output level control section 13 includes ball lenses 154 and ceramic devices 155 as excitation light output level adjusting sections 1SA, 15B, and an excitation light output level control circuit (ball lens displacing ceramic device control circuit) 16B is provided instead of the excitation light output level control circuit 16A.

Here, the above ball lenses 154 can vary, according to positions of their spherical surfaces on which lights are incident, focus positions (refractive indexes) of the incident lights so as to vary amounts of transmitted lights. The ceramic devices 155 move the ball lenses 154 by predetermined amounts in directions away from/closer to the ceramic devices 155 in response to ball lens displacement adjusting signals fed from the ball lens displacing ceramic device control circuit 16B (hereinafter briefly referred to as "ceramic device control circuit 16B"). Such movements of the ceramic devices 154 vary incident positions of excitation light signals $\lambda 2$, $\lambda 4$ on the ball lenses 154 to vary focus positions of the excitation light signals $\lambda 2$, $\lambda 4$ on the ball lenses 154, resulting in varying optical output levels of the excitation light signals $\lambda 2$, $\lambda 4$.

That is, in the modification, the excitation light output level adjusting sections 15A, 15B respectively include the lenses which can vary the refractive indexes of the passing excitation light signals $\lambda 2$, $\lambda 4$ according to the incident positions of the excitation light signals $\lambda 2$, $\lambda 4$ from excitation light sources 14A, 14B. The optical output levels of the excitation light signals $\lambda 2$, $\lambda 4$ can be varied by varying the incident positions of the excitation light signals $\lambda 2$, $\lambda 4$ on the lenses.

Further, as in the control circuit 16A of the first embodiment, in the modification, the ceramic device control circuit 16B finds optimal optical output levels P of respective send optical signals $\lambda 1$, $\lambda 3$ depending upon various types of parameter information about an optical transmission line 12 to adjust the optical output levels of the excitation light signals $\lambda 2$, $\lambda 4$, and has the same configuration as that shown in FIG. 3.

Figure 10:
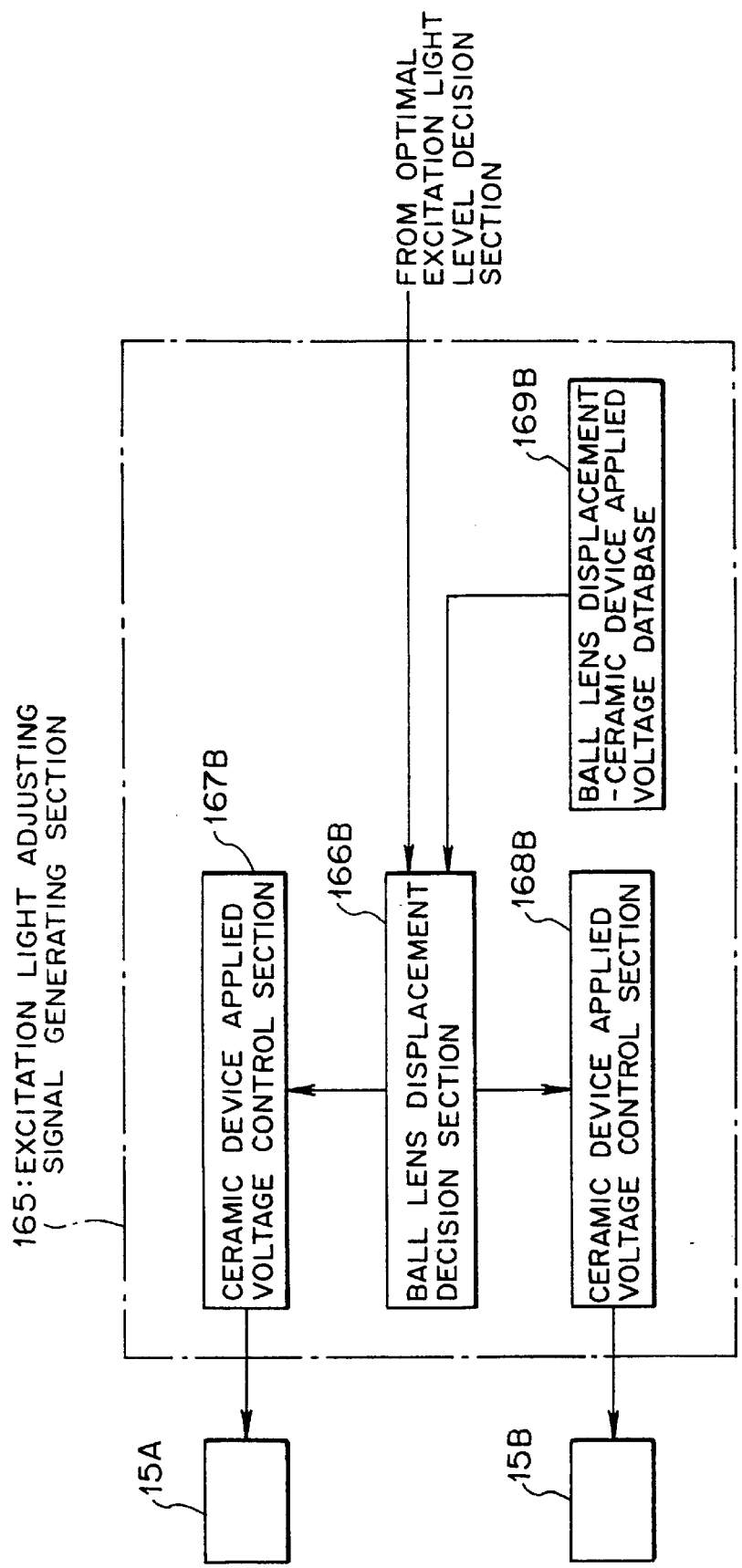
FIG. 10 is a block diagram showing a configuration of an excitation light adjusting signal generating section in the first modification of the first embodiment.

However, as described above, the excitation light levels are adjusted by the ball lenses 154 and the ceramic devices 155 in the modification. Thus, as shown in, for example, FIG. 10, the excitation light adjusting signal generating section 165 includes a ball lens displacement decision section 166B, ceramic device applied voltage control sections 167B, 168B for the excitation light signals $\lambda 2$, $\lambda 4$, and a ball lens displacement-ceramic device applied voltage database 169B.

Here, the ball lens displacement decision section 166B finds positional displacements of the ball lenses 154, required to adjust the optical output levels of the excitation light signals $\lambda 2$, $\lambda 4$ to optimal excitation light levels obtained in an optimal excitation light level decision section 163 (optimal excitation light level calculating section 162). The ball lens displacement decision section 166B refers to, with the positional displacements as keys, the ball lens displacement-ceramic device applied voltage database 169B, thereby determining values of applied voltages to the ceramic devices 155, required to move the ball lenses 154 by the positional displacements.

Moreover, it is to be noted that the ball lens displacement-ceramic device applied voltage database 169B contains, for each of the send optical signals $\lambda 2$, $\lambda 4$, a correspondence table (not shown) in which the value of applied voltage to the ceramic device 155 is recorded for each positional displacement of the ball lens 154.

Further, the ceramic device applied voltage control sections 167B, 168B respectively apply to the ceramic devices 155 voltages according to the ceramic device applied voltage values obtained in the above ball lens displacement decision section 166B.

That is, in the modification, the excitation light adjusting signal generating section 165 generates, as excitation light adjusting signals for the excitation light output level adjusting sections 15A, 15B, ball lens displacement adjusting signals (lens incident position adjusting signals) to adjust the incident positions of the excitation light signals λ2, λ4 on the ball lenses 154.

In the wavelength division multiplex optical transmission apparatus 1 in the first modification having the above configuration, as in the first embodiment, the control circuit 16B first finds by calculations the optimal optical output levels P of the respective send optical signals λ1, λ3 depending upon the various types of parameter information about the optical transmission line 12, and determines the optimal excitation light levels according to the obtained optimal optical output levels P so as to pass the optimal excitation light levels to the excitation light adjusting signal generating section 165 (see Steps A1 to A7 in FIG. 7).

Figure 11:
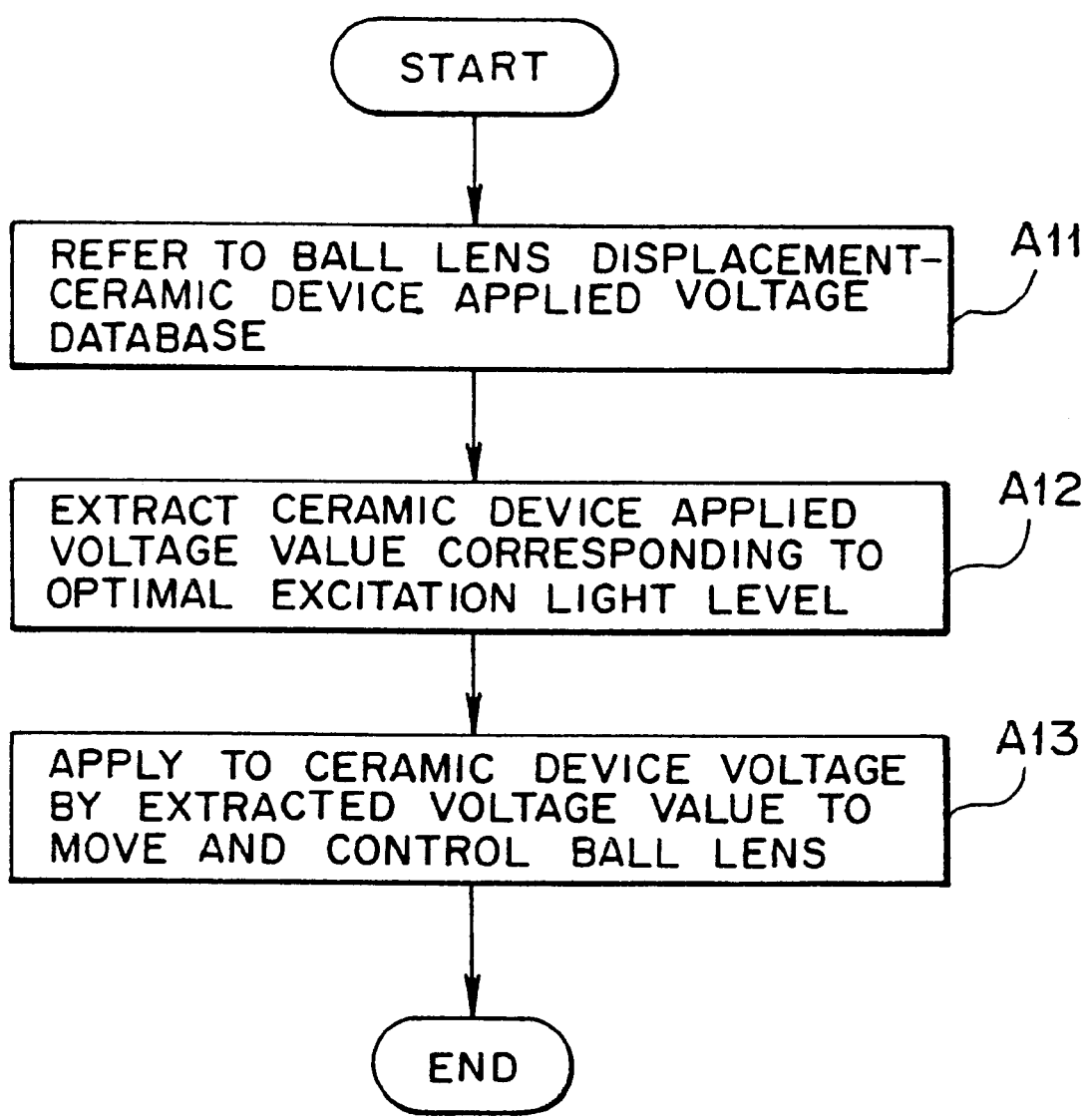
FIG. 11 is a flowchart for illustrating excitation light output level adjusting processing in the first modification of the first embodiment.

Subsequently, in the excitation light adjusting signal generating section 165, as shown in FIG. 11, the ball lens displacement decision section 166B finds the positional displacements of the ball lenses 154 corresponding to the optimal excitation light levels input from the optimal excitation light level decision section 163, and refers to the ball lens displacement-ceramic device applied voltage database 169B with the positional displacements as the keys (Step A11).

Then, the ball lens displacement decision section 166B extracts the values of applied voltages to the ceramic devices 155 for the respective excitation light signals λ2, λ4 corresponding to the optimal excitation light level from the above database 169B (Step A12) to post the extracted applied voltage values to the ceramic device applied voltage control sections 167B, 168B. Subsequently, the ceramic device applied voltage control sections 167B, 168B respectively apply to the ceramic devices 155 voltages according to the applied voltage values posted from the ball lens displacement decision section 166B, thereby moving the ball lenses 154 to vary the incident positions of excitation light signals λ2, λ4 so as to vary the focus positions of the excitation light signals λ2, λ4 on the ball lenses 154 (Step A13).

Thereby, as in the first embodiment, the optical output levels of the respective excitation light signals λ2, λ4 from the excitation light sources 14A, 14B are adjusted to the optimal excitation light levels found by calculations, and the respective send optical signals λ1, λ3 are amplified in optical amplifiers 4A, 4B to the optimal optical output levels according to transmission distances of optical signals with the wavelengths λ1, λ3, and are sent to the optical transmission line 12.

As described above, according to the wavelength division multiplex optical transmission apparatus 1 in the first modification of the first embodiment, the voltages applied to the ceramic devices 155 of the excitation light output level adjusting sections 15A, 15B are controlled to move the ball lenses 154 by the predetermined amounts, thereby varying the focus positions (refractive indexes) of the excitation light signals λ2, λ4 on the ball lenses 154. Therefore, it is possible to vary the optical output levels of the excitation light signals λ2, λ4 in an analog manner, and adjust the optical output levels of the excitation light signals λ2, λ4 more precisely than would be in the above-mentioned first embodiment.

(A2) Description of Second Modification of First Embodiment

Figure 12:
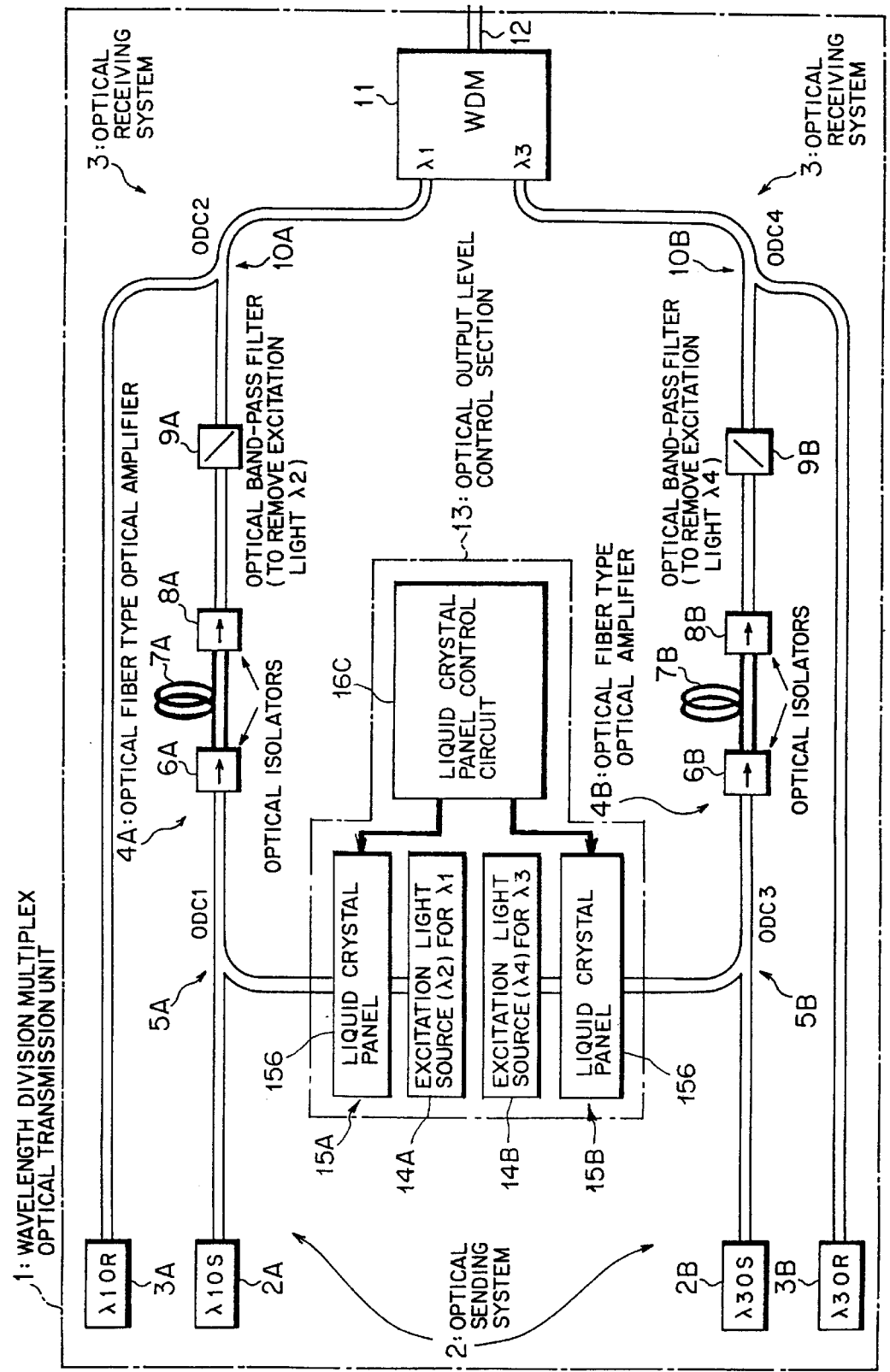
FIG. 12 is a block diagram showing a configuration of a wavelength division multiplex optical transmission apparatus serving as a second modification of the first embodiment.

FIG. 12 is a block diagram showing a configuration of a wavelength division multiplex optical transmission apparatus 1 serving as a second modification of the first embodiment. The transmission apparatus 1 shown in FIG. 12 is different from that shown in FIG. 1 in that an optical output level control section 13 includes liquid crystal panels 156 as excitation light output level adjusting sections 15A, 15B, and an excitation light output level control circuit (liquid crystal panel control circuit) 16C is provided instead of the excitation light output level control circuit 16A.

Here, the above liquid crystal panels (liquid crystal sections) 156 respectively vary, according to applied voltages, transmission factors of excitation light signals λ2, λ4 from excitation light sources 14A, 14B. Variations in applied voltages fed from the liquid crystal panel control circuit 16C vary optical output levels of the excitation light signals λ2, λ4.

Further, as in the control circuit 16A of the first embodiment, in the modification, the liquid crystal panel control circuit 16C finds optimal optical output levels P of respective send optical signals λ1, λ3 depending upon various types of parameter information about an optical transmission line 12 to adjust the optical output levels of the excitation light signals λ2, λ4, and has the same configuration as that shown in FIG. 3.

Figure 13:
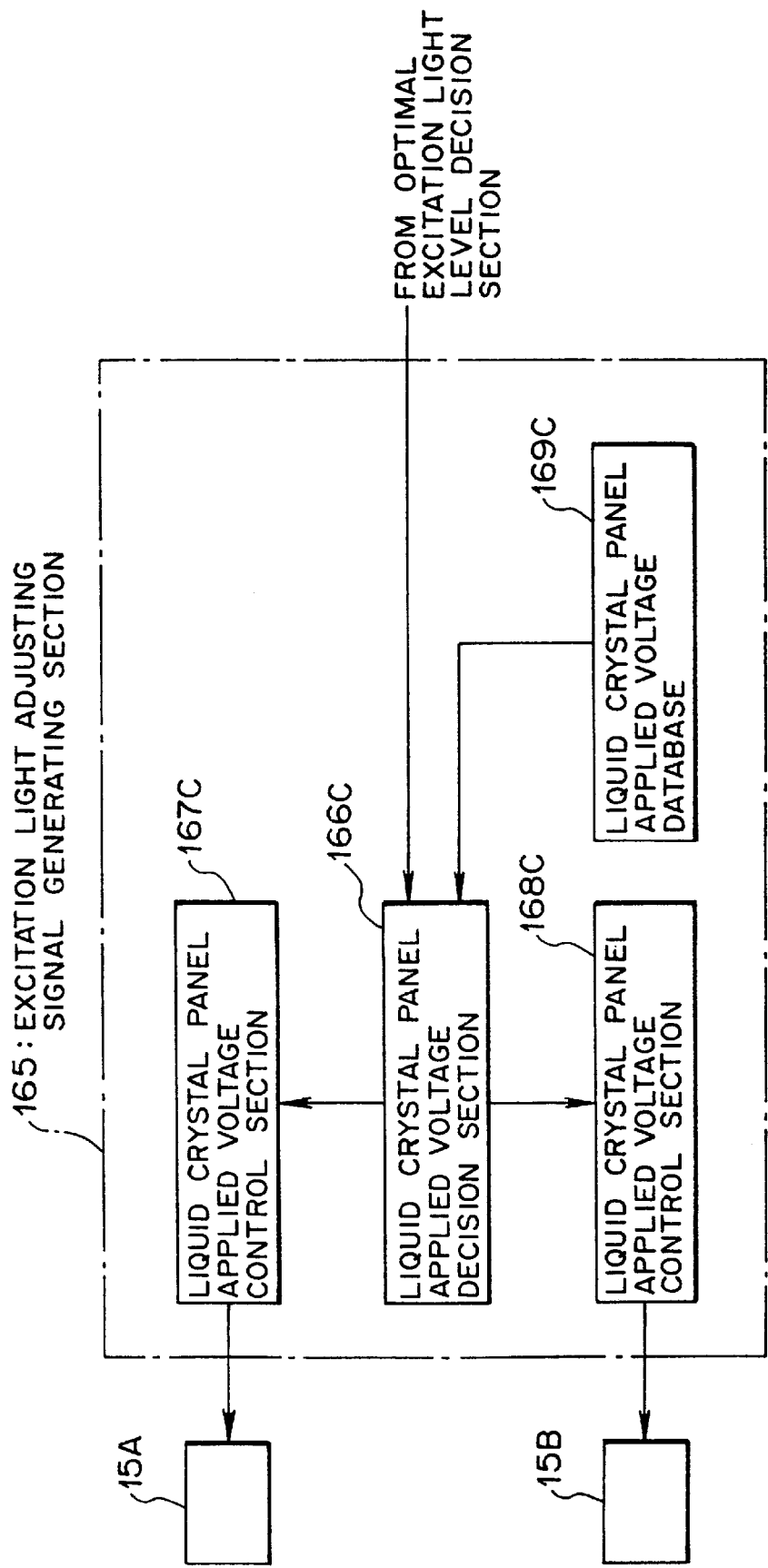
FIG. 13 is a block diagram showing a configuration of an excitation light adjusting signal generating section in the second modification of the first embodiment.

However, as described above, the excitation light level is adjusted by the liquid crystal panel 156 in the modification. Thus, as shown in, for example, FIG. 13, an excitation light adjusting signal generating section 165 includes a liquid crystal panel applied voltage decision section 166C, liquid crystal panel applied voltage control sections 167C, 168C for the excitation light signals λ2, λ4, and a liquid crystal panel applied voltage database 169C.

Here, the liquid crystal panel applied voltage decision section 166C finds values of applied voltages to the liquid crystal panels 156, required to adjust the optical output levels of the excitation light signals λ2, λ4 to optimal excitation light levels obtained in an optimal excitation light level decision section 163 by referring to the liquid crystal panel applied voltage database 169C. Moreover, it is to be noted that the liquid crystal panel applied voltage database 169C contains, for each of the send optical signals λ1, λ3, a correspondence table (not shown) in which the value of applied voltage to the liquid crystal panel 156 is recorded for each optimal excitation light level.

Further, the liquid crystal panel applied voltage control sections 167C, 168C respectively apply to the liquid crystal panels 156 voltages according to the applied voltage values obtained in the above liquid crystal panel applied voltage decision section 166C.

That is, in the modification, the excitation light adjusting signal generating section 165 generates, as excitation light adjusting signals for the excitation light output level adjusting sections 15A, 15B, transmission factor adjusting signals for adjusting the transmission factor of the liquid crystal panel 156.

In the wavelength division multiplex optical transmission apparatus 1 in the second modification having the above configuration, as in the first embodiment, the control circuit 16C first finds the optimal optical output levels P of the respective send optical signals λ1, λ3 depending upon the various types of parameter information about the optical transmission line 12, and determines the optimal excitation light levels according to the obtained optimal optical output levels P so as to pass the optimal excitation light levels to the excitation light adjusting signal generating section 165 (see Steps A1 to A7 in FIG. 7).

Figure 14:
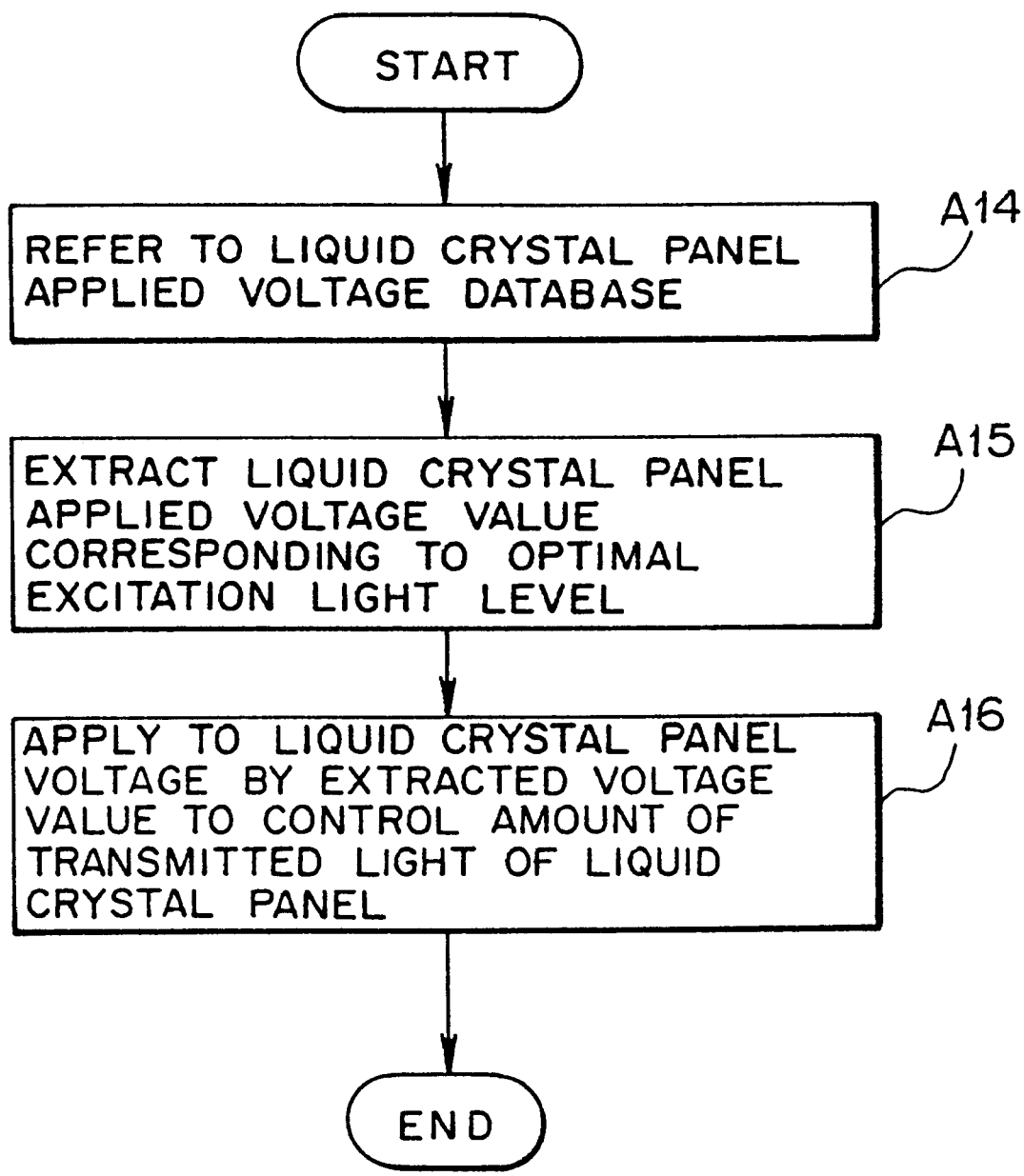
FIG. 14 is a flowchart for illustrating excitation light output level adjusting processing in the second modification of the first embodiment.

Subsequently, in the excitation light adjusting signal generating section 165, as shown in FIG. 14, the liquid crystal panel applied voltage decision section 166C refers to the liquid crystal panel applied voltage database 169C with the optimal excitation light levels input from the optimal excitation light level decision section 163 as keys (Step A14). Then, the liquid crystal panel applied voltage decision section 166C extracts the values of applied voltages to the liquid crystal panels 156 for the respective excitation light signals $\lambda 2$, $\lambda 4$ corresponding to the optimal excitation light levels from the above database 169C (Step A15) to post the extracted applied voltage values to the liquid crystal panel applied voltage control sections 167C, 168C.

Subsequently, the liquid crystal panel applied voltage control sections 167C, 168C respectively apply to the liquid crystal panels 156 voltages according to the applied voltage values posted from the liquid crystal panel applied voltage decision section 166C, thereby varying the transmission factor of the liquid crystal panel 156 so as to vary amounts of transmitted lights of the excitation light signals $\lambda 2$, $\lambda 4$ (Step A16).

Thereby, as in the first embodiment, the optical output levels of the respective excitation light signals $\lambda 2$, $\lambda 4$ from the excitation light sources 14A, 14B are adjusted to the optimal excitation light levels found by the calculations. The respective send optical signals $\lambda 1$, $\lambda 3$ are amplified in optical amplifiers 4A, 4B to the optimal optical output levels according to transmission distances of optical signals with the wavelengths $\lambda 1$, $\lambda 3$, and are sent to the optical transmission line 12.

As described above, according to the wavelength division multiplex optical transmission apparatus 1 in the second modification of the first embodiment, the voltages applied to the liquid crystal panels 156 of the excitation light output level adjusting sections 15A, 15B are varied to adjust the optical output levels of the excitation light signals $\lambda 2$, $\lambda 4$. Therefore, it is possible to vary the optical output levels of the excitation light signals $\lambda 2$, $\lambda 4$ in an analog manner, and more precisely adjust the optical output levels of the excitation light signals $\lambda 2$, $\lambda 4$ in a simpler configuration than would be in the above-mentioned first embodiment.

(A3) Description of Third Modification of First Embodiment

Figure 15:
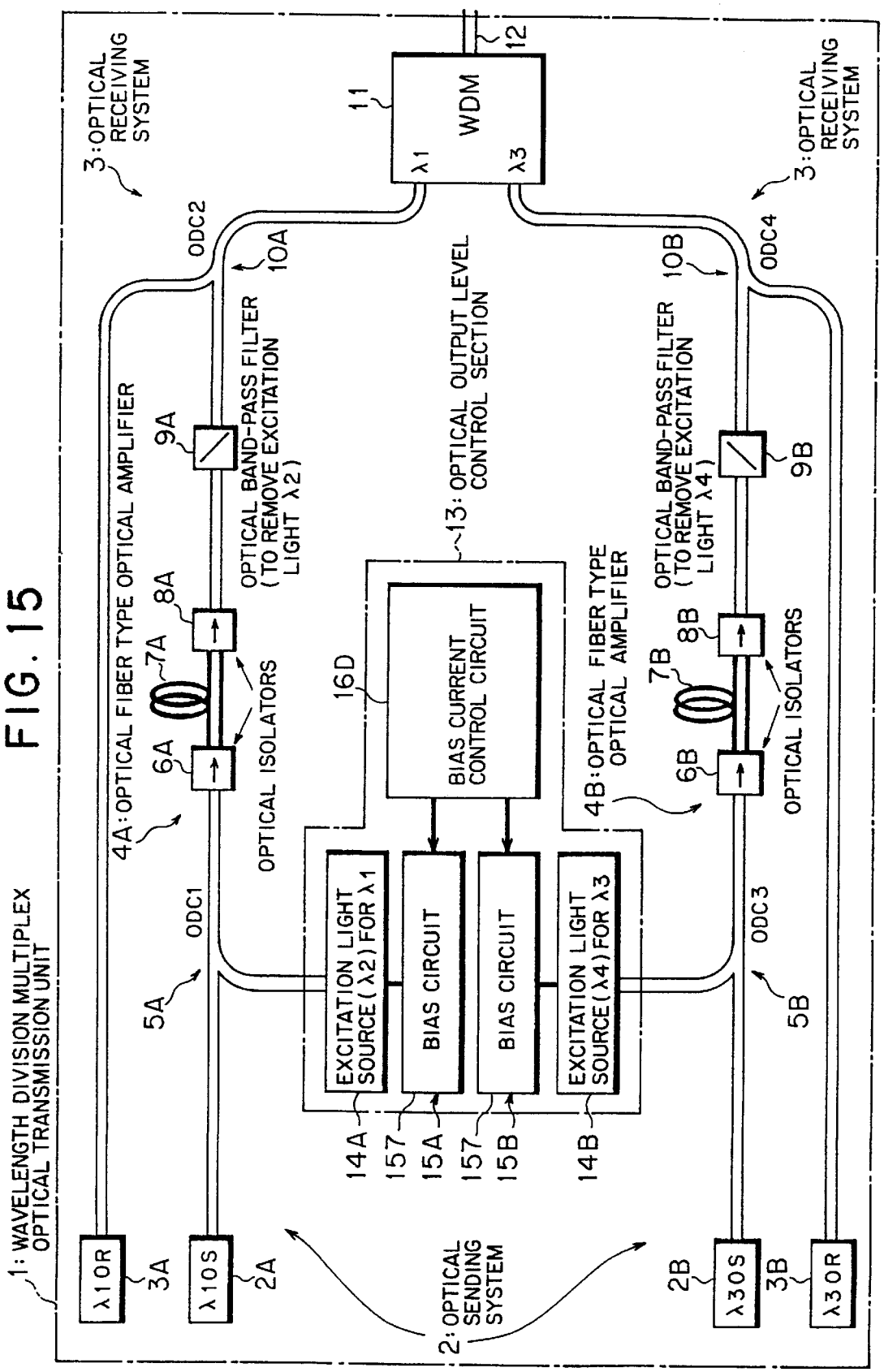
FIG. 15 is a block diagram showing a configuration of a wavelength division multiplex optical transmission apparatus serving as a third modification of the first embodiment.

FIG. 15 is a block diagram showing a configuration of a wavelength division multiplex optical transmission apparatus 1 serving as a third modification of the first embodiment. The transmission apparatus 1 shown in FIG. 15 is different from that shown in FIG. 1 in that an optical output level control section 13 includes bias circuits 157 as excitation light output level adjusting sections 15A, 15B, and an excitation light output level control circuit (bias current control circuit) 16D is provided instead of the excitation light output level control circuit 16A.

Here, the above bias circuits 157 respectively vary, according to amounts of fed bias currents, optical levels of excitation light signals $\lambda 2$, $\lambda 4$ generated in excitation light sources 14A, 14B. Variations in bias currents fed from the bias current control circuit 16D vary values of currents fed to the excitation light sources 14A, 14B to vary the optical output levels of the excitation light signals $\lambda 2$, $\lambda 4$.

Further, as in the control circuit 16A of the first embodiment, in the modification, the bias current control circuit 16D finds optimal optical output levels P of respective send optical signals $\lambda 1$, $\lambda 3$ depending upon various types of parameter information about an optical transmission line 12 to adjust the optical output levels of the excitation light signals $\lambda 2$, $\lambda 4$, and has the same configuration as that shown in FIG. 3.

Figure 16:
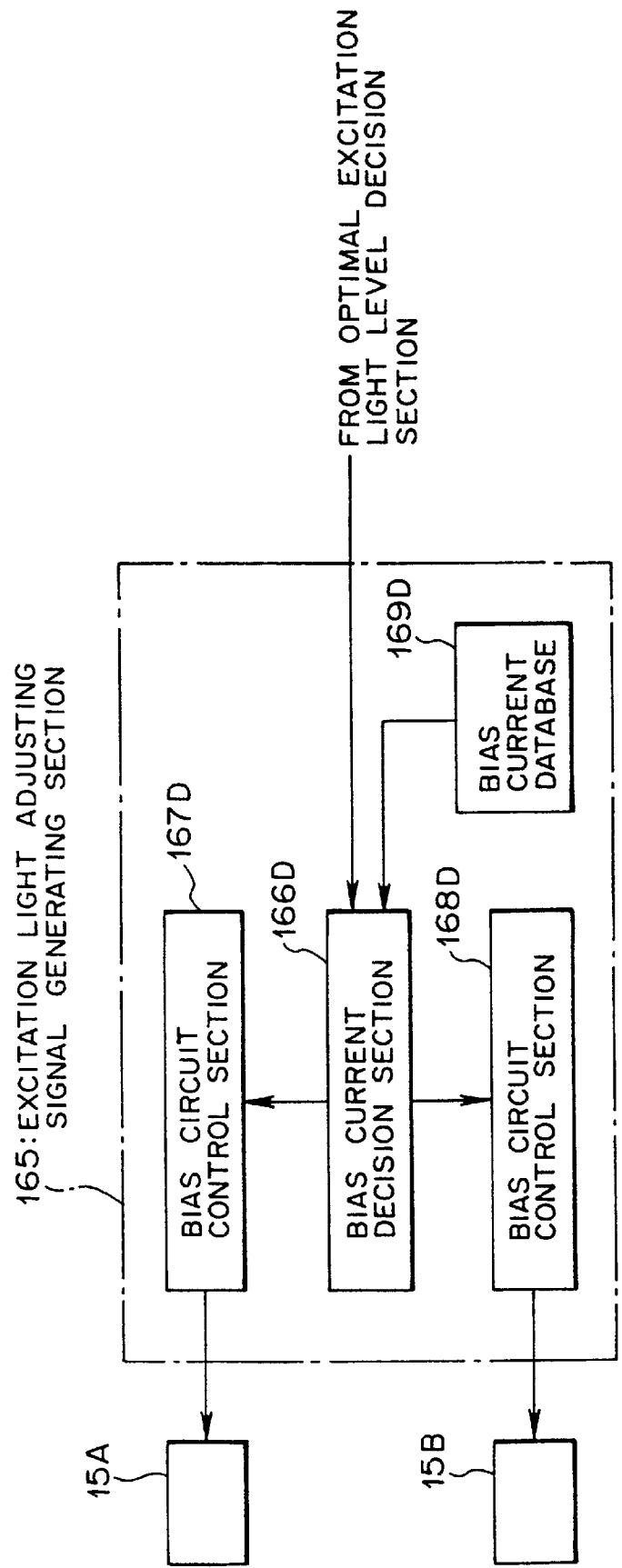
FIG. 16 is a block diagram showing a configuration of an excitation light adjusting signal generating section in the third modification of the first embodiment.

However, as described above, the excitation light level is adjusted by the bias circuit 157 in the modification. Thus, as shown in, for example, FIG. 16, an excitation light adjusting signal generating section 165 includes a bias current decision section 166D, bias circuit control sections 167D, 168D for the excitation light signals $\lambda 2$, $\lambda 4$, and a bias current database 169D.

Here, the bias current decision section 166D determines values of bias currents to the bias circuits 157, required to adjust the optical output levels of the excitation light signals $\lambda 2$, $\lambda 4$ to optimal excitation light levels obtained by an optimal excitation light level decision section 163 (optimal excitation light level calculation section 162) by referring to the bias current database 169D. Moreover, it is to be noted that the bias current database 169D contains, for each of the send optical signals $\lambda 1$, $\lambda 3$, a correspondence table (not shown) in which the value of voltage applied to the bias circuit 157 is recorded for each optimal excitation light level.

Further, the bias circuit control sections 167D, 168D respectively feed to the bias circuits 157 bias currents according to the bias current values obtained in the above bias current decision section 166D.

That is, in the modification, the excitation light adjusting signal generating section 165 generates, as excitation light adjusting signals for the excitation light output level adjusting sections 15A, 15B, bias current adjusting signals for adjusting the amounts of bias currents of the bias circuits 157.

In the wavelength division multiplex optical transmission apparatus 1 in the third modification having the above configuration, as in the first embodiment, the control circuit 16D first finds by calculations the optimal optical output levels P of the respective send optical signals $\lambda 1$, $\lambda 3$ depending upon the various types of parameter information about the optical transmission line 12, and determines the optimal excitation light levels according to the obtained optimal optical output levels P so as to pass the optimal excitation light levels to the excitation light adjusting signal generating section 165 (see Steps A1 to A7 in FIG. 7).

Figure 17:
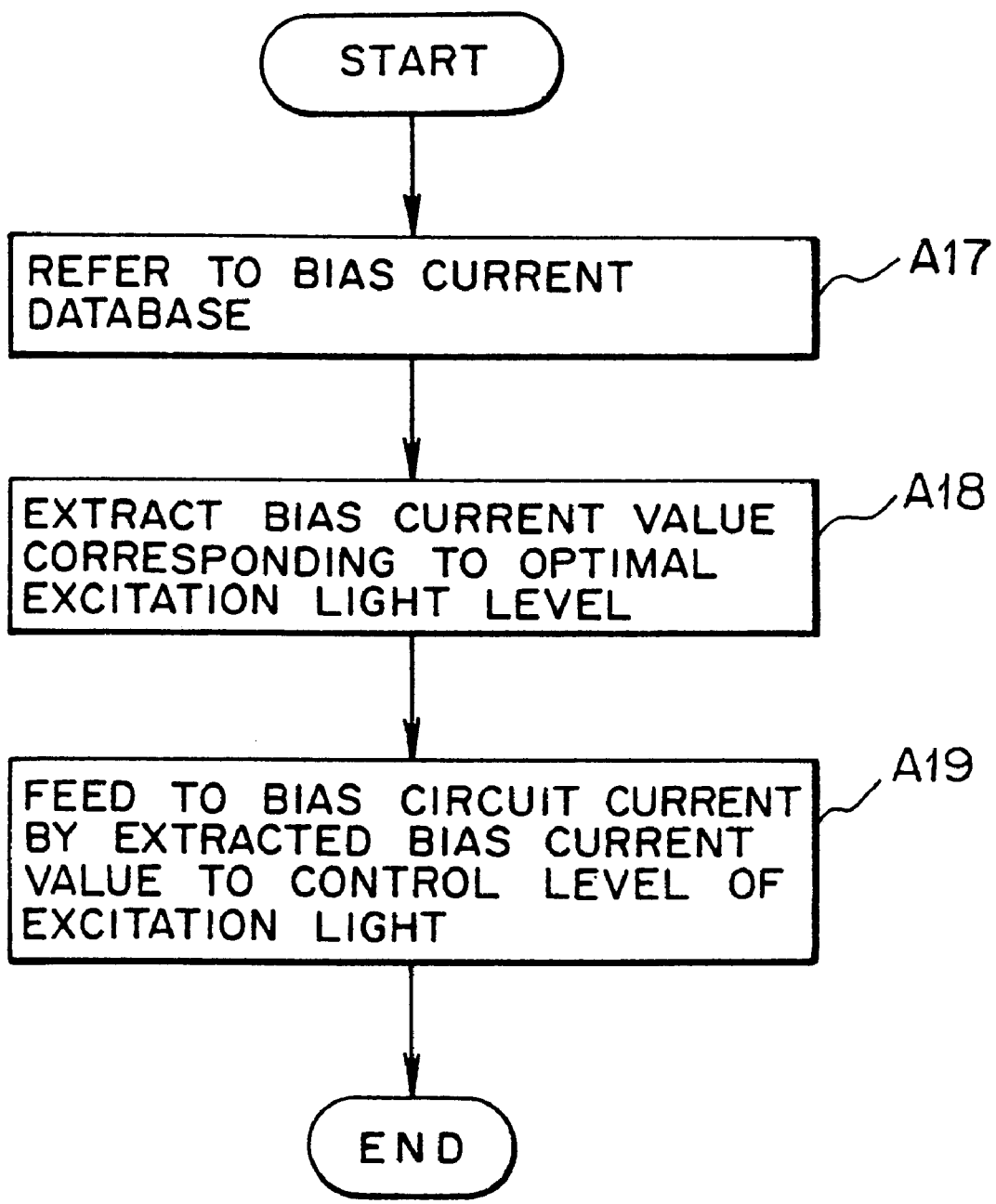
FIG. 17 is a flowchart for illustrating excitation light output level adjusting processing in the third modification of the first embodiment.

Subsequently, in the excitation light adjusting signal generating section 165, as shown in FIG. 17, the bias current decision section 166D refers to the bias current database 169D with the optimal excitation light levels input from the optimal excitation light level decision section 163 as keys (Step A17). Then, the bias current decision section 166D extracts the bias current values fed to the bias circuits 157 for the respective excitation light signals $\lambda 2$, $\lambda 4$ corresponding to the optimal excitation light levels from the above bias current database 169D (Step A18) to post the extracted bias current values to the bias circuit control sections 167D, 168D.

Subsequently, the bias circuit control sections 167D, 168D respectively feed to the bias circuits 157 the bias currents according to the bias current values posted from the bias current decision section 166D, thereby varying the amounts of currents fed from the bias circuits 157 to the excitation light sources 14A, 14B so as to vary the optical levels of the excitation light signals $\lambda 2$, $\lambda 4$ (Step A19)

Thereby, as in the first embodiment, the optical output levels of the respective excitation light signals $\lambda 2$, $\lambda 4$ from the excitation light sources 14A, 14B are adjusted to the optimal excitation light levels found by the calculations. The respective send optical signals $\lambda 1$, $\lambda 3$ are amplified in optical amplifiers 4A, 4B to the optimal optical output levels according to transmission distances of optical signals with the wavelengths $\lambda 1$, $\lambda 3$, and are sent to the optical transmission line 12.

As described above, according to the wavelength division multiplex optical transmission apparatus 1 in the third modification of the first embodiment, the excitation light output level adjusting sections 15A, 15B are configured as the bias circuits 157 which can vary the amounts of currents fed to the excitation light sources 14A, 14B. Therefore, it is possible to vary the optical output levels of the excitation light signals λ2, λ4 generated in the excitation light sources 14A, 14B directly and in an analog manner, and adjust the optical output levels of the excitation light signals λ2, λ4 more accurately and more precisely than would be in the first embodiment.

Moreover, in the first embodiment and the first to third modifications described above, the above-mentioned method of adjusting the optical output levels of the send optical signals λ1, λ3 (the optical output levels of the excitation light signals λ2, λ4) is applied to the transmission apparatus 1 including both the optical sending system 2 and the optical receiving system 3. However, it must be noted that the method of adjusting may similarly be applied to any transmission apparatus as long as it has at least the optical sending system 2.

(B) Description of Second Embodiment

Figure 18:
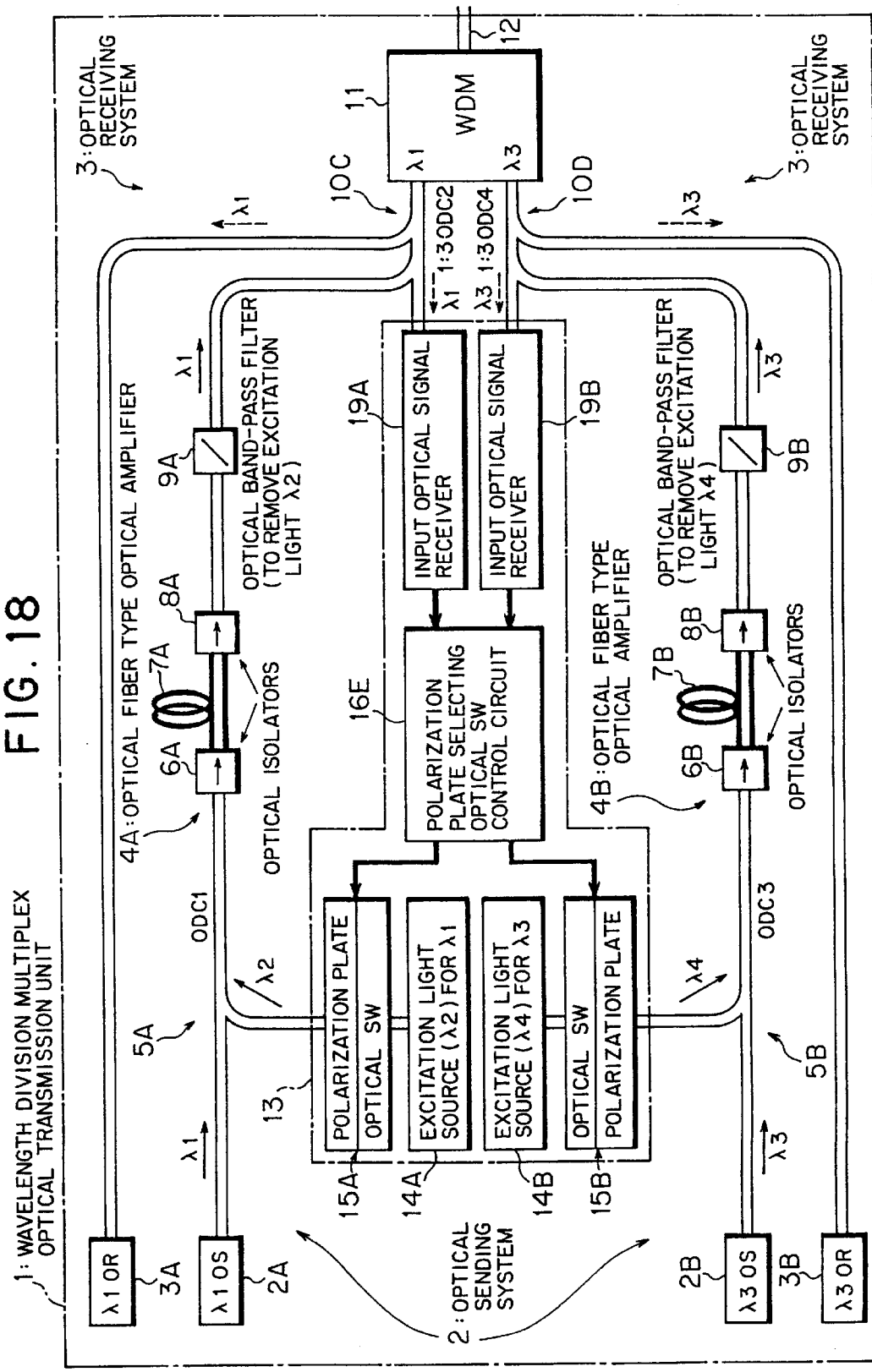
FIG. 18 is a block diagram showing a configuration of a wavelength division multiplex optical transmission apparatus serving as the second embodiment of the present invention.

FIG. 18 is a block diagram showing a configuration of a wavelength division multiplex optical transmission apparatus 1 serving as the second embodiment of the present invention. The transmission apparatus 1 shown in FIG. 18 is different from that shown in FIG. 1 in that one-to-three optical couplers 10C, 10D are provided to cause respective receive optical signals λ1, λ3 split in a WDM coupler 11 to additionally branch to an optical output level control section 13 instead of the optical couplers 10A, 10B, and the optical output level control section 13 includes an excitation light output level control circuit (polarization plate selecting optical switch control circuit) 16E instead of the excitation light output level control circuit (polarization plate selecting optical switch control circuit) 16A, and input optical signal receivers 19A, 19B. Moreover, it will be appreciated that excitation light level adjusting sections 15A, 15B respectively include polarization sections 151-i, and optical switches 152, 153 as in those shown in FIG. 2.

Here, the above input optical signal receiver (input signal light receiving section) 19A receives the receive optical signal λ1 which is transmitted from an opposite side through an optical transmission line 12 to be demultiplexed in the WDM coupler 11, and is subsequently caused to branch at the optical coupler 10A. The input optical signal receiver 19B similarly receives the receive optical signal λ3 demultiplexed in the WDM coupler 11, and is subsequently caused to branch at the optical coupler 10B.

Further, as in the control circuit 16A, the excitation light output level control circuit (excitation light output level operation control section) 16E finds optimal optical output levels P according to transmission distances (characteristics) of optical signals with the wavelengths λ1, λ3, and controls the excitation light output level adjusting sections 15A, 15B according to the optimal optical output levels P to adjust optical output levels of excitation light signals λ2, λ4. In the modification, the optimal optical output levels P are found depending upon the optical levels of the receive optical signals λ1, λ3 from the opposite side, received in the above input optical signal receivers 19A, 19B.

Figure 19:
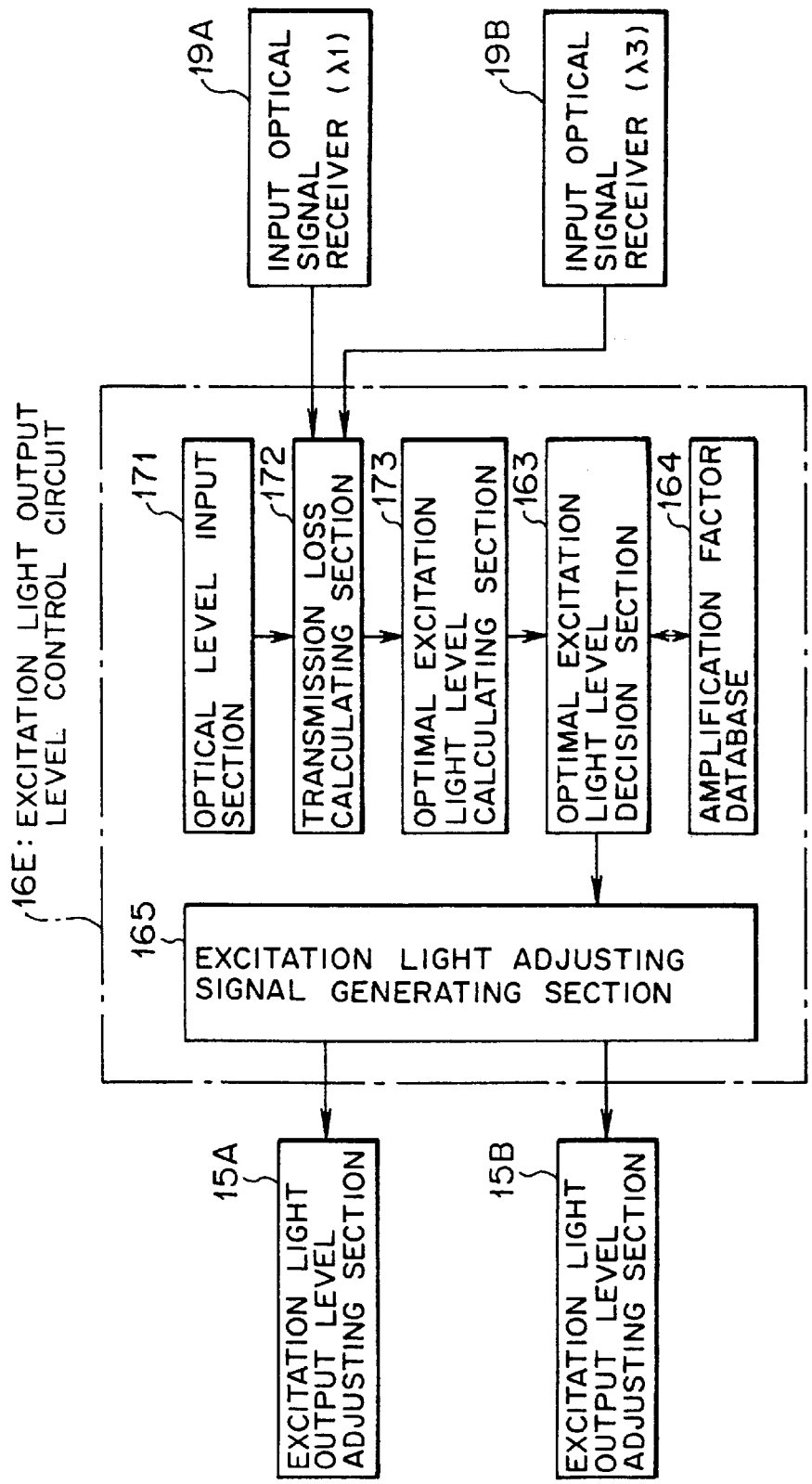
FIG. 19 is a block diagram showing a configuration of an excitation light output level control circuit in the second embodiment.

Hence, as shown in, for example, FIG. 19, the excitation light output level control circuit 16E of the second embodiment includes an optimal excitation light level decision section 163, an amplification factor database 164, and an excitation light adjusting signal generating section 165 iden- tical with those in the first embodiment, and further includes an optical level input section 171, a transmission loss calculating section 172, and an optimal excitation light level calculating section 173.

However, it is to be noted that, since the excitation light level adjusting sections 15A, 15B are respectively configured by using the polarization sections 151-i, and the optical switches 152, 153, the excitation light adjusting signal generating section 165 of the embodiment has an optical switch port decision section 166A, and optical switch control sections 167A, 168A identical with those shown in FIG. 6.

Here, for each of the wavelengths λ1, λ3, the optical level input section 171 takes as inputs various types of optical levels such as output signal optical level P at the opposite side, local excitation light output level PLY minimum receive level Prmin, and maximum receive level Prmax. The transmission loss calculating section (transmission loss operation section) 172 finds actual transmission losses (transmission loss information) $P_{LOSS}$ of the wavelengths λ1, λ3 actually transmitted from the opposite side through the optical transmission line 12 for a predetermined transmission distance depending upon the optical signals with the wavelengths λ1, λ3 received in the input optical signal receivers 19A, 19B. In the embodiment, the actual transmission losses $P_{LOSS}$ are found by subtracting the output signal optical levels $P_S$ at the opposite side from receive levels Pr' of the optical signals with the wavelengths λ1, λ3 received in the input signal receivers 19A, 19B.

Further, the optimal excitation light level calculating section (optimal optical output level operation section) 173 finds according to predetermined arithmetic operations optimal optical output levels P of the optical signals with the wavelengths λ1, λ3 depending upon the actual transmission losses $P_{LOSS}$ obtained in the transmission loss calculating section 172. In the embodiment, the optimal optical output level P is found by adding the above actual transmission loss $P_{LOSS}$ to the optimal receive level Pr[=(minimum receive level Prmin+maximum receive level Prmax)/2].

Figure 20:
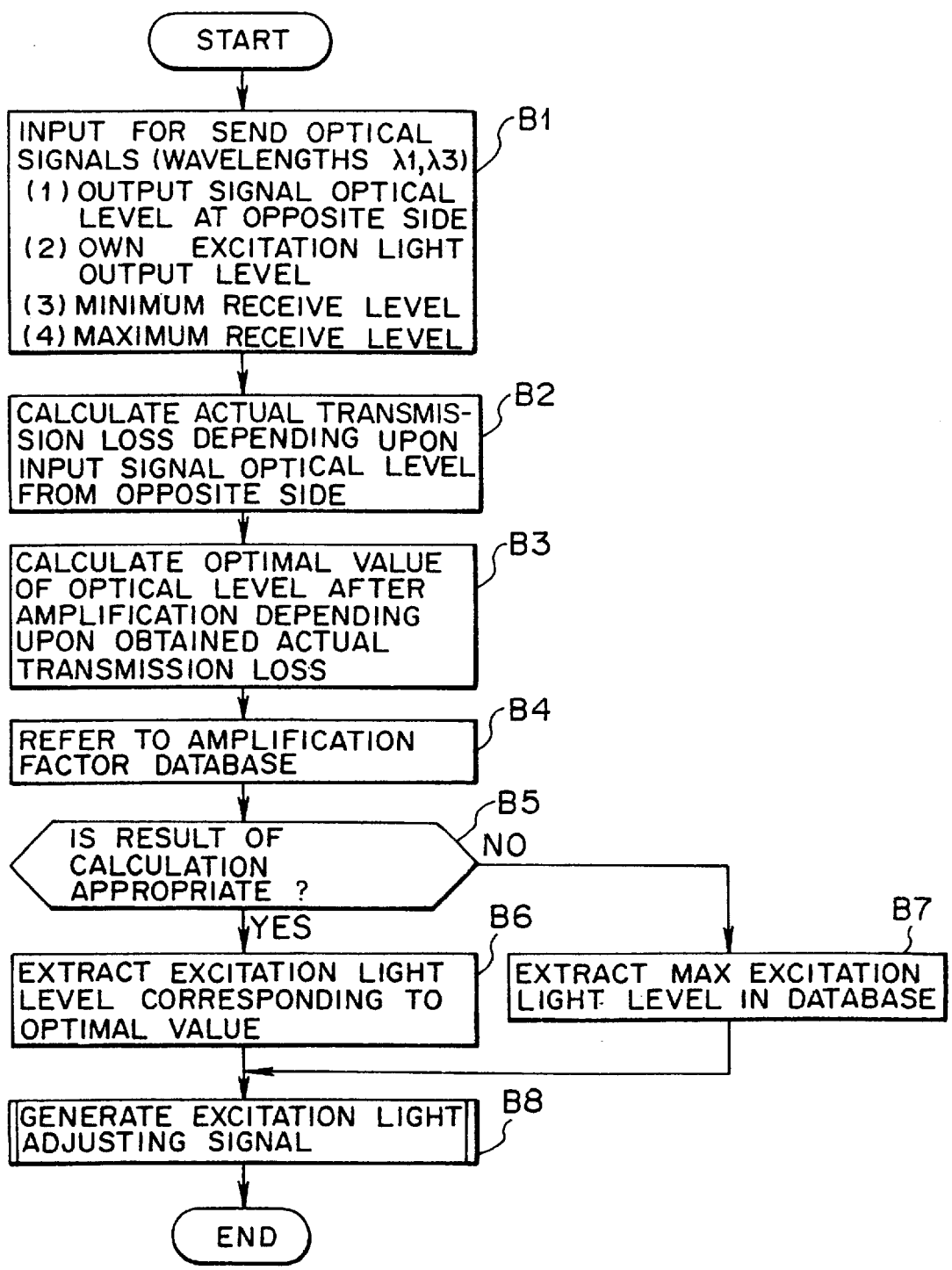
FIG. 20 is a flowchart for illustrating excitation light output level adjusting processing in the wavelength division multiplex optical transmission apparatus of the second embodiment.

That is, in the wavelength division multiplex optical transmission apparatus 1 of the second embodiment, the optimal optical output levels P are found for the send optical signals λ1, λ3 with consideration given to the actual transmission losses of the send optical signals λ1, λ3 due to states (such as loss) of the optical transmission line 12 so as to adjust the optical output levels of the excitation light signals λ2, λ4 generated in the excitation light sources 14A, 14B according to the optimal optical output levels P. Referring to the flowchart (Steps B1 to B8) shown in FIG. 20, a detailed description will now be given of an operation of the wavelength division multiplex optical transmission apparatus 1 of the second embodiment having the above configuration with attention to excitation light output level adjusting processing.

First, in the transmission apparatus 1, for each of the wavelengths λ1, λ3, the optical level input section 171 of the excitation light output level control circuit 16E takes as inputs the various types of optical levels described above (such as output signal optical level $P_S$ at the opposite side, local excitation light output level $P_L$, minimum receive level Prmin, and maximum receive level Prmax) through a maintenance terminal (Step B1). Subsequently, the transmission loss calculating section 172 finds the actual transmission losses $P_{LOSS}$ of the wavelengths λ1, λ3 by subtracting the output optical levels $P_S$ at the opposite side from the receive levels Pr' of the optical signals with the wavelengths λ1, λ3 received in the input optical signal receivers 19A, 19B (Step B2).

The obtained actual transmission losses $P_{LOSS}$ are passed to the optimal excitation light level calculating section 173. The optimal excitation light level calculating section 173 finds the optimal optical output levels P of the wavelengths λ1, λ3 by adding the above actual transmission losses $P_{LOSS}$ from the transmission loss calculating section 172 to the optimal receive levels Pr[=(minimum receive level Prmin+ maximum receive level Prmax)/2] of the optical signals with the wavelengths λ1, λ3 (Step B3).

The optimal optical output levels P of the respective send optical signals λ1, λ3 obtained in such a manner are given to the optimal excitation light level decision section 163. The optimal excitation light level decision section 163 refers to, with the given optimal optical output levels P as keys, amplification factor correspondence tables 164a (see FIG. 5) contained in the amplification factor database 164 to correspond to the wavelengths λ1, λ3 (Step B4), and decides whether or not the obtained optimal optical output levels P are appropriate values [whether or not the optimal optical output levels P are present (recorded) in the items "Optical level after amplification"] (Step B5).

As a result, if the optimal optical output levels P, the appropriate values, are recorded in the amplification factor correspondence tables 164a (if a decision of YES is given in Step B5), the optimal excitation light level decision section 163 extracts excitation light levels (optimal excitation light levels) corresponding to the optimal optical output levels P (Step B6).

On the other hand, if the optimal optical output levels P are not the appropriate values (if not recorded in the amplification factor correspondence tables 164a), for example, optical receive levels cannot be set to intermediate values between the maximum receive levels Prmax and the minimum receive levels Prmin due to, for example, long transmission distances even when the maximum amplification factors are provided in the optical amplifiers 4A, 4B. In this case, the optimal excitation light level decision section 163 extracts excitation light levels (maximum excitation light levels) providing the maximum optical levels after amplification from the amplification factor correspondence tables 164a so as to set the optical receive levels closer to the intermediate values (from No route in Step B5 to Step B7).

Subsequently, both the excitation light levels extracted in such a manner are passed to the excitation light adjusting signal generating section 165 as the optimal excitation light levels (Step B8). Then, as in the first embodiment, the excitation light adjusting signal generating section 165 selects the polarization sections 151-i to pass the excitation light signals λ1, λ3 therethrough, and controls the optical switches 152, 153 such that the excitation light signals λ1, λ3 can pass through the selected polarization sections 151-i (see Steps A8 to A10 in FIG. 8).

This controls to optimal excitation light levels the optical output levels of the respective excitation light signals λ2, λ4 from the excitation light sources 14A, 14B with consideration given to the actual transmission losses $P_{LOSS}$ of the send optical signals λ1, λ3. The respective send optical signals λ1, λ3 are amplified in the optical amplifiers 4A, 4B to the optimal optical output levels according to the transmission distances of the optical signals with the wavelengths λ1, λ3 and the loss of the optical transmission line 12, and are sent to the optical transmission line 12.

As stated above, according the wavelength division multiplex optical transmission apparatus 1 of the second embodiment, the optimal optical output levels P for the respective send optical signals λ1, λ3 are found according to the arithmetic operations depending upon the actual transmission losses $P_{LOSS}$ of the optical signals with the wavelengths λ1, λ3 actually transmitted through the optical transmission line 12. The optical output levels of the respective excitation light signals λ2, λ4 are adjusted depending upon the obtained optimal optical output levels P. Consequently, it is possible to adjust the optical output levels of the send optical signals λ1, λ3 with consideration given to the actual state (such as loss) of the optical transmission line 12, and adjust the optical output levels of the send optical signals λ1, λ3 to the optimal values more accurately than would be in the first embodiment.

Moreover, in the above-mentioned second embodiment as in the first embodiment, the optical output levels of the excitation light signals λ2, λ4 generated in the respective excitation light sources 14A, 14B are adjusted by the polarization sections 151-i, and the optical switches 152, 153. Thus, it is possible to adjust the optical levels of the send optical signals λ1, λ3 after the optical amplification to the optimal optical levels at a very high speed.

(B1) Description of First Modification of Second Embodiment

Figure 21:
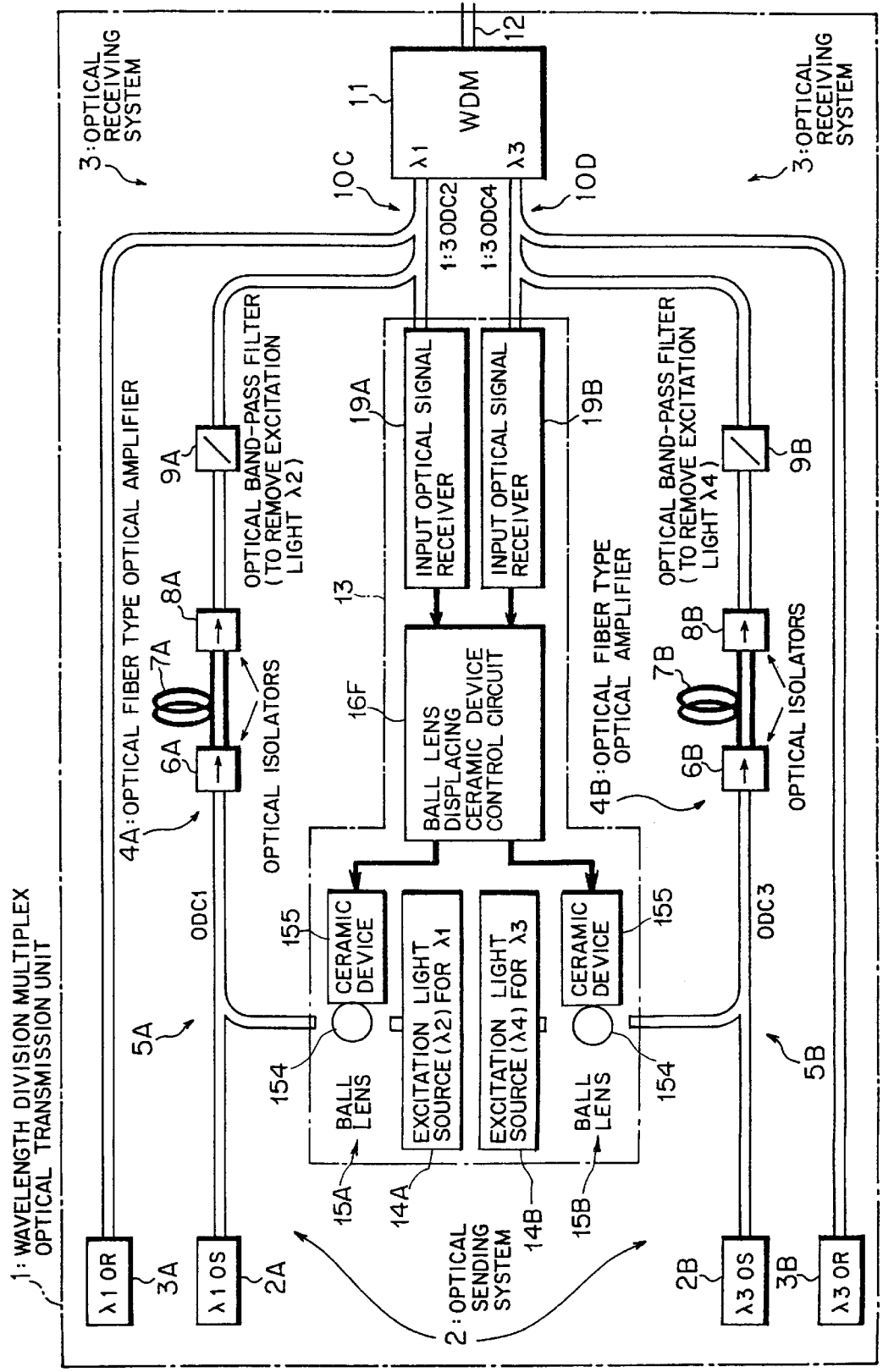
FIG. 21 is a block diagram showing a configuration of a wavelength division multiplex optical transmission apparatus serving as a first modification of the second embodiment.

FIG. 21 is a block diagram showing a configuration of a wavelength division multiplex optical transmission apparatus 1 serving as a first modification of the second embodiment. The transmission apparatus 1 shown in FIG. 21 is different from that shown in FIG. 18 in that excitation light output level adjusting sections 15A, 15B are respectively configured by using the ball lenses 154 and the ceramic devices 155 described in the above first modification (see FIG. 9) of the first embodiment, and an excitation light output level control circuit (ball lens displacing ceramic device control circuit) 16F is provided instead of the excitation light output level control circuit 16E.

Here, the above ball lens displacing ceramic device control circuit 16F basically has the same configuration as that shown in FIG. 19. However, since the excitation light output level adjusting sections 15A, 15B are respectively configured by using the ball lenses 154 and the ceramic devices 155, an excitation light adjusting signal generating section 165 includes a ball lens displacement decision section 166B, ceramic device applied voltage control sections 167B, 168B, and a ball lens displacement-ceramic device applied voltage database 169B identical with those shown in FIG. 10.

That is, in the wavelength division multiplex optical transmission apparatus 1 in the first modification of the second embodiment, the optical output levels of the excitation light signals λ2, λ4 generated in the respective excitation light sources 14A, 14B are respectively adjusted by the ball lenses 154 and the ceramic devices 155 in an optical output level control section 13 of the type finding optimal optical output levels P of respective send optical signals λ1, λ3 by the arithmetic operations depending upon actual transmission losses $P_{LOSS}$ of wavelengths λ1, λ3.

Accordingly, in Step B8 described above referring to FIG. 20, excitation light output level adjusting processing of the transmission apparatus 1 in the modification is identical with the processing from Steps A11 to A13 described above referring to FIG. 11. That is, the control circuit 16F first finds the optimal optical output levels P with consideration given to the actual transmission losses $P_{LOSS}$ of the optical signals with the wavelengths λ1, λ3, and determines the optimal excitation light levels according to the obtained optimal optical output levels P to pass the optimal excitation light levels to the excitation light adjusting signal generating section 165 (see Steps B1 to B8 in FIG. 20).

Subsequently, as in the first modification of the first embodiment, the excitation light adjusting signal generating section 165 finds positional displacements of the ball lenses 154, corresponding to the optimal excitation light levels input from the optimal excitation light level decision section 163. The positional displacements are converted into values of applied voltages to the ceramic devices 155, and the voltages are applied to the ceramic devices 155. This varies focus positions of the excitation light signals λ2, λ4 on the ball lenses 154 to adjust the optical output levels of the respective excitation light signals λ2, λ4 from the excitation light sources 14A, 14B to the above optimal excitation light levels (see Steps A11 to A13 in FIG. 11).

As a result, as in the above-mentioned second embodiment, the respective send optical signals λ1, λ3 are amplified in the optical amplifiers 4A, 4B to the optimal optical output levels according to transmission distances of the optical signals with the respective wavelengths λ1, λ3 and a loss of an optical transmission line 12, and are sent to the optical transmission line 12.

As described above, according to the wavelength division multiplex optical transmission apparatus 1 in the first modification of the second embodiment, the controls of the applied voltages to the ceramic devices 155 of the excitation light output level adjusting sections 15A, 15B vary the focus positions (refractive indexes) of the excitation light signals λ2, λ4 on the ball lenses 154. Therefore, it is possible to vary the optical output levels of the excitation light signals λ2, λ4 in an analog manner, and adjust the optical output levels of the excitation light signals λ2, λ4 more precisely than would be in the above-mentioned second embodiment.

(B2) Description of Second Modification of Second Embodiment

Figure 22:
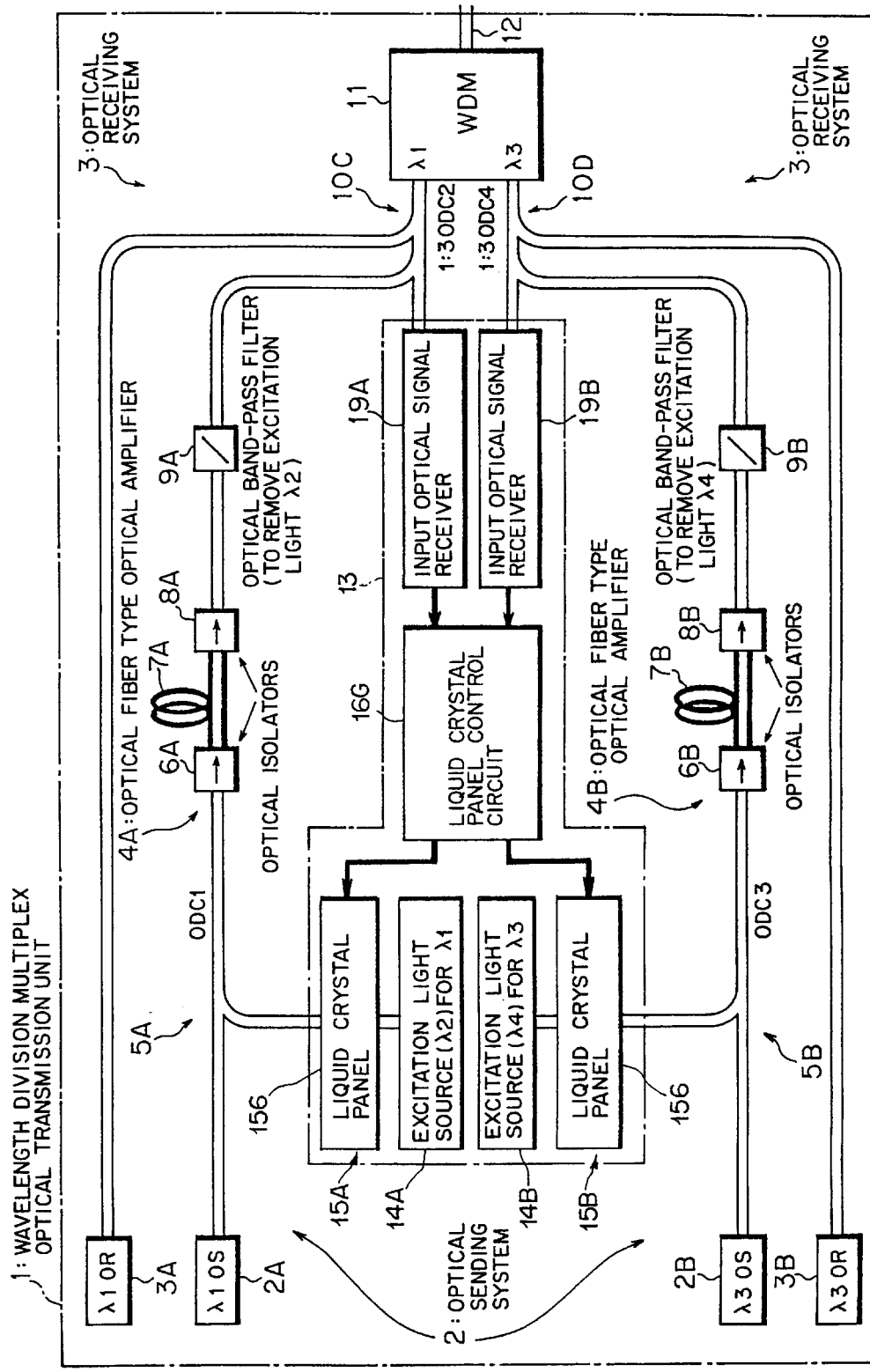
FIG. 22 is a block diagram showing a configuration of a wavelength division multiplex optical transmission apparatus serving as a second modification of the second embodiment.

FIG. 22 is a block diagram showing a configuration of a wavelength division multiplex optical transmission apparatus 1 serving as a second modification of the second embodiment. The transmission apparatus 1 shown in FIG. 22 is different from that shown in FIG. 18 in that excitation light output level adjusting sections 15A, 15B are respectively configured by using the liquid crystal panels 156 described in the second modification (see FIG. 12) of the first embodiment, and an excitation light output level control circuit (liquid crystal panel control circuit) 16G is provided instead of the excitation light output level control circuit 16E.

Here, the above liquid crystal panel control circuit 16G basically has the same configuration as that shown in FIG. 19. However, since the excitation light output level adjusting sections 15A, 15B are respectively configured by using the liquid crystal panels 156, an excitation light adjusting signal generating section 165 includes a liquid crystal panel applied voltage decision section 166C, liquid crystal panel applied voltage control sections 167C, 168C, and a liquid crystal panel applied voltage database 169C identical with those shown in FIG. 13.

That is, in the wavelength division multiplex optical transmission apparatus 1 in the second modification of the second embodiment, the optical output levels of the excitation light signals λ2, λ4 generated in the respective excitation light sources 14A, 14B are respectively adjusted by the liquid crystal panels 156 in an optical output level control section 13 of the type finding optimal optical output levels P of respective send optical signals λ1, λ3 by arithmetic operations depending upon actual transmission losses $P_{LOSS}$ of wavelengths λ1, λ3.

Accordingly, in Step B8 described above referring to FIG. 20, excitation light output level adjusting processing of the transmission apparatus 1 in the modification is identical with the processing from Steps A14 to A16 described above referring to FIG. 14. That is, the control circuit 16G first finds the optimal optical output levels P with consideration given to the actual transmission losses $P_{LOSS}$ of the optical signals with the wavelengths λ1, λ3, and determines the optimal excitation light levels according to the obtained optimal optical output levels P to pass the optimal excitation light levels to the excitation light adjusting signal generating section 165 (see Steps B1 to B8 in FIG. 20).

Subsequently, as in the second modification of the first embodiment, the excitation light adjusting signal generating section 165 finds applied voltages to the liquid crystal panels 156, corresponding to the optimal excitation light levels input from the optimal excitation light level decision section 163 so as to apply the applied voltages to the respective liquid crystal panels 156. This varies light transmittances of the liquid crystal panels to adjust the optical output levels of the excitation light signals λ2, λ4 from the excitation light sources 14A, 14B to the above optimal excitation light levels (see Steps A14 to A16 in FIG. 14).

As a result, as in the above-mentioned second embodiment, the respective send optical signals 1, λ3 are amplified in the optical amplifiers 4A, 4B to the optimal optical output levels according to transmission distances of the optical signals with the respective wavelengths λ1, λ3 and a loss of an optical transmission line 12, and are sent to the optical transmission line 12.

As described above, in the wavelength division multiplex optical transmission apparatus 1 in the second modification of the second embodiment, the variations in voltages applied to the liquid crystal panels 156 of the excitation light output level adjusting sections 15A, 15B can adjust the optical output levels of the excitation light signals λ2, λ4. Therefore, it is possible to vary the optical output levels of the excitation light signals λ2, λ4 in an analog manner, and adjust the optical output levels of the excitation light signals λ2, λ4 more precisely in a simpler configuration than would be in the above-mentioned second embodiment.

(B3) Description of Third Modification of Second Embodiment

Figure 23:
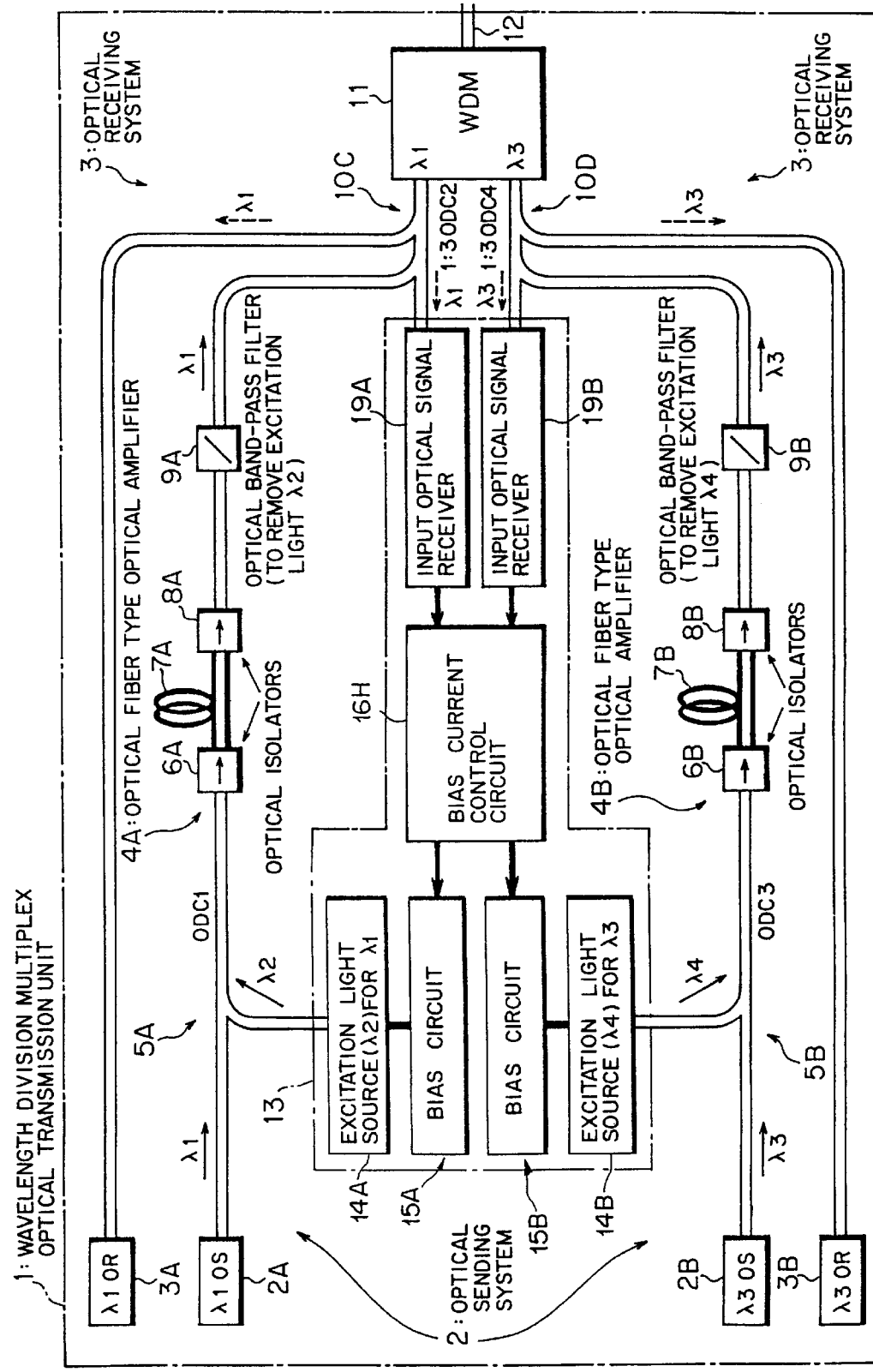
FIG. 23 is a block diagram showing a configuration of a wavelength division multiplex optical transmission apparatus serving as a third modification of the second embodiment.

FIG. 23 is a block diagram showing a configuration of a wavelength division multiplex optical transmission apparatus 1 serving as a third modification of the second embodiment. The transmission apparatus 1 shown in FIG. 23 is different from that shown in FIG. 18 in that excitation light output level adjusting sections 15A, 15B are respectively configured by using the bias circuits 157 described in the third modification (see FIG. 15) of the first embodiment, and an excitation light output level control circuit (bias current control circuit) 16H is provided instead of the excitation light output level control circuit 16E.

Here, the above bias current control circuit 16H basically has the same configuration as that shown in FIG. 19. However, since the excitation light output level adjusting sections 15A, 15B are respectively configured by using the bias circuits 157, an excitation light adjusting signal generating section 165 includes a bias current decision section 166D, bias circuit control sections 167D, 168D, and a bias current database 169D identical with those shown in FIG. 16.

That is, in the wavelength division multiplex optical transmission apparatus 1 in the third modification of the second embodiment, the optical output levels of the excitation light signals λ2, λ4 generated in the excitation light sources 14A, 14B are respectively adjusted by the bias circuits 157 in an optical output level control section 13 of the type finding optimal optical output levels P of respective send optical signals λ1, λ3 by arithmetic operations depending upon actual transmission losses $P_{LOSS}$ of wavelengths λ1, λ3.

Accordingly, in Step B8 described above referring to FIG. 20, excitation light output level adjusting processing of the transmission apparatus 1 in the modification is identical with the processing from Steps A17 to A19 described above referring to FIG. 17. That is, the control circuit 16H first finds the optimal optical output levels P with consideration given to the actual transmission losses $P_{LOSS}$ of the optical signals with the wavelengths λ1, λ3, and determines the optimal excitation light levels according to the obtained optimal optical output levels P so as to pass the optimal excitation light levels to the excitation light adjusting signal generating section 165 (see Steps B1 to B8 in FIG. 20).

Subsequently, as in the third modification of the first embodiment, the excitation light adjusting signal generating section 165 finds values of bias currents to the bias circuits 157, corresponding to the optimal excitation light levels input from the optimal excitation light level decision section 163 so as to feed the bias currents to the respective bias circuits 157. This varies amounts of bias currents from the bias circuits 157 to the respective excitation light sources 14A, 14B, thereby adjusting the optical output levels of the excitation light signals λ2, λ4 generated in the excitation light sources 14A, 14B to the above optimal excitation light levels (see Steps A17 to A19 in FIG. 17).

As a result, as in the above-mentioned second embodiment, the respective send optical signals λ1, λ3 are amplified in the optical amplifiers 4A, 4B to the optimal optical output levels according to transmission distances of the optical signals with the respective wavelengths λ1, λ3 and a loss of an optical transmission line 12, and are sent to the optical transmission line 12.

As described above, in the wavelength division multiplex optical transmission apparatus 1 in the third modification of the second embodiment, the excitation light output level adjusting sections 15A, 15B are respectively configured as the bias circuits 157 which can vary the amounts of currents fed to the excitation light sources 14A, 14B. Therefore, it is possible to vary the optical output levels of the excitation light signals λ2, λ4 generated in the excitation light sources 14A, 14B directly and in an analog manner, and adjust the optical output levels of the excitation light signals λ2, λ4 more accurately and more precisely than would be in the second embodiment.

(C) Description of Third Embodiment

Figure 24:
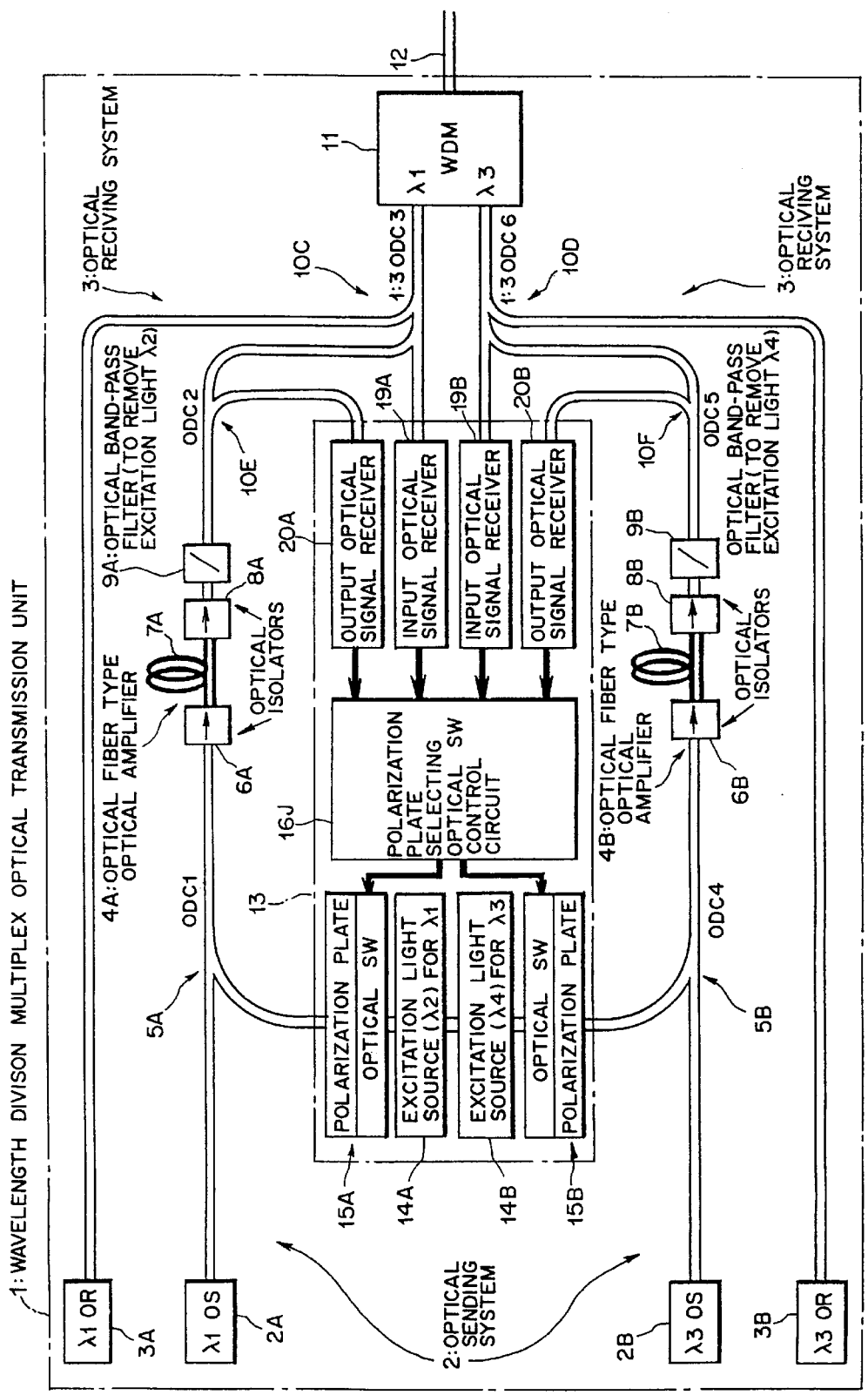
FIG. 24 is a block diagram showing a configuration of a wavelength division multiplex optical transmission apparatus serving as the third embodiment of the present invention.

FIG. 24 is a block diagram showing a configuration of a wavelength division multiplex optical transmission apparatus 1 serving as the third embodiment of the present invention. The transmission apparatus 1 shown in FIG. 24 is different from that shown in FIG. 18 of the second embodiment in that optical couplers 10E, 10F are mounted to output terminals of respective optical amplifiers 4A, 4B, and an optical output level control section 13 includes an excitation light output level control circuit (polarization plate selecting optical switch control circuit) 16J instead of the excitation light output level control circuit (polarization plate selecting optical switch control circuit) 16E, and output optical signal receivers 20A, 20B. Moreover, it will be appreciated that excitation light output level adjusting sections 15A, 15B respectively include polarization sections 151-i, and optical switches 152, 153 as in those shown in FIG. 2.

Here, the above optical couplers 10E, 10F cause send optical signals λ1, λ3 respectively amplified in the optical amplifiers 4A, 4B to branch to the side of a WDM coupler 11 and the side of the optical output level control section 13. The output optical signal receivers (output signal light receiving sections) 20A, 20B respectively receive the receive optical signals λ1, λ3 caused to branch at the corresponding optical couplers 10E, 10F (parts of the respective send optical signals λ1, λ3 to be output to an optical transmission line 12 through the WDM coupler 11 after amplification in the optical amplifiers 4A, 4B).

Further, as in the control circuit 16E in the second embodiment, the excitation light output level control circuit (excitation light output level operation control section) 16J finds optimal optical output levels P according to transmission distances (characteristics) of optical signals with wavelengths λ11, λ3 with consideration given to actual transmission losses $P_{LOSS}$ of the optical signals with the respective wavelengths λ1, λ3, and controls the excitation light output level adjusting sections 15A, 15B according to the optimal optical output levels P to adjust optical output levels of excitation light signals λ2, λ4. In the modification, the optimal optical output levels P are corrected depending upon the optical levels of the send optical signals λ1, λ3 after the optical amplification, received in the above output optical signal receivers 20A, 20B.

Figure 25:
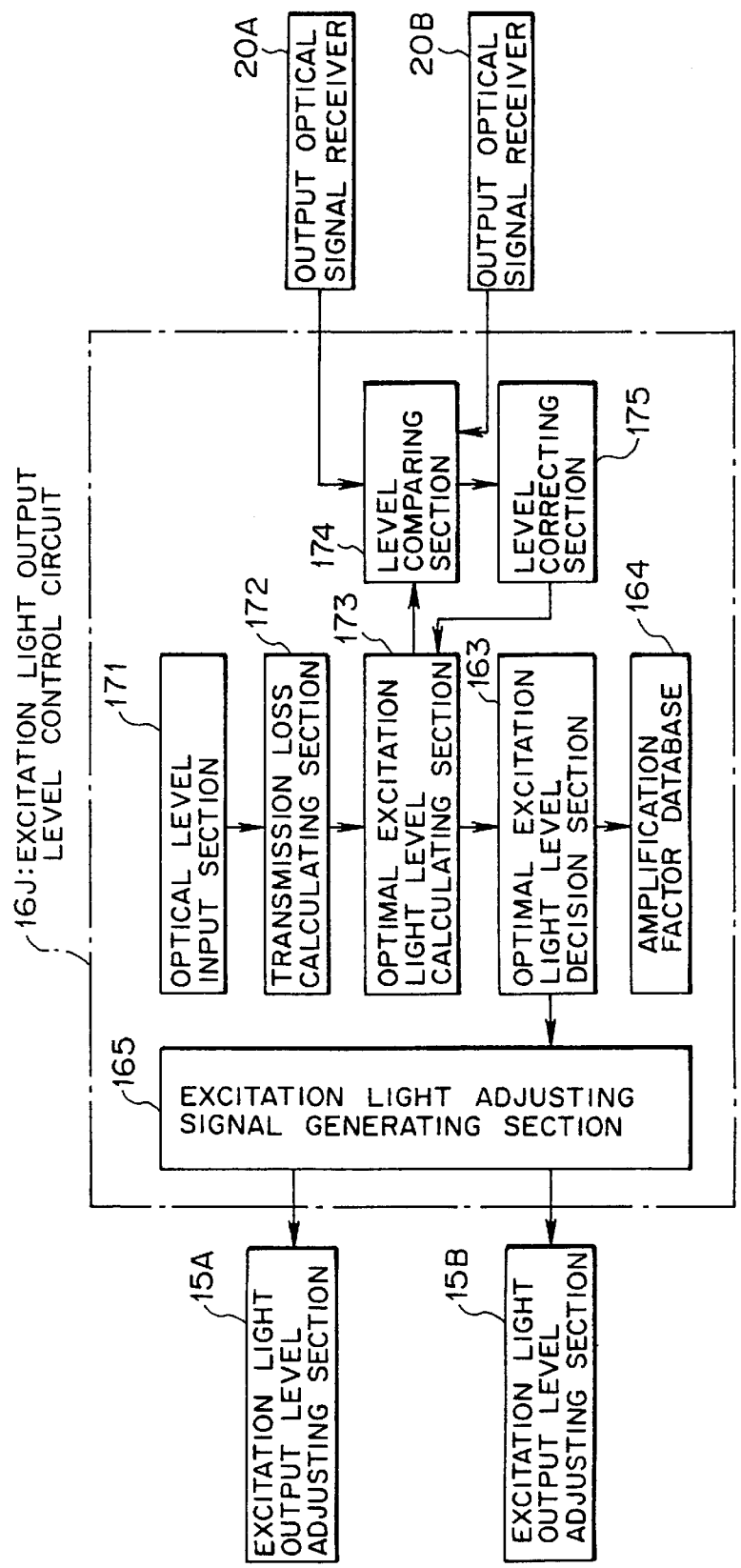
FIG. 25 is a block diagram showing a configuration of an excitation light output level control circuit in the third embodiment.

Hence, as shown in, for example, FIG. 25, the excitation light output level control circuit 16J of the third embodiment includes an optical level input section 171, a transmission loss calculating section 172, and an optimal excitation light level calculating section 173 identical with those described in the second embodiment, an optimal excitation light level decision section 163, an amplification factor database 164, and an excitation light adjusting signal generating section 165 identical with those described in the first embodiment, and further includes a level comparing section 174, and a level correcting section 175.

However, it is to be noted that, since the excitation light level adjusting sections 15A, 15B are respectively configured by using the polarization sections 151-i, and the optical switches 152, 153, the excitation light adjusting signal generating section 165 of the embodiment includes an optical switch port decision section 166A, and optical switch control sections 167A, 168A identical with those shown in FIG. 6.

Here, the above level comparing section 174 compares the optimal optical output levels P of the respective send optical signals λ1, λ3, calculated in the optimal excitation light level calculating section 173 with optical levels of the send optical signals λ1, λ3 after actual optical amplification, respectively received in the output optical signal receivers 20A, 20B. If errors are caused between the above optical levels as a result of comparison in the level comparing section 174, the level correcting section 175 causes the optimal excitation light level calculating section 173 to recalculate the optimal optical output level P so as to minimize the errors, resulting in correcting generation processing for the excitation light adjusting signals in the excitation light adjusting signal generating section 165.

That is, as in the second embodiment, when the optical levels of the excitation light signals λ2, λ4 are adjusted such that the optical levels of the send optical signals λ1, λ3 after optical amplification become the optimal optical output levels P with consideration given to actual transmission losses $P_{LOSS}$, the optical output level control section 13 of the third embodiment monitors whether or not the optical levels of the send optical signals λ1, λ3 after optical amplification actually become the optimal optical output levels P by the output optical signal receivers 20A, 20B receiving the parts of the send optical signals λ1, λ3 after optical amplification. If the optical levels of the send optical signals λ1, λ3 after optical amplification are deviated from the optimal optical output levels P obtained according the calculations, the optical output level control section 13 corrects the deviations.

Referring to the flowchart (Steps C1 to C11) shown in FIG. 26, a detailed description will now be given of an operation of the wavelength division multiplex optical transmission apparatus 1 of the third embodiment having the above configuration with attention to excitation light output level adjusting processing. However, processing in Steps C1 to C8 are identical with those in Steps B1 to B8 described above referring to FIG. 20 of the second embodiment, and descriptions thereof are omitted. A description will be directed to processing after the excitation light adjusting signal generation processing (that is, after the optical output levels of the excitation light signals $\lambda 2$, $\lambda 4$ are adjusted to the optimal excitation light levels).

That is, the excitation light adjusting signal generating section 165 generates excitation light adjusting signals to respectively control the excitation light output level adjusting sections 15A, 15B so as to adjust the optical output levels of the excitation light signals $\lambda 2$, $\lambda 4$ to the optimal excitation light levels (Step C8). Subsequently, in the excitation light output level control circuit 16J, the level comparing section 174 compares the optimal optical output levels P for the respective wavelengths $\lambda 1$, $\lambda 3$, found in the optimal excitation light level calculating section 173 with optical levels of the send optical signals $\lambda 1$, $\lambda 3$ after optical amplification, received in the output optical signal receivers 20A, 20B (Step C9).

As a result, if both the optical levels are identical, i.e., no errors are caused between the optical levels (if a decision of NO is given in Step C10), output of the optimal optical output levels P at the point in time are maintained in the optimal excitation light level calculating section 173, and the excitation light adjusting signal generating section 165 continues generation of the same excitation light adjusting signals as those one time before such that the excitation light signals $\lambda 2$, $\lambda 4$ can respectively have the same optimal excitation light levels as those one time before.

On the other hand, if the errors are caused between the respective optical levels (if a decision of YES is given in Step C10), the level correcting section 175 instructs the optimal excitation light level calculating section 173 to recalculate the optimal optical output levels P, thereby causing the optimal excitation light level calculating section 173 to recalculate the optimal optical output levels P so as to set the respective optical level errors to zeros (Step C11).

Further, the optimal optical output levels P found by the recalculations are passed to the optimal excitation light level decision section 163 once again, and the optimal excitation light level decision section 163 extracts the optimal excitation light levels corresponding to the optimal optical output levels P from amplification factor correspondence tables 164a (see FIG. 5) of the amplification factor database 164 to output the extracted optimal excitation light levels to the excitation light adjusting signal generating section 165 (Step C8).

Subsequently, the excitation light adjusting signal generating section 165 reselects the polarization sections 151-i to pass the excitation light signals $\lambda 1$, $\lambda 3$ therethrough, and controls the optical switches 152, 153 such that the excitation light signals $\lambda 1$, $\lambda 3$ can pass through the polarization sections 151-i (see Steps A8 to A10 in FIG. 8). This corrects the optical output levels of the respective excitation light signals $\lambda 2$, $\lambda 4$ generated in the respective excitation light sources 14A, 14B. The respective send optical signals $\lambda 1$, $\lambda 3$ are sent to the optical transmission line 12 at the corrected optimal optical output levels.

Moreover, if, after the correction, errors are left between the optimal optical output levels P and the optical levels of the send optical signals $\lambda 1$, $\lambda 3$ after optical amplification, the above correction processing is repeated until the errors become zeros (or approximately zeros).

As stated above, according the wavelength division multiplex optical transmission apparatus 1 of the third embodiment, if the errors are caused between the optimal optical output levels P found by the calculations and the optical levels of the send optical signals $\lambda 1$, $\lambda 3$ after optical amplification, adjustments of the excitation light levels are corrected so as to set the errors to zeros. Consequently, even when the optical levels of the respective send optical signals $\lambda 1$, $\lambda 3$ are varied due to the characteristics of the optical amplifiers 4A, 4B, disturbance, and so forth, it is possible to continuously stabilize the optical levels of the respective send optical signals $\lambda 1$, $\lambda 3$ at the optimal levels while following the variations. Thus, it is possible to provide an advantage of significantly enhanced performance of the transmission apparatus 1 as well as the same advantages as those in the second embodiment.

Additionally, in the third embodiment, the optical switches 152, 153 of the excitation light output level adjusting sections 15A, 15B are controlled by the electric signals, thereby selecting the polarization sections 151-i to pass the excitation light signals $\lambda 2$, $\lambda 4$ therethrough. Hence, it is possible to adjust the optical levels of the send optical signals $\lambda 1$, $\lambda 3$ after optical amplification to the optimal optical levels at a very high speed.

(C1) Description of First Modification of Third Embodiment

Figure 27:
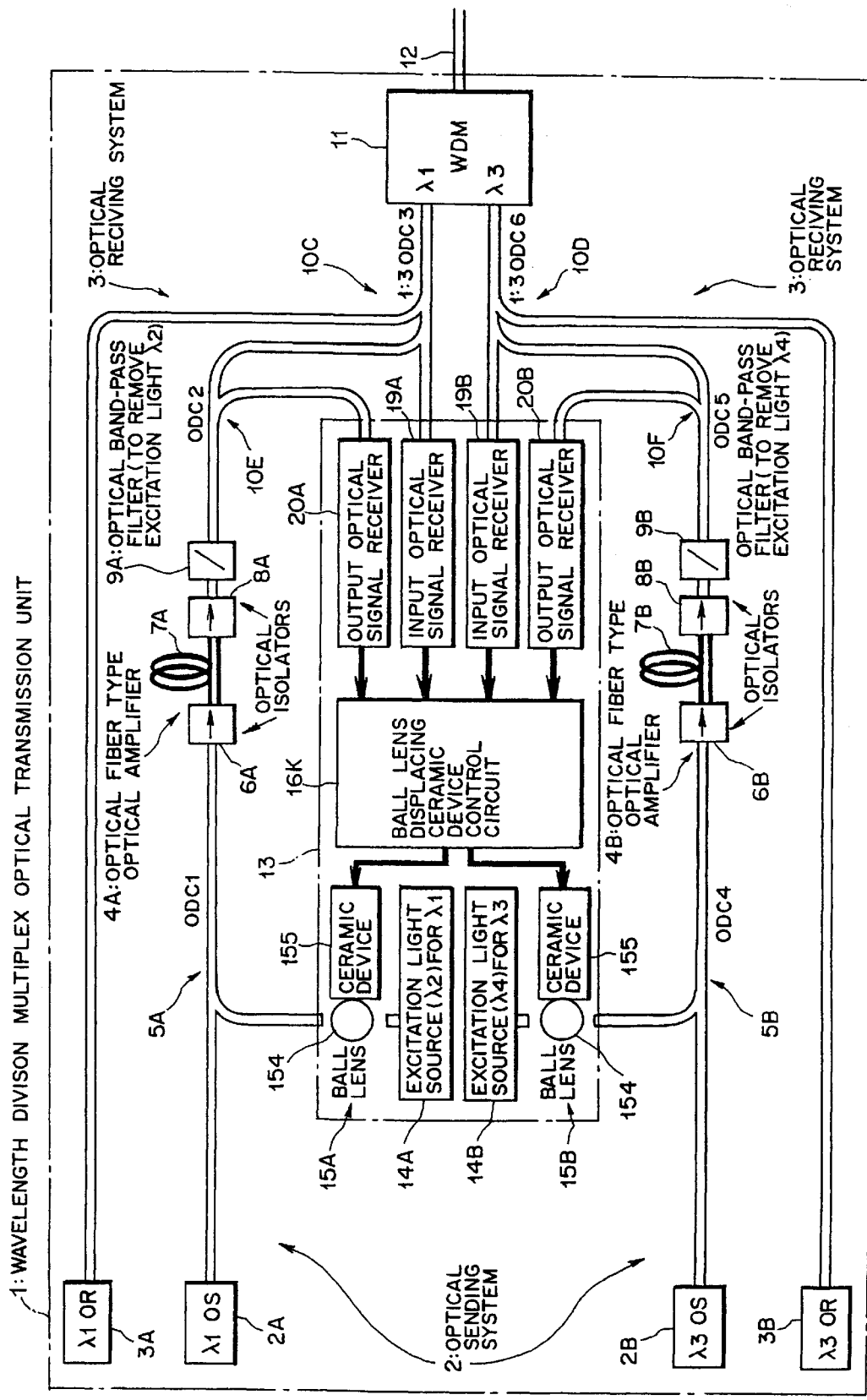
FIG. 27 is a block diagram showing a configuration of a wavelength division multiplex optical transmission apparatus serving as a first modification of the third embodiment.

FIG. 27 is a block diagram showing a configuration of a wavelength division multiplex optical transmission apparatus 1 serving as a first modification of the third embodiment. The transmission apparatus 1 shown in FIG. 27 is different from that shown in FIG. 24 in that excitation light output level adjusting sections 15A, 15B are respectively configured by using the ball lenses 154 and the ceramic devices 155 described in the above first modification (see FIG. 9) of the first embodiment, and an excitation light output level control circuit (ball lens displacing ceramic device control circuit) 16K is provided instead of the excitation light output level control circuit 16J.

Here, the above ball lens displacing ceramic device control circuit 16K basically has the same configuration as that shown in FIG. 25. However, since the excitation light output level adjusting sections 15A, 15B are respectively configured by using the ball lenses 154 and the ceramic devices 155, an excitation light adjusting signal generating section 165 includes a ball lens displacement decision section 166B, ceramic device applied voltage control sections 167B, 168B, and a ball lens displacement-ceramic device applied voltage database 169B identical with those shown in FIG. 10.

That is, in the wavelength division multiplex optical transmission apparatus 1 in the first modification of the third embodiment, optical output levels of excitation light signals $\lambda 2$, $\lambda 4$ generated in the excitation light sources 14A, 14B are respectively adjusted by the ball lenses 154 and the ceramic devices 155 in an optical output level control section 13 of the type correcting optimal optical output levels P calculated depending upon actual transmission losses $P_{LOSS}$ of wavelengths $\lambda 1$, $\lambda 3$ according to optical levels of send optical signals $\lambda 1$, $\lambda 3$ after actual optical amplification.

Accordingly, in Step C8 described above referring to FIG. 26, excitation light output level adjusting processing of the transmission apparatus 1 in the modification is identical with the processing from Steps A11 to A13 described above referring to FIG. 11. That is, the control circuit 16K first finds the optimal optical output levels P with consideration given to the actual transmission losses $P_{LOSS}$ of the optical signals with the wavelengths λ1, λ3, and determines optimal excitation light levels according to the obtained optimal optical output levels P so as to pass the optimal excitation light levels to the excitation light adjusting signal generating section 165 (see Steps C1 to C8 in FIG. 25).

Subsequently, as in the first modification of the first embodiment, the excitation light adjusting signal generating section 165 finds positional displacements of the ball lenses 154, corresponding to the optimal excitation light levels input from the optimal excitation light level decision section 163. The positional displacements are converted into values of applied voltages to the ceramic devices 155, and the voltages are applied to the ceramic devices 155. This varies focus positions of the excitation light signals λ2, λ4 on the ball lenses 154 to adjust the optical output levels of the respective excitation light signals λ2, λ4 from the excitation light sources 14A, 14B to the above optimal excitation light levels (see Steps A11 to A13 in FIG. 11).

As a result, the respective send optical signals λ1, λ3 are amplified in the optical amplifiers 4A, 4B to the optimal optical output levels according to transmission distances of the optical signals with the respective wavelengths λ1, λ3 and a loss of an optical transmission line 12, and are sent to the optical transmission line 12.

Figure 26:
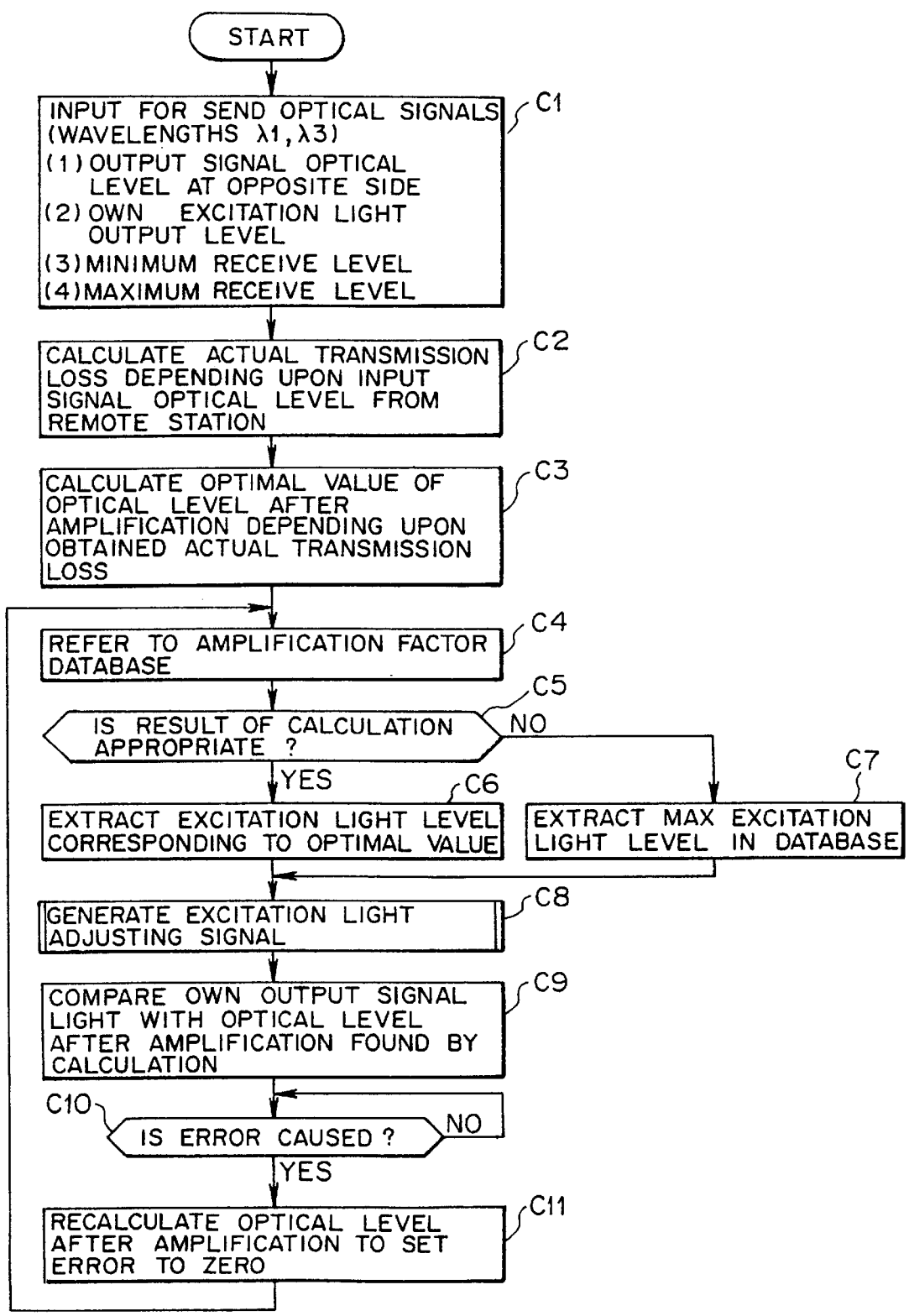
FIG. 26 is a flowchart for illustrating excitation light output level adjusting processing in the wavelength division multiplex optical transmission apparatus of the third embodiment.

At the point in time, if errors are caused between the optimal optical output levels P found by the calculations and the optical levels of the send optical signals λ1, λ3 after actual optical amplification, received in output optical signal receivers 20A, 20B, as in the above-mentioned third embodiment, the optimal optical output levels P are recalculated in the optimal excitation light level calculating section 173 so as to set the errors to zeros, thereby correcting the optimal excitation light levels (see Steps C10, C11 in FIG. 26).

As described above, according to the wavelength division multiplex optical transmission apparatus 1 in the first modification of the third embodiment, the controls of the voltages applied to the ceramic devices 155 of the excitation light output level adjusting sections 15A, 15B vary the focus positions (refractive indexes) of the excitation light signals λ2, λ4 on the ball lenses 154. Therefore, it is possible to vary the optical output levels of the excitation light signals λ2, λ4 in an analog manner, and adjust the optical output levels of the excitation light signals λ2, λ4 more precisely than would be in the above-mentioned third embodiment.

(C2) Description of Second Modification of Third Embodiment

Figure 28:
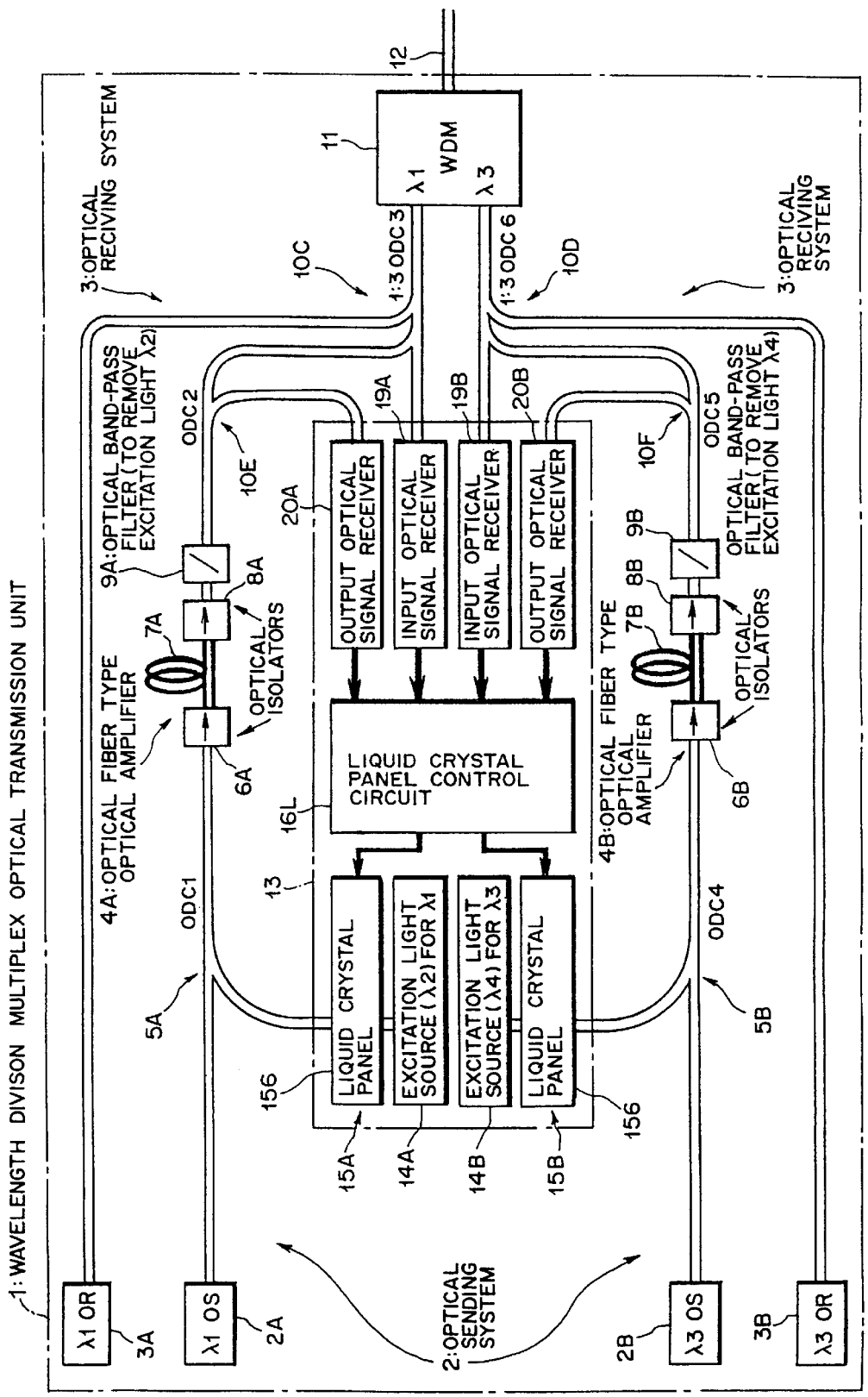
FIG. 28 is a block diagram showing a configuration of a wavelength division multiplex optical transmission apparatus serving as a second modification of the third embodiment.

FIG. 28 is a block diagram showing a configuration of a wavelength division multiplex optical transmission apparatus 1 serving as a second modification of the third embodiment. The transmission apparatus 1 shown in FIG. 28 is different from that shown in FIG. 24 in that excitation light output level adjusting sections 15A, 15B are respectively configured by using the liquid crystal panels 156 described in the second modification (see FIG. 12) of the first embodiment, and an excitation light output level control circuit (liquid crystal panel control circuit) 16L is provided instead of the excitation light output level control circuit 16J.

Here, the above liquid crystal panel control circuit 16L basically has the same configuration as that shown in FIG. 25. However, since the excitation light output level adjusting sections 15A, 15B are respectively configured by using the liquid crystal panels 156, an excitation light adjusting signal generating section 165 includes a liquid crystal panel applied voltage decision section 166C, liquid crystal panel applied voltage control sections 167C, 168C, and a liquid crystal panel applied voltage database 169C identical with those shown in FIG. 13.

That is, in the wavelength division multiplex optical transmission apparatus 1 in the second modification of the third embodiment, optical output levels of excitation light signals λ2, λ4 generated in the excitation light sources 14A, 14B are respectively adjusted by the liquid crystal panels 156 in an optical output level control section 13 of the type correcting optimal optical output levels P calculated depending upon actual transmission losses $P_{LOSS}$ of wavelengths λ1, λ3 according to optical levels of send optical signals λ1, λ3 after actual optical amplification.

Accordingly, in Step C8 described above referring to FIG. 26, excitation light output level adjusting processing of the transmission apparatus 1 in the modification is identical with the processing from Steps A14 to A16 described above referring to FIG. 14. That is, the control circuit 16L first finds the optimal optical output levels P with consideration given to the actual transmission losses $P_{LOSS}$ of the optical signals with the respective wavelengths λ1, λ3, and determines optimal excitation light levels according to the obtained optimal optical output levels P so as to pass the optimal excitation light levels to the excitation light adjusting signal generating section 165 (see Steps C1 to C8 in FIG. 26).

Subsequently, as in the second modification of the first embodiment, the excitation light adjusting signal generating section 165 finds applied voltages to the liquid crystal panels 156, corresponding to the optimal excitation light levels input from the optimal excitation light level decision section 163 so as to apply the applied voltages to the respective liquid crystal panels 156. This varies light transmittances of the liquid crystal panels to adjust the optical output levels of the excitation light signals λ2, λ4 from the excitation light sources 14A, 14B to the above optimal excitation light levels (see Steps A14 to A16 in FIG. 14).

As a result, the respective send optical signals λ1, λ3 are amplified in the optical amplifiers 4A, 4B to the optimal optical output levels according to transmission distances of the optical signals with the respective wavelengths λ1, λ3 and a loss of an optical transmission line 12, and are sent to the optical transmission line 12.

At the point in time, if errors are caused between the optimal optical output levels P found by the calculations and the optical levels of the send optical signals λ1, λ3 after actual optical amplification, received in output optical signal receivers 20A, 20B, as in the above-mentioned third embodiment, the optimal optical output levels P are recalculated in the optimal excitation light level calculating section 173 so as to set the errors to zeros, thereby correcting the optimal excitation light levels (see Steps C10, C11 in FIG. 26).

As described above, in the wavelength division multiplex optical transmission apparatus 1 in the second modification of the third embodiment, the variations in voltages applied to the liquid crystal panels 156 of the excitation light output level adjusting sections 15A, 15B can adjust the optical output levels of the excitation light signals λ2, λ4. Therefore, it is possible to vary the optical output levels of the excitation light signals λ2, λ4 in an analog manner, and adjust the optical output levels of the excitation light signals λ2, λ4 more precisely in a simpler configuration than would be in the above-mentioned third embodiment.

(C3) Description of Third Modification of Third Embodiment

Figure 29:
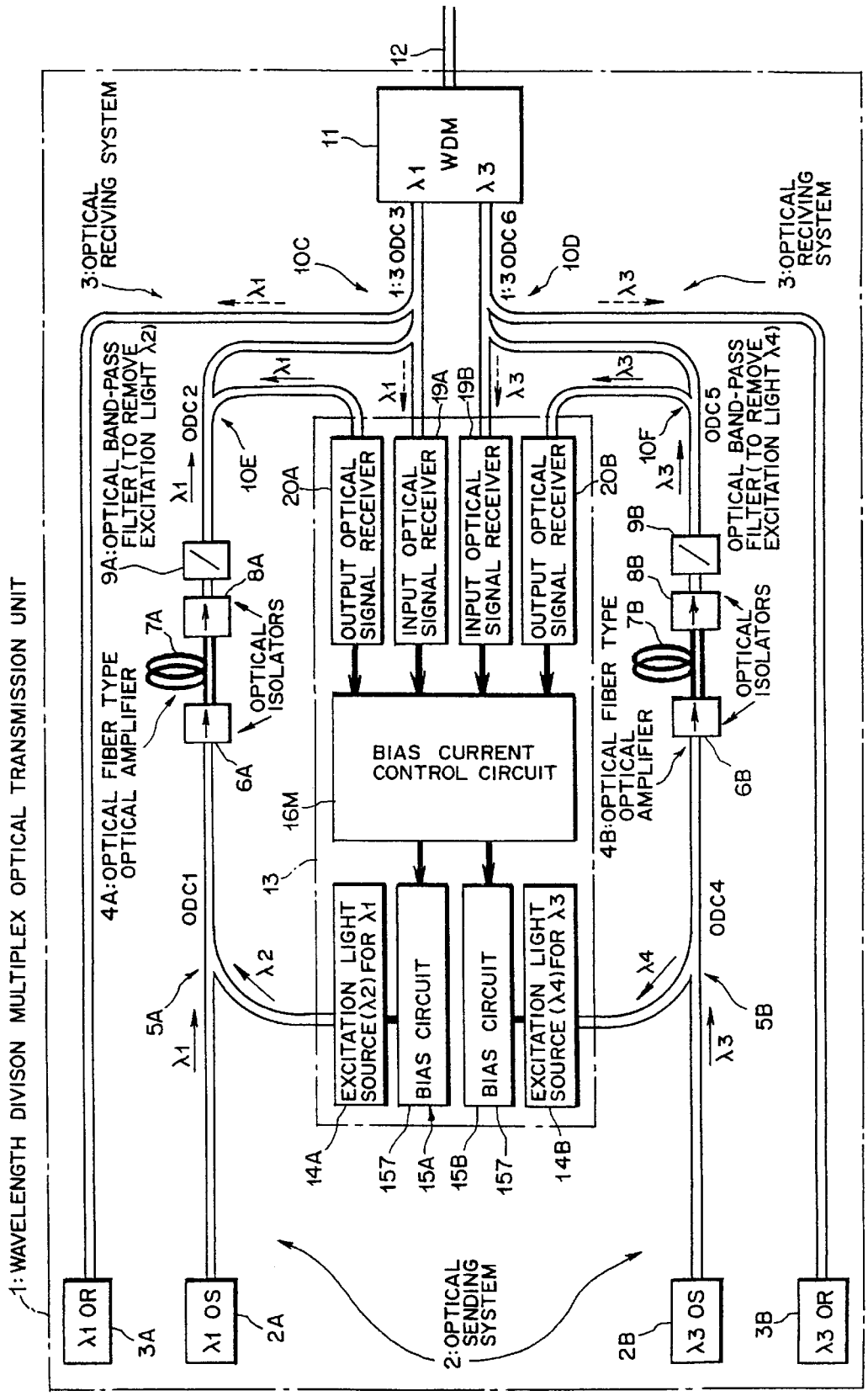
FIG. 29 is a block diagram showing a configuration of a wavelength division multiplex optical transmission apparatus serving as a third modification of the third embodiment.

FIG. 29 is a block diagram showing a configuration of a wavelength division multiplex optical transmission apparatus 1 serving as a third modification of the third embodiment. The transmission apparatus 1 shown in FIG. 29 is different from that shown in FIG. 24 in that excitation light output level adjusting sections 15A, 15B are respectively configured by using the bias circuits 157 described in the third modification (see FIG. 15) of the first embodiment, and an excitation light output level control circuit (bias current control circuit) 16M is provided instead of the excitation light output level control circuit 16J.

Here, the above bias current control circuit 16M basically has the same configuration as that shown in FIG. 25. However, since the excitation light output level adjusting sections 15A, 15B are respectively configured by using the bias circuits 157, an excitation light adjusting signal generating section 165 includes a bias current decision section 166D, bias circuit control sections 167D, 168D, and a bias current database 169D identical with those shown in FIG. 16.

That is, in the wavelength division multiplex optical transmission apparatus 1 in the third modification of the third embodiment, optical output levels of excitation light signals 12, 14 generated in the excitation light sources 14A, 14B are respectively adjusted by the bias circuits 157 in an optical output level control section 13 of the type correcting optimal optical output levels P calculated depending upon actual transmission losses $P_{LOSS}$ of wavelengths λ1, λ3 according to optical levels of send optical signals λ1, λ3 after actual optical amplification.

Accordingly, in Step C8 described above referring to FIG. 26, excitation light output level adjusting processing of the transmission apparatus 1 in the modification is identical with the processing from Steps A17 to A19 described above referring to FIG. 17. That is, the control circuit 16M first finds the optimal optical output levels P with consideration given to the actual transmission losses $P_{LOSS}$ of the optical signals with the respective wavelengths λ1, λ3, and determines optimal excitation light levels according to the obtained optimal optical output levels P so as to pass the optimal excitation light levels to the excitation light adjusting signal generating section 165 (see Steps C1 to C8 in FIG. 26).

Subsequently, as in the third modification of the first embodiment, the excitation light adjusting signal generating section 165 finds values of bias currents to the bias circuits 157, corresponding to the optimal excitation light levels input from the optimal excitation light level decision section 163 so as to feed the bias currents to the respective bias circuits 157. This varies amounts of bias currents from the bias circuits 157 to the respective excitation light sources 14A, 14B so as to adjust the optical output levels of the excitation light signals λ2, λ4 generated in the excitation light sources 14A, 14B to the above optimal excitation light levels (see Steps A17 to A19 in FIG. 17).

As a result, the respective send optical signals λ1, λ3 are amplified in the optical amplifiers 4A, 4B to the optimal optical output levels according to transmission distances of the optical signals with the respective wavelengths λ1, λ3 and a loss of an optical transmission line 12, and are sent to the optical transmission line 12.

At the point in time, if errors are caused between the optimal optical output levels P found by the calculations and the optical levels of the send optical signals λ1, λ3 after actual optical amplification, received in output optical signal receivers 20A, 20B, as in the above-mentioned third embodiment, the optimal optical output levels P are recalculated in an optimal excitation light level calculating section 173 so as to set the errors to zeros, thereby correcting the optimal excitation light levels (see Steps C10, C11 in FIG. 26).

As described above, in the wavelength division multiplex optical transmission apparatus 1 in the third modification of the third embodiment, the excitation light output level adjusting sections 15A, 15B are respectively configured as the bias circuits 157 which can vary the amounts of currents fed to the excitation light sources 14A, 14B. Therefore, it is possible to vary the optical output levels of the excitation light signals λ2, λ4 generated in the excitation light sources 14A, 14B directly and in an analog manner, and adjust the optical output levels of the excitation light signals λ2, λ4 more accurately and more precisely than would be in the above-mentioned third embodiment.

(D) Description of Fourth Embodiment

Figure 30:
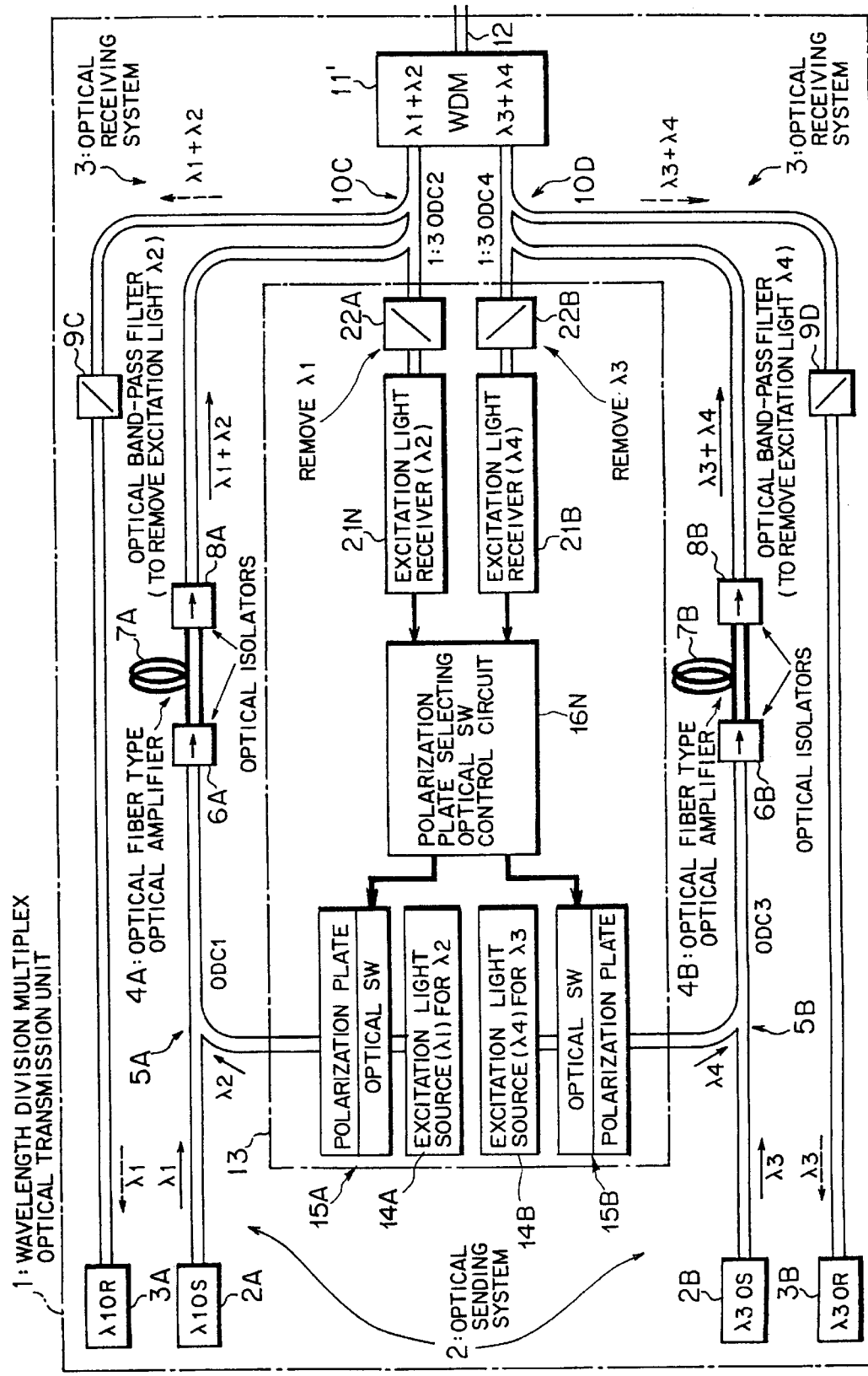
FIG. 30 is a block diagram showing a configuration of a wavelength division multiplex optical transmission apparatus serving as the fourth embodiment of the present invention.

FIG. 30 is a block diagram showing a configuration of a wavelength division multiplex optical transmission apparatus 1 serving as the fourth embodiment of the present invention. The transmission apparatus 1 shown in FIG. 30 has a configuration shown in FIG. 18 of the second embodiment, in which optical band-pass filters 9A, 9B mounted to remove excitation light signals λ2, λ4 to output terminals of respective optical amplifiers 4A, 4B in optical sending system 2 are omitted to transmit send optical signals λ1, λ3 respectively generated in optical sending sections 2A, 2B and the above excitation light signals λ2, λ4 to an optical transmission line 12 through a WDM coupler 11'.

Hence, the WDM coupler 11' of the embodiment processes by wavelength division multiplexing the send optical signal λ1 to which the excitation light signal λ2 is added (that is, λ1+λ2) and the send optical signal λ3 to which the excitation light signal λ4 is added (that is, λ3+λ4) so as to send the results to the optical transmission line 12, while being capable of demultiplexing an optical signal transmitted through the optical transmission line 12 into a receive optical signal with the wavelength λ1+λ2, and a receive optical signal with the wavelength λ3+λ4.

Further, the transmission apparatus 1 shown in FIG. 30 is different from that shown in FIG. 18 in that optical band-pass filters 9C, 9D are provided in optical receiving system 3, and an optical output level control section 13 includes an excitation light output level control circuit (polarization plate selecting optical switch control circuit) 16N, excitation light receivers 21A, 21B, and optical band-pass filters 22A, 22B. Moreover, it will be appreciated that excitation light output level adjusting sections 15A, 15B respectively include polarization sections 151-i, and optical switches 152, 153 as in those shown in FIG. 2.

Here, the above optical band-pass filter 9C removes an optical signal with the wavelength λ2 (that is, the excitation light signal λ2) from the optical signal with the wavelength λ1+λ2, demultiplexed in the WDM coupler 11' and input through an optical coupler 10C. The above optical band-pass filter 9D removes an optical signal with the wavelength λ4 (that is, the excitation light signal λ4) from the optical signal with the wavelength λ3+λ4, demultiplexed in the WDM coupler 11' and input through an optical coupler 10D. The respective filters 9C, 9D allow the respective optical receiving sections 3A, 3B to receive only the receive optical signals λ1, λ3.

Additionally, in the optical output level control section 13, the optical band-pass filter 22A removes an optical signal with the wavelength λ1 from the optical signal with the wavelength λ1+λ2, demultiplexed in the WDM coupler 11' and input through the optical coupler 10C. The optical band-pass filter 22B removes an optical signal with the wavelength λ3 from the optical signal with the wavelength λ3+λ4, demultiplexed in the WDM coupler 11' and input through the optical coupler 10D. Therefore, the respective optical band-pass filters 22A, 22B allow only the optical signals with the wavelengths λ2, λ4 (that is, the excitation light signals λ2, λ4) to be output to the excitation light receivers 21A, 21B.

Further, the excitation light receiver (excitation light signal receiving section) 21A receives the excitation light signal λ2 input through the above optical band-pass filter 22A, and the excitation light receiver 21B similarly receives the excitation light signal λ4 input through the above optical band-pass filter 22B. That is, these excitation light receivers 21A, 21B can receive the excitation light signals λ2, λ4 which are reflected in the optical transmission line 12 when the optical transmission line 12 is in a disconnection state, and are sent back through the WDM coupler 11'.

As in the control circuit 16A of the first embodiment, an excitation light output level control circuit (excitation light output level operation control section) 16N controls the excitation light output level adjusting sections 15A, 15B according to optimal optical output levels P of the respective send optical signals λ1, λ3 calculated depending upon the various types of parameter information, thereby adjusting the optical output levels of the excitation light signals λ2, λ4. Here, when the excitation light receivers 21A, 21B receive through the optical transmission line 12 the excitation light signals λ2, λ4 generated in the excitation light sources 14A, 14B at an own side, the excitation light output level control circuit 16N decides that the optical transmission line 12 is in the disconnection state (line disconnection state), and sets the optical output levels of excitation light signals λ2, λ4 to zeros and gives an alarm.

Figure 31:
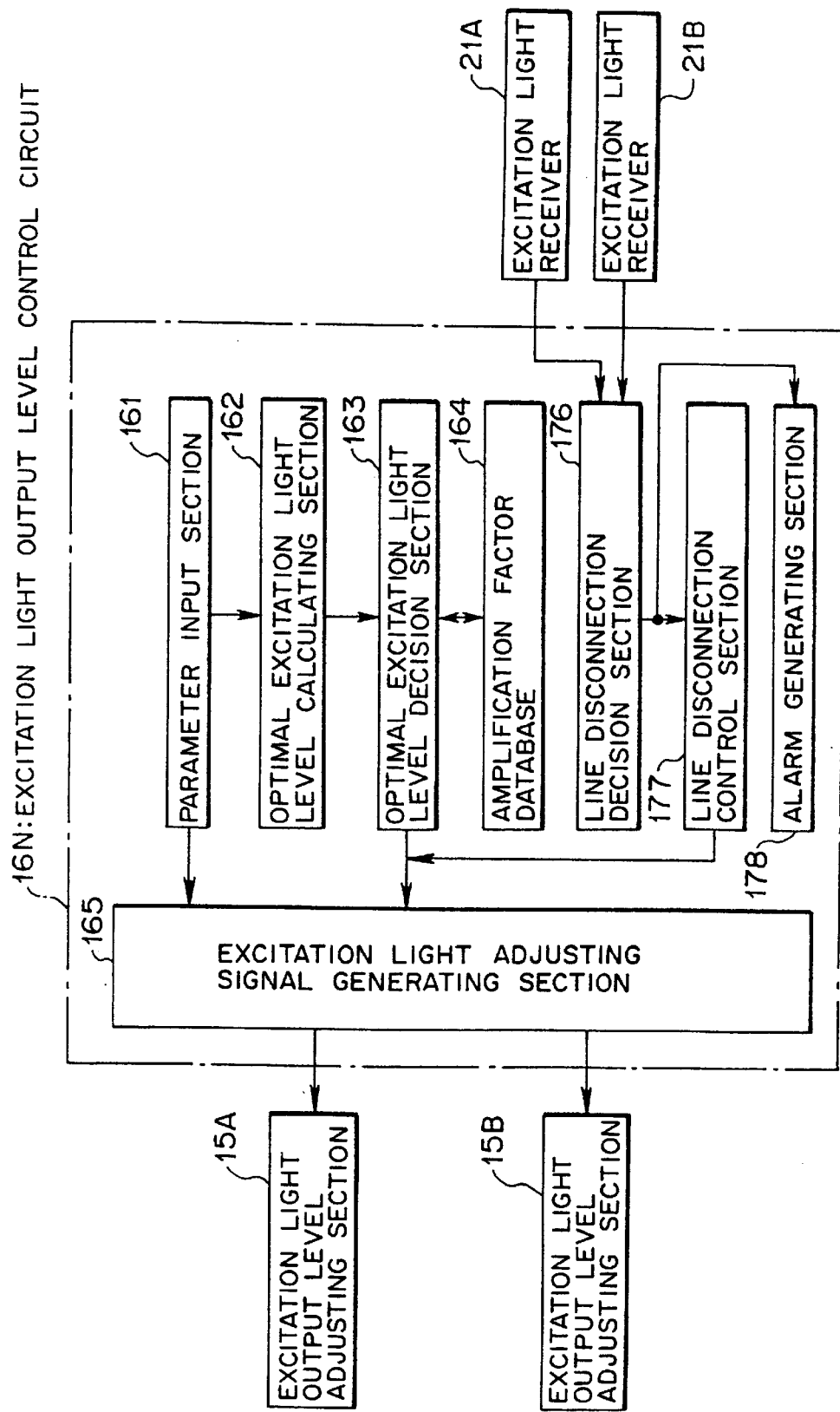
FIG. 31 is a block diagram showing a configuration of an excitation light output level control circuit in the fourth embodiment.

Hence, as shown in, for example, FIG. 31, the excitation light output level control circuit 16N of the embodiment includes a parameter input section 161, an optimal excitation light level calculating section 162, an optimal excitation light level decision section 163, an amplification factor database 164, and an excitation light adjusting signal generating section 165 identical with those described above referring to FIG. 3 of the first embodiment, and further includes a line disconnection decision section 176, a line disconnection control section 177, and an alarm generating section 178.

However, it is to be noted that, since the excitation light level adjusting sections 15A, 15B are respectively configured by using the polarization sections 151-i, and the optical switches 152, 153, the above excitation light adjusting signal generating section 165 includes an optical switch port decision section 166A, and optical switch control sections 167A, 168A identical with those shown in FIG. 6.

Here, the above line disconnection decision section (excitation light reception decision section) 176 monitors (decides) whether or not the excitation light receivers 21A, 21B receive the excitation light signals λ2, λ4 generated at the own side. If it is decided in the line disconnection decision section 176 that the excitation light receivers 21A, 21B have received the excitation light signals λ2, λ4, the line disconnection control section (disconnection state control section) 177 decides that the optical transmission line 12 is in the disconnection state, and controls excitation light adjusting signal generation processing in the excitation light adjusting signal generating section 165 so as to set the optical output levels of the excitation light signals λ2, λ4 to zeros.

Moreover, in the embodiment, the line disconnection control section 177 instructs, for example, the optical switch port decision section 166A of the excitation light adjusting signal generating section 165 to select the polarization sections 151-i having polarization factors which provide infinite attenuation of the excitation light signals λ2, λ4, thereby setting the optical output levels of the respective excitation light signals λ2, λ4 to zeros.

Further, if it is decided in the line disconnection decision section 176 that the excitation light receivers 21A, 21B have received the excitation light signals λ2, λ4, the alarm generating section 178 gives the alarm indicating the disconnection state of the optical transmission line 12.

Referring to the flowchart (Steps D1 to D10) shown in FIG. 32, a detailed description will now be given of an operation of the wavelength division multiplex optical transmission apparatus 1 of the fourth embodiment having the above configuration with attention to excitation light output level adjusting processing.

First, in the transmission apparatus 1, the parameter input section 161 of the excitation light output level control circuit 16N takes as inputs various types of parameter information about the above-mentioned optical transmission line 12 through a maintenance terminal (Step D1). Subsequently, the optimal excitation light level calculating section 162 calculates the optimal optical output levels P of the respective send optical signals λ1, λ3 depending upon the input parameter information according to the above expression (1) (Step D2).

The optimal optical output levels P of the respective send optical signals λ1, λ3 obtained in the optimal excitation light level calculating section 162 are given to the optimal excitation light level decision section 163. The optimal excitation light level decision section 163 refers to, with the given optimal optical output levels P as keys, amplification factor correspondence tables 164a contained in the amplification factor database 164 to correspond to the λ1, λ3 (Step D3), and decides whether or not the optimal optical output levels P found by the calculations are appropriate values [whether or not the optimal optical output levels P are present (recorded) in the items "Optical level after amplification"] (Step D4).

As a result, if the optimal optical output levels P, the appropriate values, are recorded in the amplification factor correspondence tables 164a (if a decision of YES is given in Step A4), the optimal excitation light level decision section 163 extracts excitation light levels (optimal excitation light levels) corresponding to the optimal optical output levels P (Step D5).

On the other hand, if the optimal optical output levels P are not the appropriate values (if not recorded in the amplification factor correspondence tables 164a), for example, optical receive levels cannot be set to intermediate values between maximum receive levels Prmax and minimum receive levels Prmin due to, for example, long transmission distances even when the maximum amplification factors are provided in the optical amplifiers 4A, 4B. In this case, the optimal excitation light level decision section 163 extracts excitation light levels (maximum excitation light levels) providing the maximum optical levels after amplification from the amplification factor correspondence tables 164a so as to set the optical receive levels closer to the intermediate values (from No route in Step D4 to Step D6).

At the point in time, the excitation light output level control circuit 16N uses the line disconnection decision section 176 to monitor whether or not the excitation light receivers 21A, 21B have received the excitation light signals λ2, λ4 (Step D7). If neither of the excitation light signals λ2, λ4 has been received (if a decision of NO is given in Step D7), the excitation light levels extracted as described above are passed to the excitation light adjusting signal generating section 165 as the optimal excitation light levels (Step D8).

Subsequently, as described above referring to FIG. 8 of the first embodiment, the excitation light adjusting signal generating section 165 generates polarization plate selecting signals as excitation light adjusting signals to control the excitation light output level adjusting sections 15A, 15B (the optical switches 152, 153). That is, in the excitation light adjusting signal generating section 165, the optical switch port decision section 166A first finds differences between excitation light output levels $P_L$ (current excitation light levels) from the parameter input section 161 and the optimal excitation light levels obtained by the optimal excitation light level decision section 163 as described above (see Step A8 in FIG. 8).

If there are the differences, the optical switch port decision section 166A decides by how many decibels the current excitation light levels should be increased or decreased in order to set the differences to zeros, and selects polarization plate numbers (optical switch port numbers) corresponding thereto (see Step A9 in FIG. 8) so as to post the polarization plate numbers to the optical switch control sections 167A, 168A. The optical switch control sections 167A, 168A generate and feed to the excitation light output level adjusting sections 15A, 15B the polarization plate selecting signals depending upon the optical switch port numbers from the optical switch port decision section 166A. Thereby, ports 152-i, 153-i of the respective optical switches 152, 153 are placed in excitation light conducting states such that excitation lights can pass through the selected polarization sections 151-i (see Step A10 in FIG. 8).

This controls to optimal optical levels the optical output levels of the respective excitation light signals λ2, λ4 generated in the excitation light sources 14A, 14B. The respective send optical signals λ1, λ3 generated in the respective optical sending sections 2A, 2B are amplified in the optical amplifiers 4A, 4B to the optimal optical output levels according to the transmission distances of the optical signals with the wavelengths λ1, λ3, and are sent to the optical transmission line 12.

On the other hand, if the excitation light receivers 21A, 21B have received the excitation light signals λ2, λ4 (if a decision of YES is given in Step D7), the line disconnection control section 177 instructs the optical switch port decision section 166A of the excitation light adjusting signal generating section 165 to select the polarization sections 151-i having polarization factors which provide infinite attenuation of the excitation light signals λ2, λ4.

Thereby, the optical switch port decision section 166A posts to the optical switch control sections 167A, 168A the numbers of the polarization sections 151-i (optical switch port numbers) having the polarization factors which provide the infinite attenuation of the excitation light signals λ2, λ4. The optical switch control sections 167A, 168A generate and feed to the excitation light level adjusting sections 15A, 15B the polarization plate selecting signals depending upon the optical switch port numbers from the optical switch port decision section 166A. Consequently, the ports 152-i, 153-i of the respective optical switches 152, 153 are placed in the excitation light conducting states such that the excitation lights can pass through the selected polarization sections 151-i.

As a result, the optical output levels of the excitation light signals λ2, λ4 from the excitation light sources 14A, 14B are attenuated in the selected polarization sections 151-i to the utmost extent, resulting in zeros (Step D9). Subsequently, the control circuit 16N uses the alarm generating section 178 to give the alarm indicating the disconnection state of the optical transmission line 12 (Step D10). Moreover, it must be noted that the zero adjustment processing for the excitation light output levels and the alarm generation processing may be performed in any order, or may be performed in parallel with each other.

As described above, according to the wavelength division multiplex optical transmission apparatus 1 in the fourth embodiment, when the excitation light signals λ2, λ4 generated in the excitation light sources 14A, 14B at the local station return through the optical transmission line 12, and are received by the excitation light receivers 21A, 21B, the decision of disconnection state of the optical transmission line 12 is made to set the optical output levels of the excitation light signals λ2, λ4 to zeros, and give the alarm. Thus, it is possible to obtain the following advantages as well as the same advantages as those in the first embodiment:

(1) it is possible to reduce unnecessary output of the excitation light signals λ2, λ4 at the time of the disconnection state of the optical transmission line 12 so as to reduce power consumption;

(2) it is possible to give the alarm so as to more surely post the disconnection state of the optical transmission line 12 to the outside; and (3) it is possible to realize the line disconnection detecting function at a lower cost since the disconnection state of the optical transmission line 12 is detected by using detection (receive) of return optical signals of the excitation light signals λ2, λ4.

Additionally, in the fourth embodiment, the optical switches 152, 153 of the excitation light output level adjusting sections 15A, 15B are controlled by the electric signals, thereby selecting the polarization sections 151-i to pass the excitation light signals λ2, λ4 therethrough. Thus, it is possible to adjust the optical levels of the send optical signals λ1, λ3 after the optical amplification to the optimal optical levels at a very high speed.

(D1) Description of First Modification of Fourth Embodiment

Figure 33:
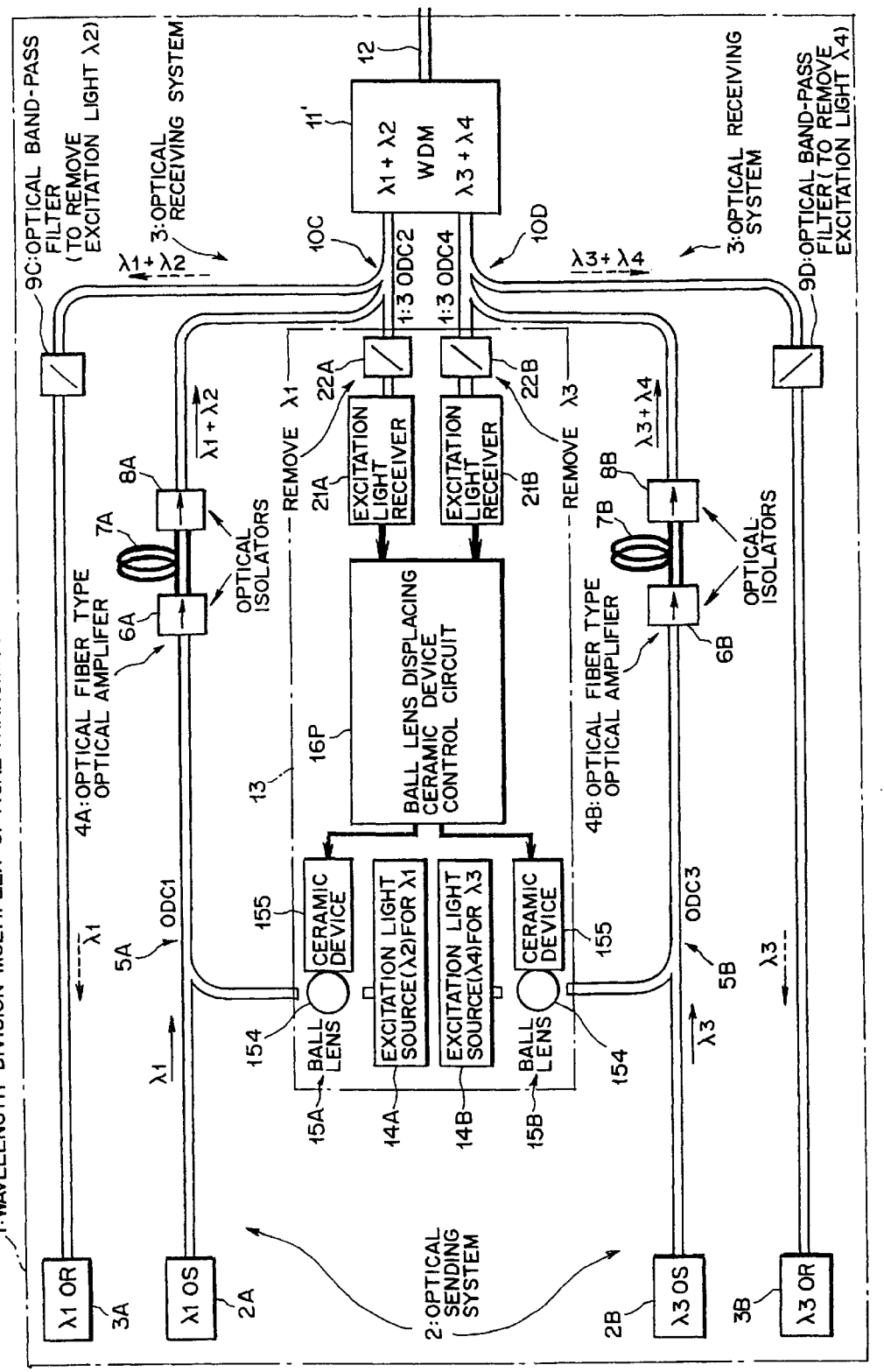
FIG. 33 is a block diagram showing a configuration of a wavelength division multiplex optical transmission apparatus serving as a first modification of the fourth embodiment.

FIG. 33 is a block diagram showing a configuration of a wavelength division multiplex optical transmission apparatus 1 serving as a first modification of the fourth embodiment. The transmission apparatus 1 shown in FIG. 33 is different from that shown in FIG. 30 in that excitation light output level adjusting sections 15A, 15B are respectively configured by using the ball lenses 154 and the ceramic devices 155 described in the above first modification (see FIG. 9) of the first embodiment, and an excitation light output level control circuit (ball lens displacing ceramic device control circuit) 16P is provided instead of the excitation light output level control circuit 16N.

Here, the ball lens displacing ceramic device control circuit 16P basically has the same configuration as that shown in FIG. 31. However, since the excitation light output level adjusting sections 15A, 15B are respectively configured by using the ball lenses 154 and the ceramic devices 155, an excitation light adjusting signal generating section 165 includes a ball lens displacement decision section 166B, ceramic device applied voltage control sections 167B, 168B, and a ball lens displacement-ceramic device applied voltage database 169B identical with those shown in FIG. 10.

That is, in the wavelength division multiplex optical transmission apparatus 1 in the first modification of the fourth embodiment, optical output levels of excitation light signals λ2, λ4 generated in the excitation light sources 14A, 14B are respectively adjusted by the ball lenses 154 and the ceramic devices 155 in an optical output level control section 13 of the type finding optimal optical output levels P depending upon the various types of above-mentioned parameter information to adjust the optical output levels of the excitation light signals λ2, λ4 according to the optimal optical output levels P, and monitoring return optical signals of the excitation light signals λ2, λ4 to detect line disconnection.

Accordingly, in Step D8 described above referring to FIG. 32, excitation light output level adjusting processing of the transmission apparatus 1 in the modification is identical with the processing from Steps A11 to A13 described above referring to FIG. 11. That is, the control circuit 16P first finds the optimal optical output levels P of the respective send optical signals λ1, λ3 depending upon the various types of parameter information input through a parameter input section 161, and determines optimal excitation light levels according to the obtained optimal optical output levels P (see Steps D1 to D6 in FIG. 32).

If neither of the excitation light signals λ2, λ4 has been received in excitation light receivers 21A, 21B, the optimal excitation light levels determined as described above are passed to the excitation light adjusting signal generating section 165 (see Step D8 in FIG. 25). Subsequently, as in the first modification of the first embodiment, the excitation light adjusting signal generating section 165 finds positional displacements of the ball lenses 154, corresponding to the optimal excitation light levels input from the optimal excitation light level decision section 162. The positional displacements are converted into values of voltages applied to the respective ceramic devices 155, and the voltages are applied to the ceramic devices 155.

This varies focus positions of the excitation light signals λ2, λ4 on the ball lenses 154 to adjust the optical output levels of the respective excitation light signals λ2, λ4 from the excitation light sources 14A, 14B to the above optimal optical output levels (see Steps A11 to A13 in FIG. 11).

As a result, the respective send optical signals λ1, λ3 are amplified in the optical amplifiers 4A, 4B to the optimal optical output levels according to transmission distances of the optical signals with wavelengths λ1, λ3, and are sent to the optical transmission line 12.

As described above, according to the wavelength division multiplex optical transmission apparatus 1 in the first modification of the fourth embodiment, the controls of the voltages applied to the ceramic devices 155 of the excitation light output level adjusting sections 15A, 15B vary the focus positions (refractive indexes) of the excitation light signals 12, 14 on the ball lenses 154. Therefore, it is possible to vary the optical output levels of the excitation light signals λ2, λ4 in an analog manner, and adjust the optical output levels of the excitation light signals λ2, λ4 more precisely than would be in the above-mentioned fourth embodiment.

(D2) Description of Second Modification of Fourth Embodiment

Figure 34:
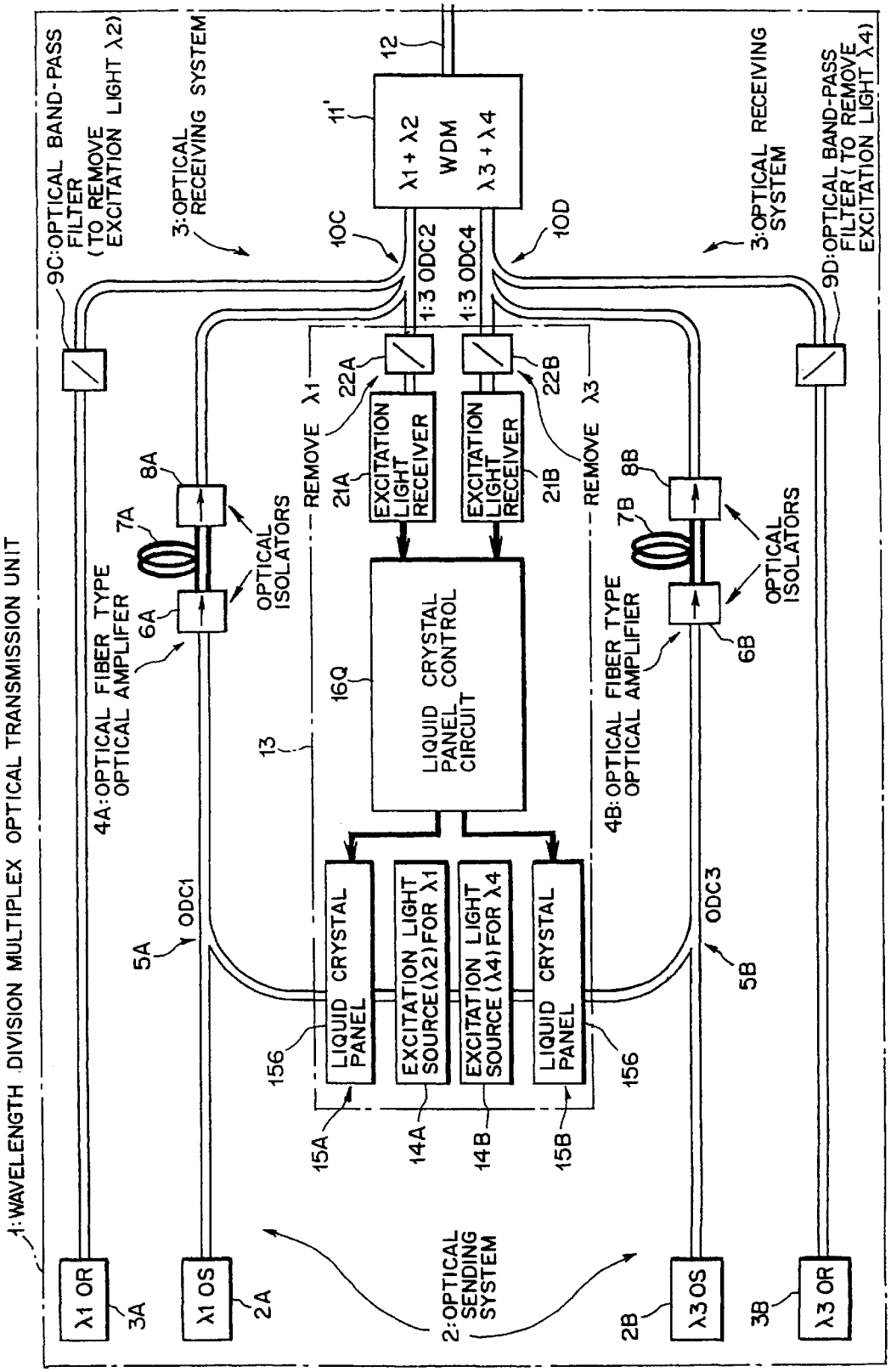
FIG. 34 is a block diagram showing a configuration of a wavelength division multiplex optical transmission apparatus serving as a second modification of the fourth embodiment.

FIG. 34 is a block diagram showing a configuration of a wavelength division multiplex optical transmission apparatus 1 serving as a second modification of the fourth embodiment. The transmission apparatus 1 shown in FIG. 34 is different from that shown in FIG. 30 in that excitation light output level adjusting sections 15A, 15B are respectively configured by using the liquid crystal panels 156 described in the second modification (see FIG. 12) of the first embodiment, and an excitation light output level control circuit (liquid crystal panel control circuit) 16Q is provided instead of the excitation light output level control circuit 16N.

Here, the above liquid crystal panel control circuit 16Q basically has the same configuration as that shown in FIG. 31. However, the excitation light output level adjusting sections 15A, 15B are respectively configured by using the liquid crystal panels 156, an excitation light adjusting signal generating section 165 includes a liquid crystal panel applied voltage decision section 166C, liquid crystal panel applied voltage control sections 167C, 168C, and a liquid crystal panel applied voltage database 169C identical with those shown in FIG. 13.

That is, in the wavelength division multiplex optical transmission apparatus 1 in the second modification of the fourth embodiment, optical output levels of excitation light signals λ2, λ4 generated in excitation light sources 14A, 14B are respectively adjusted by the liquid crystal panels 156 in an optical output level control section 13 of the type finding optimal optical output levels P depending upon the various types of above-mentioned parameter information to adjust the optical output levels of the excitation light signals λ2, λ4 according to the optimal optical output levels P, and monitoring return optical signals of the excitation light signals λ2, λ4 to detect line disconnection.

Accordingly, in Step D8 described above referring to FIG. 32, excitation light output level adjusting processing of the transmission apparatus 1 in the modification is identical with the processing from Steps A14 to A16 described above referring to FIG. 14. That is, the control circuit 16Q first finds the optimal optical output levels P of respective send optical signals λ1, λ3 depending upon the various types of parameter information input through a parameter input section 161, and determines optimal excitation light levels according to the obtained optimal optical output levels P (see Steps D1 to D6 in FIG. 32).

Further, if neither of the excitation light signals λ2, λ4 has been received in excitation light receivers 21A, 21B, the optimal excitation light levels determined as described above are passed to the excitation light adjusting signal generating section 165 (see Step D8 in FIG. 25). Subsequently, as in the second modification of the first embodiment, the excitation light adjusting signal generating section 165 finds applied voltages to the liquid crystal panels 156, corresponding to the optimal excitation light levels input from the optimal excitation light level decision section 163 so as to apply the applied voltages to the respective liquid crystal panels 156.

This varies light transmittances of the liquid crystal panels to adjust the optical output levels of the excitation light signals λ2, λ4 from the excitation light sources 14A, 14B to the above optimal excitation light levels (see Steps A14 to A16 in FIG. 14). As a result, the respective send optical signals λ1, λ3 are amplified in the optical amplifiers 4A, 4B to the optimal optical output levels according to transmission distances of the optical signals with the respective wavelengths λ1, λ3, and are sent to an optical transmission line 12.

As stated above, in the wavelength division multiplex optical transmission apparatus 1 in the second modification of the fourth embodiment, the variations in voltages applied to the liquid crystal panels 156 of the excitation light output level adjusting sections 15A, 15B can adjust the optical output levels of the excitation light signals λ2, λ4. Therefore, it is possible to vary the optical output levels of the excitation light signals λ2, λ4 in an analog manner, and adjust the optical output levels of the excitation light signals λ2, λ4 more precisely in a simpler configuration than would be in the above-mentioned fourth embodiment.

(D3) Description of Third Modification of Fourth Embodiment

Figure 35:
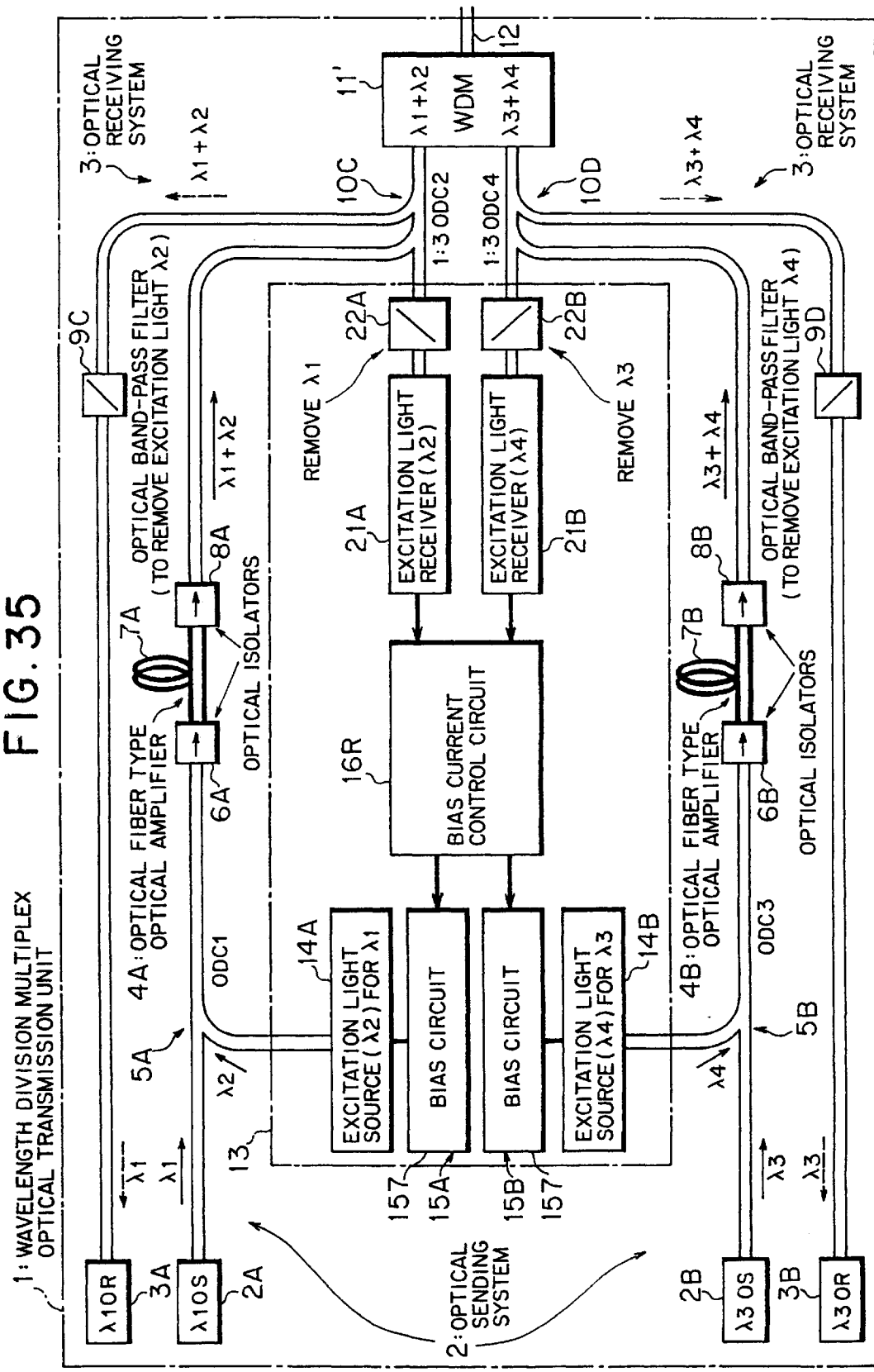
FIG. 35 is a block diagram showing a configuration of a wavelength division multiplex optical transmission apparatus serving as a third modification of the fourth embodiment.

FIG. 35 is a block diagram showing a configuration of a wavelength division multiplex optical transmission apparatus 1 serving as a third modification of the fourth embodiment. The transmission apparatus 1 shown in FIG. 35 is different from that shown in FIG. 30 in that excitation light output level adjusting sections 15A, 15B are respectively configured by using the bias circuits 157 described in the third modification (see FIG. 15) of the first embodiment, and an excitation light output level control circuit (bias current control circuit) 16R is provided instead of the excitation light output level control circuit 16N.

Here, the above bias current control circuit 16R basically has the same configuration as that shown in FIG. 31. However, since the excitation light output level adjusting sections 15A, 15B are respectively configured by using the bias circuits 157, an excitation light adjusting signal generating section 165 includes a bias current decision section 166D, bias circuit control sections 167D, 168D, and a bias current database 169D identical with those shown in FIG. 16.

That is, in the wavelength division multiplex optical transmission apparatus 1 in the third modification of the fourth embodiment, optical output levels of excitation light signals $\lambda 2, \lambda 4$ generated in excitation light sources 14A, 14B are respectively adjusted by the bias circuits 157 in an optical output level control section 13 of the type finding the optimal optical output levels P depending upon the various types of above-mentioned parameter information to adjust the optical output levels of the excitation light signals $\lambda 2, \lambda 4$ according to the optimal optical output levels P, and monitoring return optical signals of the excitation light signals $\lambda 2, \lambda 4$ to detect line disconnection.

Accordingly, in Step D8 described above referring to FIG. 32, excitation light output level adjusting processing of the transmission apparatus 1 in the modification is identical with the processing from Steps A17 to A19 described above referring to FIG. 17. That is, the control circuit 16R first finds the optimal optical output levels P of respective send optical signals $\lambda 1, \lambda 3$ depending upon the various types of parameter information input through a parameter input section 161, and determines optimal excitation light levels according to the obtained optimal optical output levels P (see Steps D1 to D6 in FIG. 32).

Figure 32:
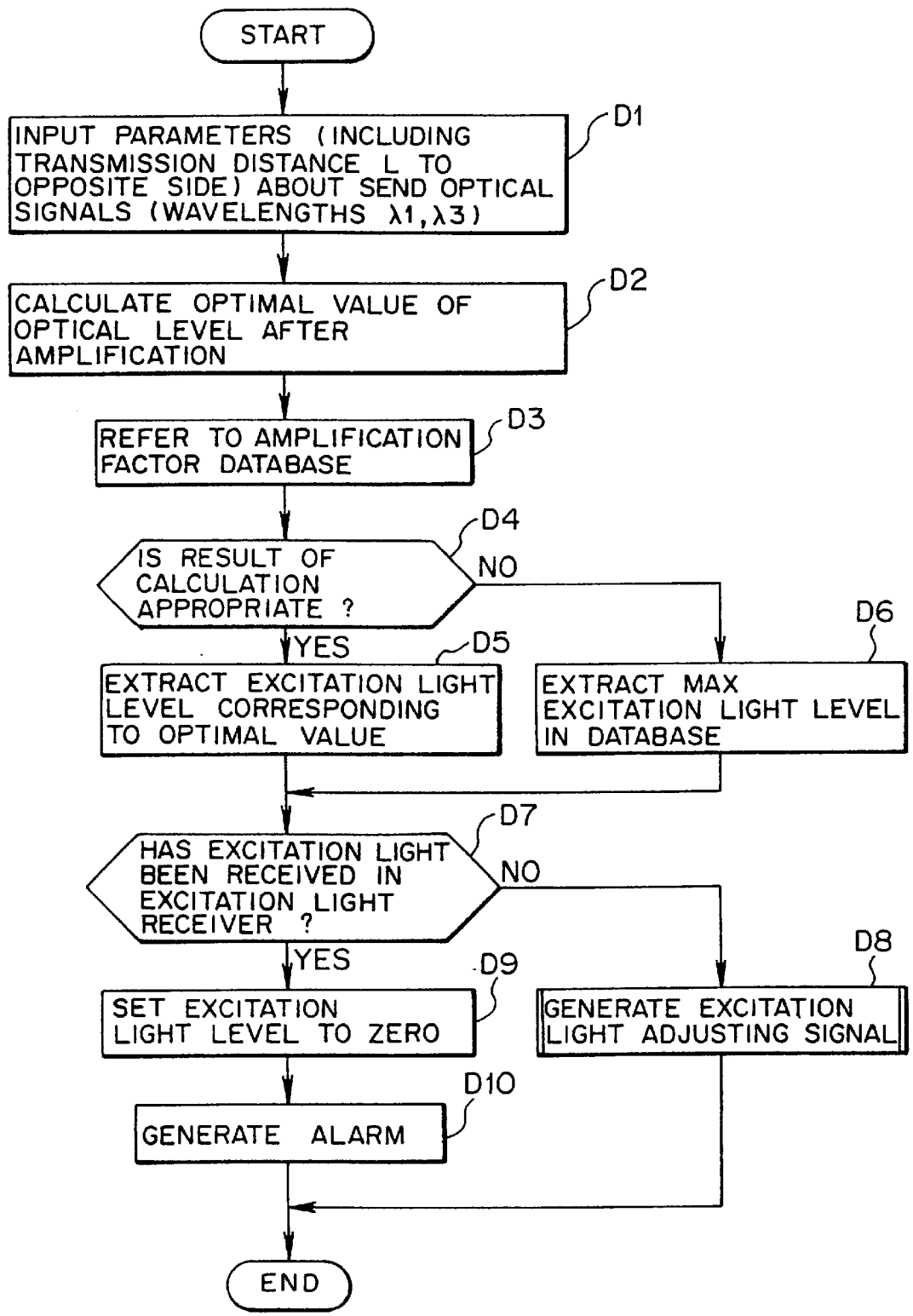
FIG. 32 is a flowchart for illustrating excitation light output level adjusting processing in the wavelength division multiplex optical transmission apparatus of the fourth embodiment.

Further, if neither of the excitation light signals $\lambda 2, \lambda 4$ has been received in excitation light receivers 21A, 21B (see NO route from Step D7 in FIG. 32), the optimal excitation light levels determined as described above are passed to the excitation light adjusting signal generating section 165 (see Step D8 in FIG. 32). Subsequently, as in the third modification of the first embodiment, the excitation light adjusting signal generating section 165 finds values of bias currents to the bias circuits 157, corresponding to the optimal excitation light levels input from the optimal excitation light level decision section 163 so as to feed the bias currents to the respective bias circuits 157.

This varies amounts of bias currents from the bias circuits 157 to the respective excitation light sources 14A, 14B so as to adjust the optical output levels of the respective excitation light signals $\lambda 2, \lambda 4$ generated in the excitation light sources 14A, 14B to the above optimal excitation light levels (see Steps A17 to A19 in FIG. 17). As a result, the respective send optical signals $\lambda 1, \lambda 3$ are amplified in the optical amplifiers 4A, 4B to the optimal optical output levels according to transmission distances of the optical signals with the respective wavelengths $\lambda 1, \lambda 3$, and are sent to an optical transmission line 12.

As described above, in the wavelength division multiplex optical transmission apparatus 1 in the third modification of the fourth embodiment, the excitation light output level adjusting sections 15A, 15B are respectively configured as the bias circuits 157 which can vary the amounts of currents fed to the excitation light sources 14A, 14B. Therefore, it is possible to vary the optical output levels of the excitation light signals $\lambda 2, \lambda 4$ generated in the excitation light sources 14A, 14B directly and in an analog manner, and adjust the optical output levels of the excitation light signals $\lambda 2, \lambda 4$ more accurately and more precisely than would be in the above-mentioned fourth embodiment.

(E) Description of Fifth Embodiment

Figure 36:
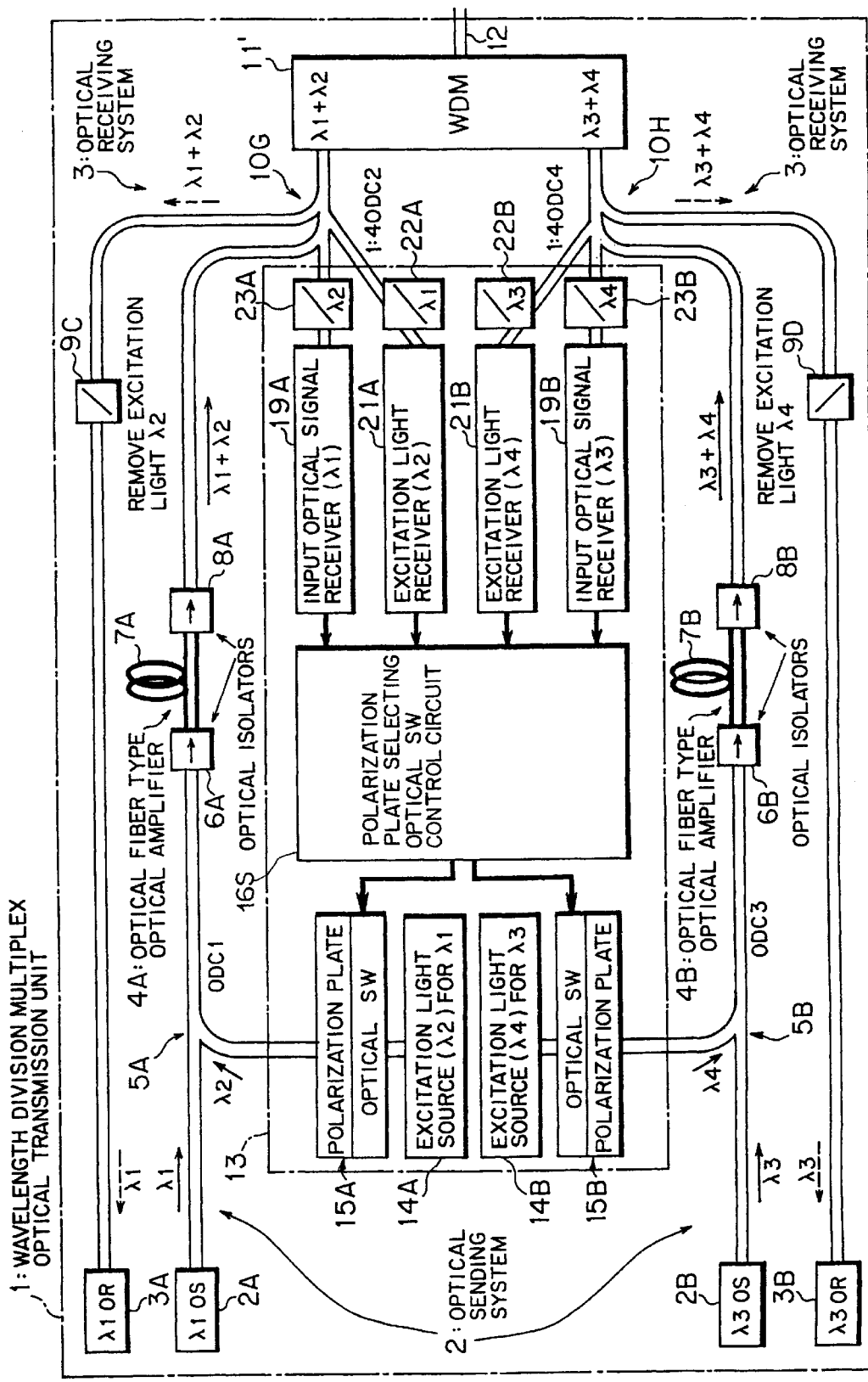
FIG. 36 is a block diagram showing a configuration of a wavelength division multiplex optical transmission apparatus serving as the fifth embodiment of the present invention.

FIG. 36 is a block diagram showing a configuration of a wavelength division multiplex optical transmission apparatus serving as the fifth embodiment of the present invention. The transmission apparatus 1 shown in FIG. 36 is different from that shown in FIG. 30 of the above-mentioned fourth embodiment in that an optical output level control section 13 includes, in addition to the excitation light receivers 21A, 21B, the optical band-pass filters 22A, 22B described above, optical band-pass filters 23A, 23B, and input optical signal receivers 19A, 19B identical with those described above referring to FIG. 18, and further includes an excitation light output level control circuit (polarization plate selecting optical switch control circuit) 16S instead of the excitation light output level control circuit 16N.

Further, another difference is that, instead of the one-to-three optical couplers 10C, 10D, one-to-four optical couplers 10G, 10H are provided to cause an optical signal $\lambda 1+\lambda 2$ and an optical signal $\lambda 3+\lambda 4$ demultiplexed in a WDM coupler 11' to additionally branch to the input optical signal receivers 19A, 19B. Moreover, it will be appreciated that excitation light output level adjusting sections 15A, 15B respectively include polarization sections 151-i, and optical switches 152, 153 as in those shown in FIG. 2.

Here, the optical band-pass filter 23A removes an optical signal with the wavelength $\lambda 2$ (that is, the excitation light signal $\lambda 2$) from the optical signal with the wavelength $\lambda 1+\lambda 2$, demultiplexed in the WDM coupler 11' and caused to branch at the optical coupler 10G. The optical band-pass filter 23B similarly removes an optical signal with the wavelength $\lambda 4$ (that is, the excitation light signal $\lambda 4$) from the optical signal with the wavelength $\lambda 3+\lambda 4$, demultiplexed in the WDM coupler 11' and caused to branch at the optical coupler 10H. The respective filters 23A, 23B allow the respective input optical signal receivers 19A, 19B to receive only the receive optical signals $\lambda 1, \lambda 3$ even when return optical signals of the excitation light signals $\lambda 2, \lambda 4$ are input through an optical transmission line 12.

As in the control circuit 16N of the fourth embodiment, the excitation light output level control circuit 16S of the fifth embodiment is the type using the excitation light receivers 21A, 21B to monitor the return optical signals of the excitation light signals $\lambda 2, \lambda 4$ so as to enable detection of line disconnection. However, here, unlike the above-mentioned fourth embodiment in which the optimal optical output levels P are found depending upon the above parameter information, the optimal optical output levels P are found with consideration given to actual transmission losses $P_{LOSS}$ of optical signals with the respective wavelengths $\lambda 1, \lambda 3$, obtained through the input optical signal receivers 19A, 19B.

Figure 37:
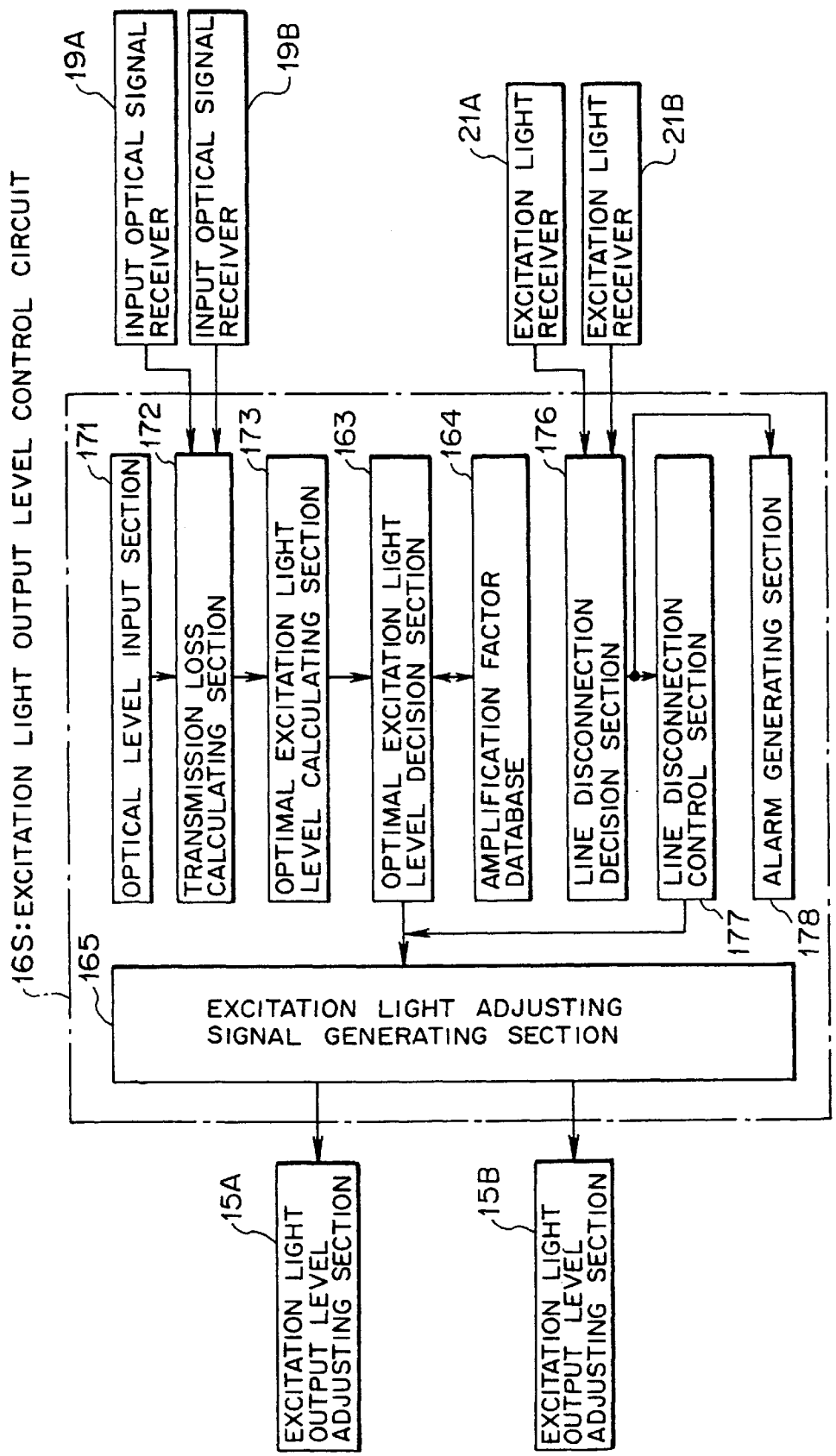
FIG. 37 is a block diagram showing a configuration of an excitation light output level control circuit in the fifth embodiment.

Hence, as shown in, for example, FIG. 37, the excitation light output level control circuit 16S includes an optical level input section 171, a transmission loss calculating section 172, and an optimal excitation light level calculating section 173 identical with those described above referring to FIG. 19 of the second embodiment, an optimal excitation light level decision section 163, an amplification factor database 164, and an excitation light adjusting signal generating section 165 identical with those described above referring to FIG. 3 of the first embodiment, and further includes a line disconnection decision section 176, a line disconnection control section 177, and an alarm generating section 178 identical with those described above referring to FIG. 31 of the fourth embodiment.

However, it is to be noted that, since the excitation light level adjusting sections 15A, 15B are respectively configured by using the polarization sections 151-i, and the optical switches 152, 153, the excitation light adjusting signal generating section 165 of the fifth embodiment includes an optical switch port decision section 166A, and optical switch control sections 167A, 168A identical with those shown in FIG. 6.

That is, the excitation light output level control circuit 16S of the fifth embodiment includes the control circuit 16E having the "actual transmission loss calculating function" described in the second embodiment, and additionally having the "line disconnection detecting function" described in the fourth embodiment.

Referring to the flowchart (Steps E1 to E11) shown in FIG. 38, a detailed description will now be given of an operation of the wavelength division multiplex optical transmission apparatus 1 of the fifth embodiment having the above configuration with attention to excitation light output level adjusting processing.

First, in the transmission apparatus 1, the optical level input section 171 of the excitation light output level control circuit 16S takes as inputs various types of optical levels (such as output signal optical level $P_S$ at an opposite side, local excitation light output level PL' minimum receive level Prmin, and maximum receive level Prmax) through a maintenance terminal (Step E1). Subsequently, the transmission loss calculating section 172 finds the actual transmission losses .LOSS for the respective wavelengths λ1, λ3 by subtracting the opposite output signal optical levels P, from the receive levels Pr' of the optical signals with the wavelengths λ1, λ3, received in the input optical signal receivers 19A, 19B (Step E2).

The obtained actual transmission losses $P_{LOSS}$ are passed to the optimal excitation light level calculating section 173. The optimal excitation light level calculating section 173 finds the optimal optical output levels P for the wavelengths λ1, λ3 by adding the respective actual transmission losses $P_{LOSS}$ from the transmission loss calculating section 172 to the optimal receive levels Pr[=(minimum receive levels Prmin+maximum receive levels Prmax)/2] of the optical signals with the wavelengths λ1, λ3 (Step E3).

The optimal optical output levels P of the respective send optical signals λ1, λ3 obtained in such a manner are given to the optimal excitation light level decision section 163. The optimal excitation light level decision section 163 refers to, with the given optimal optical output levels P as keys, amplification factor correspondence tables 164a (see FIG. 5) contained in the amplification factor database 164 to correspond to the wavelengths λ1, λ3 (Step E4), and decides whether or not the obtained optimal optical output levels P are appropriate values [whether or not the optimal optical output levels P are present (recorded) in the items "Optical level after amplification"] (Step E5).

As a result, if the optimal optical output levels P, the appropriate values, are recorded in the amplification factor correspondence tables 164a (if a decision of YES is given in Step E5), the optimal excitation light level decision section 163 extracts excitation light levels (optimal excitation light levels) corresponding to the optimal optical output levels P (Step E6).

On the other hand, if the optimal optical output levels P are not the appropriate values (if not recorded in the amplification factor correspondence tables 164a), for example, optical receive levels cannot be set to intermediate values between the maximum receive levels Prmax and the minimum receive levels Prmin due to, for example, long transmission distances even when the maximum amplification factors are provided in the optical amplifiers 4A, 4B. In this case, the optimal excitation light level decision section 163 extracts excitation light levels (maximum excitation light levels) providing the maximum optical levels after amplification from the amplification factor correspondence tables 164a so as to set the optical receive levels closer to the intermediate values (from No route in Step E5 to Step E7).

At the point in time, the excitation light output level control circuit 16S uses the above line disconnection decision section 176 to monitor whether or not the excitation light receivers 21A, 21B have received the excitation light signals λ2, λ4 (Step E8). If neither of the excitation light signals λ2, λ4 has been received (if a decision of NO is given in Step E8), the excitation light levels extracted as described above are passed to the excitation light adjusting signal generating section 165 as the optimal excitation light levels (Step E9).

Subsequently, as described above referring to FIG. 8 of the first embodiment, the excitation light adjusting signal generating section 165 generates polarization plate selecting signals as excitation light adjusting signals to control the excitation light output level adjusting sections 15A, 15B (the optical switches 152, 153). That is, in the excitation light adjusting signal generating section 165, the optical switch port decision section 166A first finds differences between excitation light output levels $P_L$ (current excitation light levels) from the parameter input section 161 and the optimal excitation light levels obtained by the optimal excitation light level decision section 163 as described above (see Step A8 in FIG. 8).

If there are the differences, the optical switch port decision section 166A decides by how many decibels the current excitation light levels should be increased or decreased in order to set the differences to zeros, and selects polarization plate numbers (optical switch port numbers) corresponding thereto (see Step A9 in FIG. 8) so as to post the polarization plate numbers to the optical switch control sections 167A, 168A. The optical switch control sections 167A, 168A generate and feed to the excitation light output level adjusting sections 15A, 15B polarization plate selecting signals depending upon the optical switch port numbers from the optical switch port decision section 166A. Thereby, ports 152-i, 153-i of the respective optical switches 152, 153 are placed in excitation light conducting states such that excitation lights can pass through the selected polarization sections 151-i (see Step A10 in FIG. 8).

This controls to the optimal optical levels the optical output levels of the respective excitation light signals λ2, λ4 generated in the respective excitation light sources 14A, 14B. The respective send optical signals λ1, λ3 generated in the respective optical sending sections 2A, 2B are amplified in the optical amplifiers 4A, 4B to the optimal optical output levels according to the transmission distances of the optical signals with the wavelengths λ1, λ3 and a state (loss) of the optical transmission line 12, and are sent to the optical transmission line 12.

On the other hand, if the excitation light receivers 21A, 21B have received the excitation light signals λ2, λ4 (if a decision of YES is given in Step E8), the line disconnection control section 177 instructs the optical switch port decision section 166A of the excitation light adjusting signal generating section 165 to select the polarization sections 151-i having polarization factors which provide infinite attenuation of the excitation light signals λ2, λ4.

Thereby, the optical switch port decision section 166A posts to the optical switch control sections 167A, 168A the numbers of the polarization sections 151-i (optical switch port numbers) having the polarization factors which provide the infinite attenuation of the excitation light signals λ2, λ4. The optical switch control sections 167A, 168A generate and feed to the excitation light output level adjusting sections 15A, 15B the polarization plate selecting signals depending upon the optical switch port numbers from the optical switch port decision section 166A. Consequently, the ports 152-i, 153-i of the respective optical switches 152, 153 are placed in the excitation light conducting states such that the excitation lights can pass through the selected polarization sections 151-i.

As a result, the optical output levels of the respective excitation light signals λ2, λ4 from the excitation light sources 14A, 14B are attenuated in the selected polarization sections 151-i to the utmost extent, resulting in zeros (Step E10). Subsequently, the control circuit 16S uses the alarm generating section 178 to give the alarm indicating the disconnection state of the optical transmission line 12 (Step E11). Moreover, in the embodiment, it must be noted that the zero adjustment processing for the excitation light output levels and the alarm generation processing may be performed in any order, or may be performed in parallel with each other.

As stated above, according the wavelength division multiplex optical transmission apparatus 1 of the fifth embodiment, as in the second embodiment, the optical output levels of the respective send optical signals λ1, λ3 are adjusted depending upon the actual transmission losses $P_{LOSS}$ of the optical signals with the wavelengths λ1, λ3 actually transmitted through the optical transmission line 12, and with consideration given to the actual state (such as loss) of the optical transmission line 12. Consequently, it is possible to more accurately adjust the optical output levels of the send optical signals λ1, λ3 to the optimal values.

Further, in the fifth embodiment, when the excitation light signals λ2, λ4 generated in the excitation light sources 14A, 14B at the local station return through the optical transmission line 12, and are received by the excitation light receivers 21A, 21B, the decision of disconnection state of the optical transmission line 12 is made to set the optical output levels of the excitation light signals λ2, λ4 to zeros, and give the alarm. Thus, it is possible to obtain the same advantages as those described in the above fourth embodiment.

Additionally, in the fifth embodiment, the optical switches 152, 153 of the excitation light output level adjusting sections 15A, 15B are controlled by the electric signals, thereby selecting the polarization sections 151-i to pass the excitation light signals λ2, λ4 therethrough. Thus, it is possible to adjust the optical levels of the send optical signals λ1, λ3 after the optical amplification to the optimal optical levels at a very high speed.

(E1) Description of First Modification of Fifth Embodiment

Figure 39:
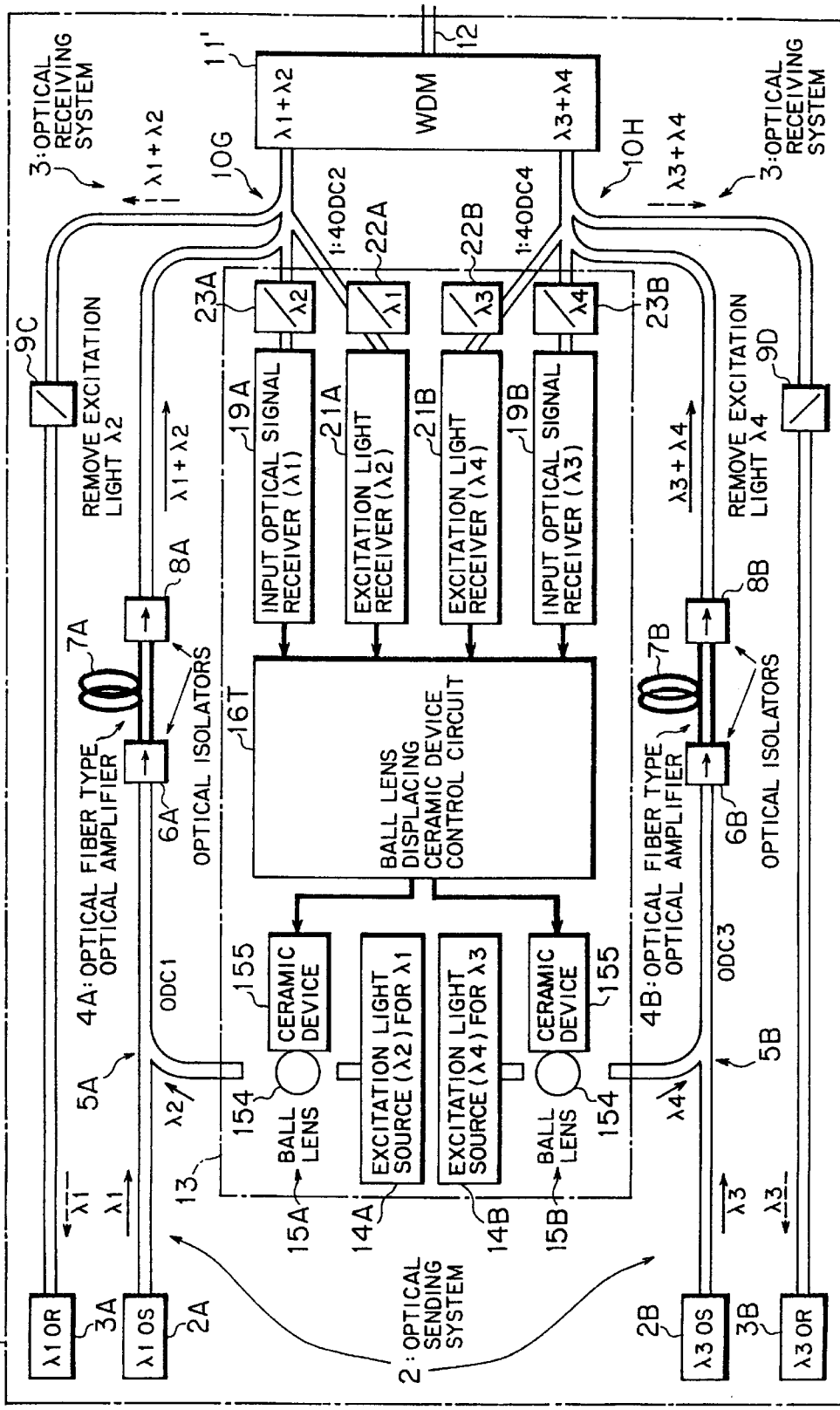
FIG. 39 is a block diagram showing a configuration of a wavelength division multiplex optical transmission apparatus serving as a first modification of the fifth embodiment.

FIG. 39 is a block diagram showing a configuration of a wavelength division multiplex optical transmission apparatus 1 serving as a first modification of the fifth embodiment. The transmission apparatus 1 shown in FIG. 39 is different from that shown in FIG. 36 in that excitation light output level adjusting sections 15A, 15B are respectively configured by using the ball lenses 154 and the ceramic devices 155 described in the above first modification (see FIG. 9) of the first embodiment, and an excitation light output level control circuit (ball lens displacing ceramic device control circuit) 16T is provided instead of the excitation light output level control circuit 16S.

Here, the above ball lens displacing ceramic device control circuit 16T basically has the same configuration as that shown in FIG. 37. However, since the excitation light output level adjusting sections 15A, 15B are respectively configured by using the ball lenses 154 and the ceramic devices 155, an excitation light adjusting signal generating section 165 includes a ball lens displacement decision section 166B, ceramic device applied voltage control sections 167B, 168B, and a ball lens displacement-ceramic device applied voltage database 169B identical with those shown in FIG. 10.

That is, in the wavelength division multiplex optical transmission apparatus 1 in the first modification of the fifth embodiment, optical output levels of excitation light signals λ2, λ4 generated in excitation light sources 14A, 14B are respectively adjusted by the ball lenses 154 and the ceramic devices 155 in an optical output level control section 13 of the type finding the optimal optical output levels P depending upon the above-mentioned actual transmission losses $P_{LOSS}$ to adjust the optical output levels of the excitation light signals λ2, λ4 according the optimal optical output levels P, and monitoring return optical signals of the excitation light signals λ2, λ4 to detect line disconnection.

Accordingly, in Step E9 described above referring to FIG. 38, excitation light output level adjusting processing of the transmission apparatus 1 in the modification is identical with the processing from Steps A11 to A13 described above referring to FIG. 11. That is, the control circuit 16T first finds the actual transmission losses $P_{LOSS}$ of send optical signals λ1, λ3 depending upon the various types of above-mentioned optical levels input through an optical level input section 161 and receive optical signals λ1, λ3 received in input optical signal receivers 19A, 19B, and finds the optimal optical output levels P depending upon the actual transmission losses $P_{LOSS}$ to determine optimal excitation light levels according to the obtained optimal optical output levels P (see Steps E1 to E7 in FIG. 38).

Figure 38:
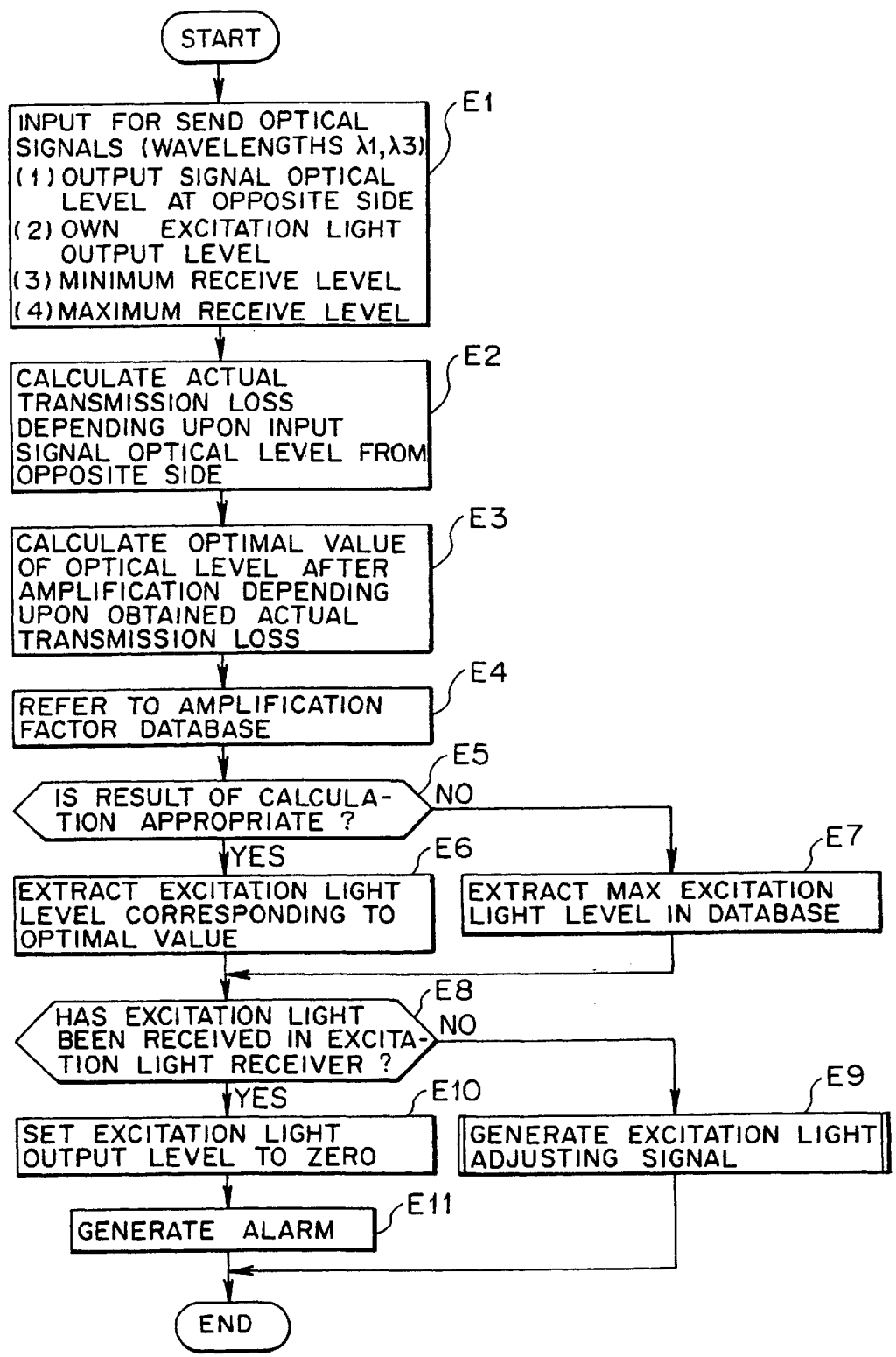
FIG. 38 is a flowchart for illustrating excitation light output level adjusting processing in the wavelength division multiplex optical transmission apparatus of the fifth embodiment.

Then, if neither of the excitation light signals λ2, λ4 has been received in excitation light receivers 21A, 21B (see NO route in Step E8 in FIG. 38), the optimal excitation light levels determined as described above are passed to the excitation light adjusting signal generating section 165 (see Step E9 in FIG. 38). Subsequently, as in the first modification of the first embodiment, the excitation light adjusting signal generating section 165 finds positional displacements of the ball lenses 154, corresponding to the optimal excitation light levels input from the optimal excitation light level decision section 163. The positional displacements are converted into values of applied voltages to the ceramic devices 155, and the voltages are applied to the ceramic devices 155.

This varies focus positions of the excitation light signals λ2, λ4 on the ball lenses 154 to adjust the optical output levels of the respective excitation light signals λ2, λ4 from the excitation light sources 14A, 14B to the above optimal excitation light levels (see Steps A11 to A13 in FIG. 11).

As a result, the respective send optical signals λ1, λ3 are amplified in the optical amplifiers 4A, 4B to optimal optical output levels according to transmission distances of the optical signals with the respective wavelengths λ1, λ3 and a state (loss) of an optical transmission line 12, and are sent to the optical transmission line 12.

As described above, according to the wavelength division multiplex optical transmission apparatus 1 in the first modification of the fifth embodiment, the controls of the voltages applied to the ceramic devices 155 of the excitation light output level adjusting sections 15A, 15B vary the focus positions (refractive indexes) of the excitation light signals λ2, λ4 on the ball lenses 154. Therefore, it is possible to vary the optical output levels of the excitation light signals λ2, λ4 in an analog manner, and adjust the optical output levels of the excitation light signals λ2, λ4 more precisely than would be in the above-mentioned fifth embodiment.

(E2) Description of Second Modification of Fifth Embodiment

Figure 40:
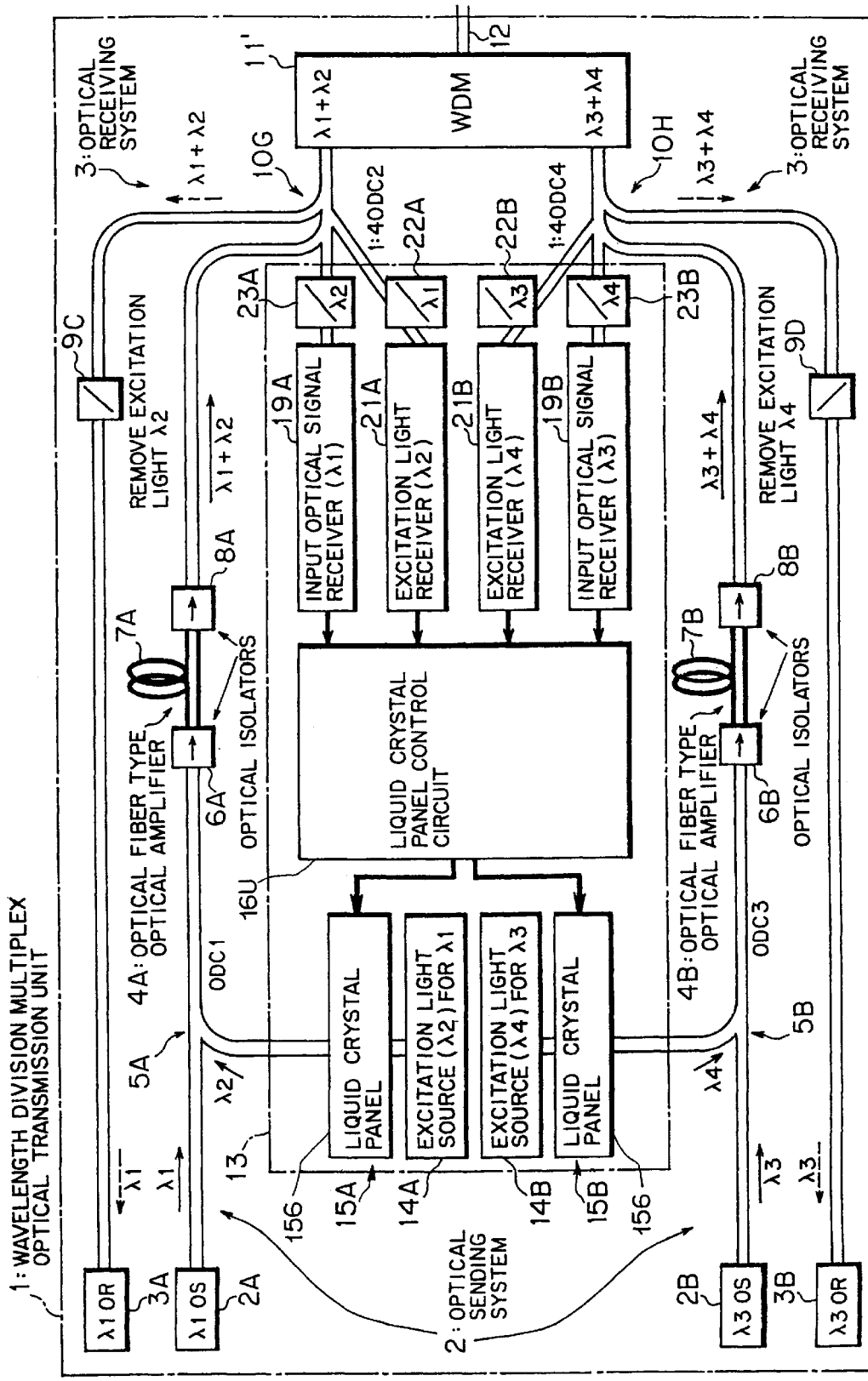
FIG. 40 is a block diagram showing a configuration of a wavelength division multiplex optical transmission apparatus serving as a second modification of the fifth embodiment.

FIG. 40 is a block diagram showing a configuration of a wavelength division multiplex optical transmission apparatus 1 serving as a second modification of the fifth embodiment. The transmission apparatus 1 shown in FIG. 40 is different from that shown in FIG. 36 in that excitation light output level adjusting sections 15A, 15B are respectively configured by using the liquid crystal panels 156 described in the second modification (see FIG. 12) of the first embodiment, and an excitation light output level control circuit (liquid crystal panel control circuit) 16U is provided instead of the excitation light output level control circuit 16S.

Here, the above liquid crystal panel control circuit 16U basically has the same configuration as that shown in FIG. 37. However, since the excitation light output level adjusting sections 15A, 15B are respectively configured by using the liquid crystal panels 156, an excitation light adjusting signal generating section 165 includes a liquid crystal panel applied voltage decision section 166C, liquid crystal panel applied voltage control sections 167C, 168C, and a liquid crystal panel applied voltage database 169C identical with those shown in FIG. 13.

That is, in the wavelength division multiplex optical transmission apparatus 1 in the second modification of the fifth embodiment, optical output levels of excitation light signals λ2, λ4 generated in the excitation light sources 14A, 14B are respectively adjusted by the liquid crystal panels 156 in an optical output level control section 13 of the type finding the optimal optical output levels P depending upon the above-mentioned actual transmission losses $P_{LOSS}$ to adjust the optical output levels of excitation light signals λ2, λ4 according the optimal optical output levels P, and monitoring return optical signals of the excitation light signals λ2, λ4 to detect line disconnection.

Accordingly, in Step E9 described above referring to FIG. 38, excitation light output level adjusting processing of the transmission apparatus 1 in the modification is identical with the processing from Steps A14 to A16 described above referring to FIG. 14. That is, the control circuit 16U first finds the actual transmission losses $P_{LOSS}$ of send optical signals λ1, λ3 depending upon the various types of above-mentioned optical levels input through an optical level input section 161 and the receive optical signals λ1, λ3 received in input optical signal receivers 19A, 19B, and finds the optimal optical output levels P depending upon the actual transmission losses $P_{LOSS}$ to determine optimal excitation light levels according to the obtained optimal optical output levels P (see Steps E1 to E7 in FIG. 38).

Then, if neither of the excitation light signals λ2, λ4 has been received in excitation light receivers 21A, 21B (see NO route in Step E8 in FIG. 38), the optimal excitation light levels determined as described above are passed to the excitation light adjusting signal generating section 165 (see Step E9 in FIG. 38). Subsequently, as in the second modification of the first embodiment, the excitation light adjusting signal generating section 165 finds applied voltages to the liquid crystal panels 156, corresponding to the optimal excitation light levels input from the optimal excitation light level decision section 163 to apply the applied voltages to the respective liquid crystal panels 156.

This varies light transmittances of the liquid crystal panels to adjust the optical output levels of the excitation light signals λ2, λ4 from the excitation light sources 14A, 14B to the above optimal excitation light levels (see Steps A14 to A16 in FIG. 14). As a result, the respective send optical signals λ1, λ3 are amplified in the optical amplifiers 4A, 4B to optimal optical output levels according to transmission distances of the optical signals with the respective wavelengths λ1, λ3 and a state (loss) of an optical transmission line 12, and are sent to the optical transmission line 12.

As stated above, in the wavelength division multiplex optical transmission apparatus 1 in the second modification of the fifth embodiment, the variations in applied voltages to the liquid crystal panels 156 of the excitation light output level adjusting sections 15A, 15B can adjust the optical output levels of the excitation light signals λ2, λ4. Therefore, it is possible to vary the optical output levels of the excitation light signals λ2, λ4 in an analog manner, and adjust the optical output levels of the excitation light signals λ2, λ4 more precisely in a simpler configuration than would be in the above-mentioned fifth embodiment.

(E3) Description of Third Modification of Fifth Embodiment

Figure 41:
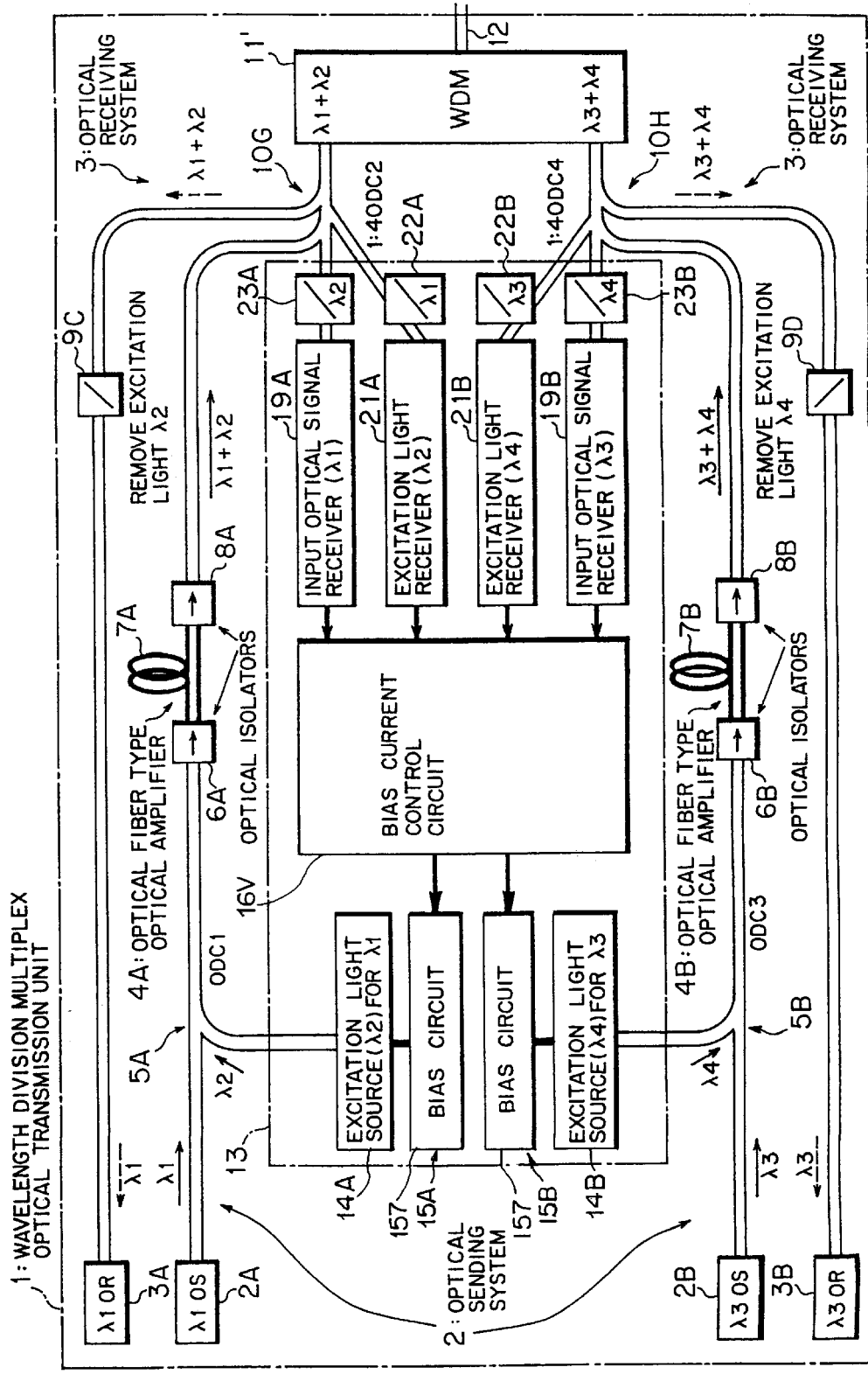
FIG. 41 is a block diagram showing a configuration of a wavelength division multiplex optical transmission apparatus serving as a third modification of the fifth embodiment.

FIG. 41 is a block diagram showing a configuration of a wavelength division multiplex optical transmission apparatus 1 serving as a third modification of the fifth embodiment. The transmission apparatus 1 shown in FIG. 41 is different from that shown in FIG. 36 in that excitation light output level adjusting sections 15A, 15B are respectively configured by using the bias circuits 157 described in the third modification (see FIG. 15) of the first embodiment, and an excitation light output level control circuit (bias current control circuit) 16V is provided instead of the excitation light output level control circuit Here, the above bias current control circuit 16V basically has the same configuration as that shown in FIG. 37. However, since the excitation light output level adjusting sections 15A, 15B are respectively configured by using the bias circuits 157, an excitation light adjusting signal generating section 165 includes a bias current decision section 166D, bias circuit control sections 167D, 168D, and a bias current database 169D identical with those shown in FIG. 16.

That is, in the wavelength division multiplex optical transmission apparatus 1 in the third modification of the fifth embodiment, optical output levels of excitation light signals λ2, λ4 generated in excitation light sources 14A, 14B are respectively adjusted by the bias circuits 157 in an optical output level control section 13 of the type finding the optimal optical output levels P depending upon the above-mentioned actual transmission losses $P_{LOSS}$ to adjust the optical output levels of the excitation light signals λ2, λ4 according the optimal optical output levels P, and monitoring return optical signals of the excitation light signals λ2, λ4 to detect line disconnection.

Accordingly, in Step E9 described above referring to FIG. 38, excitation light output level adjusting processing of the transmission apparatus 1 in the modification is identical with the processing from Steps A17 to A19 described above referring to FIG. 17. That is, the control circuit 16V first finds the actual transmission losses $P_{LOSS}$ of send optical signals λ1, λ3 depending upon the various types of above-mentioned optical levels input through an optical level input section 161 and the receive optical signals λ1, λ3 received in input optical signal receivers 19A, 19B, and finds the optimal optical output levels P depending upon the actual transmission losses $P_{LOSS}$ to determine optimal excitation light levels according to the obtained optimal optical output levels P (see Steps E1 to E7 in FIG. 38).

Then, if neither of the excitation light signals λ2, λ4 has been received in excitation light receivers 21A, 21B (see NO route in Step E8 in FIG. 38), the optimal excitation light levels determined as described above are passed to the excitation light adjusting signal generating section 165 (see Step E9 in FIG. 38). Subsequently, as in the third modification of the first embodiment, the excitation light adjusting signal generating section 165 finds values of bias currents applied to the bias circuits 157, corresponding to the optimal excitation light levels input from the optimal excitation light level decision section 163 so as to feed the bias currents to the respective bias circuits 157.

This varies amounts of bias currents from the bias circuits 157 to the respective excitation light sources 14A, 14B to adjust the optical output levels of the respective excitation light signals λ2, λ4 generated in the excitation light sources 14A, 14B to the above optimal excitation light levels (see Steps A17 to A19 in FIG. 17). As a result, the respective send optical signals λ1, λ3 are amplified in the optical amplifiers 4A, 4B to the optimal optical output levels according to transmission distances of the optical signals with the respective wavelengths λ1, λ3, and are sent to an optical transmission line 12.

As described above, in the wavelength division multiplex optical transmission apparatus 1 in the third modification of the fifth embodiment, the excitation light output level adjusting sections 15A, 15B are respectively configured as the bias circuits 157 which can vary the amounts of currents fed to the excitation light sources 14A, 14B. Therefore, it is possible to vary the optical output levels of the excitation light signals λ2, λ4 generated in the excitation light sources 14A, 14B directly and in an analog manner, and adjust the optical output levels of the excitation light signals λ2, λ4 more accurately and more precisely than would be in the above-mentioned fifth embodiment.

(F) Description of Sixth Embodiment

Figure 42:
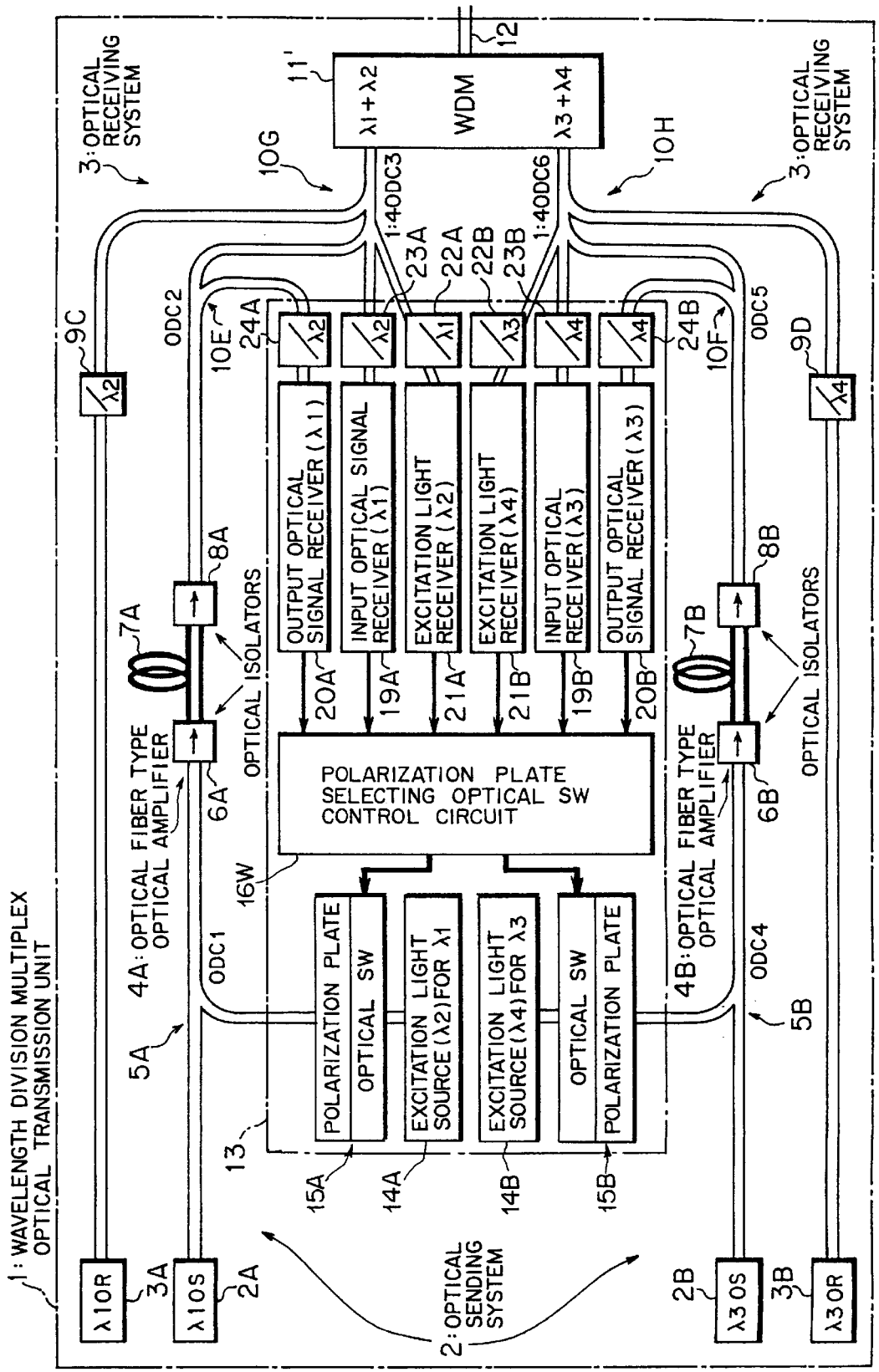
FIG. 42 is a block diagram showing a configuration of a wavelength division multiplex optical transmission apparatus serving as the sixth embodiment of the present invention.

FIG. 42 is a block diagram showing a configuration of a wavelength division multiplex optical transmission apparatus serving as the sixth embodiment of the present invention. The transmission apparatus 1 shown in FIG. 42 is different from that shown in FIG. 36 of the above-mentioned fifth embodiment in that an optical output level control section 13 includes, in addition to input optical signal receivers 19A, 19B, excitation light receivers 21A, 21B, optical band-pass filters 22A, 22B, 23A, and 23B, optical band-pass filters 24A, 24B, and output optical signal receivers 20A, 20B identical with those described above referring to FIG. 24 of the third embodiment, and further includes an excitation light output level control circuit (polarization plate selecting optical switch control circuit) 16W instead of the excitation light output level control circuit 16S.

Further, another difference is that optical couplers 10E, 10F are mounted to output terminals of respective optical amplifiers 4A, 4B to cause an optical signal λ1+λ2 after optical amplification and an optical signal λ3+λ4 after optical amplification to branch to the side of a WDM coupler 11' and the sides of the output optical signal receivers 20A, 20B. Moreover, it will be appreciated that excitation light level adjusting sections 15A, 15B respectively include polarization sections 151-i, and optical switches 152, 153 as in those shown in FIG. 2.

Here, in the optical output level control section 13, the optical band-pass filter 24A removes an optical signal with a wavelength λ2 (that is, an excitation light signal λ2) from the optical signal λ1+λ2 after optical amplification, input after the branch at the optical coupler 10H. The optical band-pass filter 24B similarly removes an optical signal with a wavelength λ4 (that is, an excitation light signal λ4) from the optical signal λ3+λ4 after optical amplification, input after the branch at the optical coupler 10F. The respective filters 24A, 24B allow the respective output optical signal receivers 20A, 20B to receive only send optical signals λ1, λ3 after optical amplification.

As in the control circuit 16S of the fifth embodiment, the excitation light output level control circuit 16W of the sixth embodiment adjusts optical output levels of the excitation light signals λ2, λ4 according the optimal optical output levels P obtained depending upon actual transmission losses $P_{LOSS}$, and monitors return optical signals of the excitation light signals λ2, λ4 to enable detection of line disconnection. Here, it is also possible to correct the optimal optical output levels P depending upon the optical level of the send optical signals λ1, λ3 after optical amplification, received in the output optical signal receivers 20A, 20B.

Figure 43:
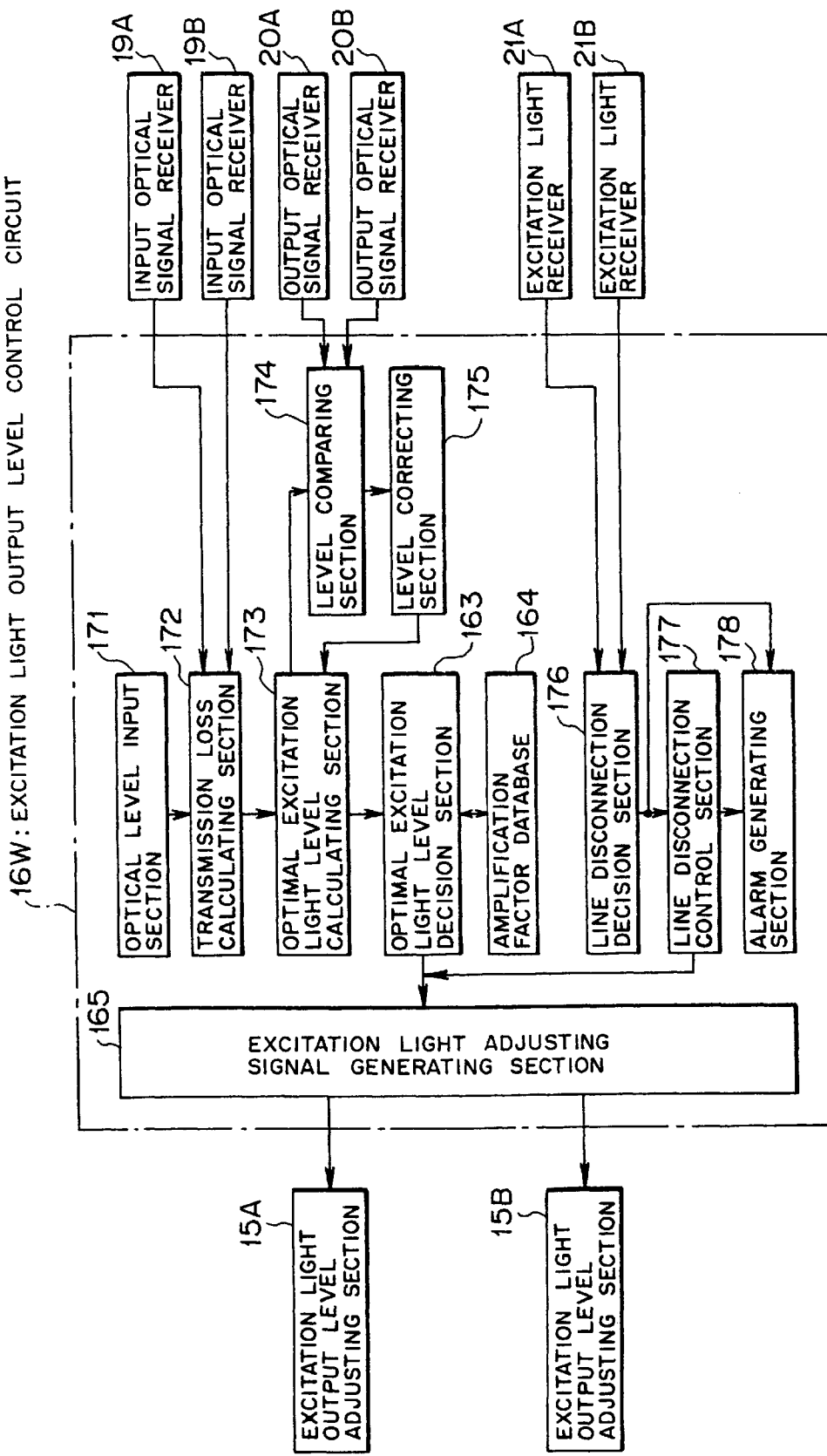
FIG. 43 is a block diagram showing a configuration of an excitation light output level control circuit in the sixth embodiment.

Hence, as shown in, for example, FIG. 43, the excitation light output level control circuit 16W has the configuration shown in FIG. 37 in the fifth embodiment, in which there are additionally provided a level comparing section 174 and a level correcting section 175 identical with those shown in FIG. 25 of the third embodiment. Moreover, an optical level input section 171, a transmission loss calculating section 172, and an optimal excitation light level calculating section 173 are identical with those described above referring to FIG. 19. An optimal excitation light level decision section 163, an amplification factor database 164, and an excitation light adjusting signal generating section 165 are identical with those described above referring to FIG. 3 of the first embodiment. A line disconnection decision section 176, a line disconnection control section 177, and an alarm generating section 178 are respectively identical with those described above referring to FIG. 31 of the fourth embodiment.

However, in the embodiment, it is to be noted that, since the excitation light level adjusting sections 15A, 15B are respectively configured by using the polarization sections 151-i, and the optical switches 152, 153, the excitation light adjusting signal generating section 165 includes an optical switch port decision section 166A, and optical switch control sections 167A, 168A identical with those shown in FIG. 6.

That is, in the excitation light output level control circuit 16W of the sixth embodiment, the "optimal optical output level correcting function" described in the third embodiment is added to the control circuit 16S described in the fifth embodiment, having the "actual transmission loss calculating function" and the "line disconnection detecting function."

Referring to the flowchart (Steps F1 to F14) shown in FIG. 44, a detailed description will now be given of an operation of the wavelength division multiplex optical transmission apparatus 1 of the sixth embodiment having the above configuration with attention to excitation light output level adjusting processing.

First, in the transmission apparatus 1, the optical level input section 171 of the excitation light output level control circuit 16W takes as inputs the various types of optical levels (such as output signal optical level $P_S$ at an opposite side, local excitation light output level $P_L$, minimum receive level Prmin, and maximum receive level Prmax) through a maintenance terminal (Step F1). Subsequently, the transmission loss calculating section 172 finds the actual transmission losses $P_{LOSS}$ for the respective wavelengths λ1, λ3 by subtracting the opposite output signal optical levels $P_S$ from the receive levels Pr' of the optical signals with the wavelengths λ1, λ3, received in the input optical signal receivers 19A, 19B (Step F2).

The obtained actual transmission losses $P_{LOSS}$ are passed to the optimal excitation light level calculating section 173. The optimal excitation light level calculating section 173 finds the optimal optical output levels P for the wavelengths λ1, λ3 by adding the above actual transmission losses $P_{LOSS}$ from the transmission loss calculating section 172 to the optimal receive levels Pr[=(minimum receive levels Prmin+ maximum receive levels Prmax)/2] of the optical signals with the wavelengths λ1, λ3 (Step F3).

The optimal optical output levels P of the respective send optical signals λ1, λ3 obtained in such a manner are given to the optimal excitation light level decision section 163. The optimal excitation light level decision section 163 refers to, with the given optimal optical output levels P as keys, amplification factor correspondence tables 164*a* (see FIG. 5) contained in the amplification factor database 164 to correspond to the wavelengths λ1, λ3 (Step F4), and decides whether or not the obtained optimal optical output levels P are appropriate values [whether or not the optimal optical output levels P are present (recorded) in the items "Optical level after amplification"] (Step F5).

As a result, if the optimal optical output levels P, the appropriate values, are recorded in the amplification factor correspondence tables 164*a* (if a decision of YES is given in Step F5), the optimal excitation light level decision section 163 extracts excitation light levels (optimal excitation light levels) corresponding to the optimal optical output levels P (Step F6).

On the other hand, if the optimal optical output levels P are not the appropriate values (if not recorded in the amplification factor correspondence tables 164*a*), for example, optical receive levels cannot be set to intermediate values between the maximum receive levels Prmax and the minimum receive levels Prmin due to, for example, long transmission distances even when the maximum amplification factors are provided in the optical amplifiers 4A, 4B. In this case, the optimal excitation light level decision section 163 extracts excitation light levels (maximum excitation light levels) providing the maximum optical levels after amplification from the amplification factor correspondence tables 164*a* so as to set the optical receive levels closer to the intermediate values (from No route in Step F5 to Step F7).

At the point in time, the excitation light output level control circuit 16W uses the line disconnection decision section 176 to monitor whether or not the excitation light receivers 21A, 21B have received the excitation light signals λ2, λ4 (Step F8). If the excitation light signals λ2, λ4 have been received (if a decision of YES is given in Step F8), the line disconnection control section 177 instructs the optical switch port decision section 166A of the excitation light adjusting signal generating section 165 to select the polarization sections 151-i having polarization factors which provide infinite attenuation of the excitation light signals λ2, λ4.

Thereby, the optical switch port decision section 166A posts to the optical switch control sections 167A, 168A the numbers of the polarization sections 151-i (optical switch port numbers) having the polarization factors which provide the infinite attenuation of the excitation light signals λ2, λ4. The optical switch control sections 167A, 168A generate and feed to the excitation light output level adjusting sections 15A, 15B the polarization plate selecting signals depending upon the optical switch port numbers from the optical switch port decision section 166A. Consequently, ports 152-i, 153-i of the respective optical switches 152, 153 are placed in excitation light conducting states such that excitation lights can pass through the selected polarization sections 151-i.

As a result, the optical output levels of the excitation light signals λ2, λ4 from excitation light sources 14A, 14B are attenuated in the selected polarization sections 151-i to the utmost extent, resulting in zeros (Step F9). Subsequently, the control circuit 16W uses the alarm generating section 178 to give an alarm indicating a disconnection state of an optical transmission line 12 (Step F10). Moreover, in the embodiment, it must be noted that the zero adjustment processing for the excitation light output levels and the alarm generation processing may be performed in any order, or may be performed in parallel with each other.

On the other hand, if neither of the excitation light signals λ2, λ4 has been received in the excitation light receivers 21A, 21B, the excitation light levels extracted in the Step F6 or F7 are passed to the excitation light adjusting signal generating section 165 as the optimal excitation light levels (Step F11 Subsequently, as described above referring to FIG. 8 of the first embodiment, the excitation light adjusting signal generating section 165 generates polarization plate selecting signals as excitation light adjusting signals to control the excitation light output level adjusting sections 15A, 15B (the optical switches 152, 153).

That is, in the excitation light adjusting signal generating section 165, the optical switch port decision section 166A first finds differences between the excitation light output levels $P_L$ (current excitation light levels) from the parameter input section 161 and the optimal excitation light levels obtained by the optimal excitation light level decision section 163 as described above (see Step A8 in FIG. 8).

If there are the differences, the optical switch port decision section 166A decides by how many decibels the current excitation light levels should be increased or decreased in order to set the differences to zeros, and selects polarization plate numbers (optical switch port numbers) corresponding thereto (see Step A9 in FIG. 8) so as to post the polarization plate numbers to the optical switch control sections 167A, 168A.

The optical switch control sections 167A, 168A generate and feed to the excitation light output level adjusting sections 15A, 15B polarization plate selecting signals depending upon the optical switch port numbers from the optical switch port decision section 166A (Step F11). Thereby, the ports 152-i, 153-i of the respective optical switches 152, 153 are placed in the excitation light conducting states such that the excitation lights can pass through the selected polarization sections 151-i (see Step A10 in FIG. 8).

This controls to the optimal optical levels the optical output levels of the respective excitation light signals λ2, λ4 generated in the respective excitation light sources 14A, 14B. The respective send optical signals λ1, λ3 generated in the respective optical sending sections 2A, 2B are amplified in the optical amplifiers 4A, 4B to the optimal optical output levels according to the transmission distances of the optical signals with the wavelengths λ1, λ3 and a state (loss) of the optical transmission line 12, and are sent to the optical transmission line 12.

Subsequently, in the sixth embodiment, after the controls of the excitation light output level adjusting sections 15A, 15B adjust the optical output levels of the respective excitation light signals λ2, λ4 to the optical excitation light levels as stated above, the level comparing section 174 compares the optimal optical output levels P of the respective wavelengths λ1, λ3, found in the optimal excitation light level calculating section 173 with the optical levels of the send optical signals λ1, λ3 after optical amplification, received in the output optical signal receivers 20A, 20B (Step F12).

As a result, if both the optical levels are identical, i.e., no errors are caused between the optical levels (if a decision of NO is given in Step F13), output of the optimal optical output levels P at the point in time are maintained in the optimal excitation light level calculating section 173, and the excitation light adjusting signal generating section 165 continues generation of the same excitation light adjusting signals as those one time before such that the excitation light signals λ2, λ4 can respectively have the same optimal excitation light levels as those one time before.

On the other hand, if the errors are caused between the respective optical levels (if a decision of YES is given in Step F13), the level correcting section 175 instructs the optimal excitation light level calculating section 173 to recalculate the optimal optical output levels P, thereby causing the optimal excitation light level calculating section 173 to recalculate the optimal optical output levels P so as to set the respective optical level errors to zeros (Step F14).

Thereafter, unless the excitation light receivers 21A, 21B receive the excitation light signals λ2, λ4, the excitation light output level control circuit 16W repeats the above correction processing until the errors become zeros (or approximately zeros) for a period for which errors are left between the optimal optical output levels P and the optical levels of the send optical signals λ1, λ3 after optical amplification.

As stated above, according the wavelength division multiplex optical transmission apparatus 1 of the sixth embodiment, the excitation light output level control circuit 16W has, in addition to the "actual transmission loss calculating function" and the "line disconnection detecting function" described in the fifth embodiment, the "optimal optical output level correcting function" described in the third embodiment. Thus, it is possible to continuously stabilize the optical levels of the respective send optical signals λ1, λ3 at the optimal levels while following the variations in optical levels of the send optical signals λ1, λ3 after optical amplification, while reducing power consumption at the time of the disconnection state of the optical transmission line 12, and posting the optical transmission line disconnection state to the outside.

Additionally, in the sixth embodiment, the optical switches 152, 153 of the excitation light output level adjusting sections 15A, 15B are controlled by the electric signals, thereby selecting the polarization sections 151-i to pass the excitation light signals λ2, λ4 therethrough. Hence, it is possible to adjust the optical levels of the send optical signals λ1, λ3 after optical amplification to the optimal optical levels at a very high speed.

(F1) Description of First Modification of Sixth Embodiment

Figure 45:
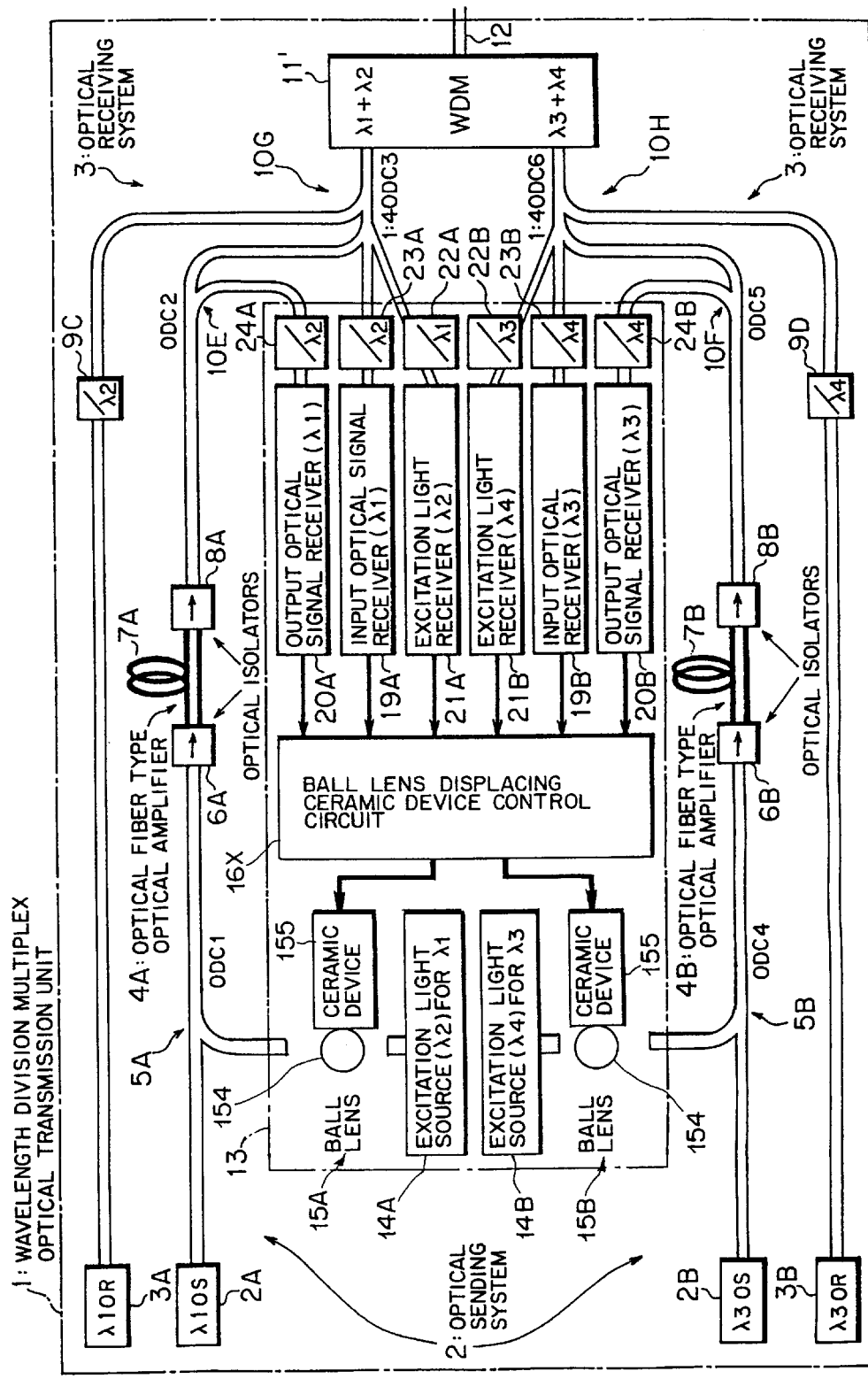
FIG. 45 is a block diagram showing a configuration of a wavelength division multiplex optical transmission apparatus serving as a first modification of the sixth embodiment.

FIG. 45 is a block diagram showing a configuration of a wavelength division multiplex optical transmission apparatus 1 serving as a first modification of the sixth embodiment. The transmission apparatus 1 shown in FIG. 45 is different from that shown in FIG. 42 in that excitation light output level adjusting sections 15A, 15B are respectively configured by using the ball lenses 154 and the ceramic devices 155 described in the above first modification (see FIG. 9) of the first embodiment, and an excitation light output level control circuit (ball lens displacing ceramic device control circuit) 16X is provided instead of the excitation light output level control circuit 16W.

Here, the above ball lens displacing ceramic device control circuit 16T basically has the same configuration as that shown in FIG. 43. However, since the excitation light output level adjusting sections 1SA, 15B are respectively configured by using the ball lenses 154 and the ceramic devices 155, an excitation light adjusting signal generating section 165 includes a ball lens displacement decision section 166B, ceramic device applied voltage control sections 167B, 168B, and a ball lens displacement-ceramic device applied voltage database 169B identical with those shown in FIG. 10.

That is, in the wavelength division multiplex optical transmission apparatus 1 in the first modification of the sixth embodiment, optical output levels of excitation light signals λ2, λ4 generated in excitation light sources 14A, 14B are respectively adjusted by the ball lenses 154 and the ceramic devices 155 in an optical output level control section 13 of the type adjusting the optical output levels of the excitation light signals λ2, λ4 according optimal optical output levels P obtained depending upon the above-mentioned actual transmission losses $P_{LOSS}$, correcting the above optimal optical output levels P according to optical levels of send optical signals λ1, λ3 after actual optical amplification, and monitoring return optical signals of the excitation light signals λ2, λ4 to detect line disconnection.

Accordingly, in Step F11 described above referring to FIG. 44, excitation light output level adjusting processing of the transmission apparatus 1 in the modification is identical with the processing from Steps A11 to A13 described above referring to FIG. 11. That is, the control circuit 16X first founds the actual transmission losses $P_{LOSS}$ of the send optical signals λ1, λ3 depending upon the various types of above-mentioned optical levels input through an optical level input section 161 and receive optical signals λ1, λ3 received in input optical signal receivers 19A, 19B, and finds the optimal optical output levels P depending upon the actual transmission losses $P_{LOSS}$ to determine optimal excitation light levels according to the obtained optimal optical output levels P (see Steps F1 to F7 in FIG. 44).

Figure 44:
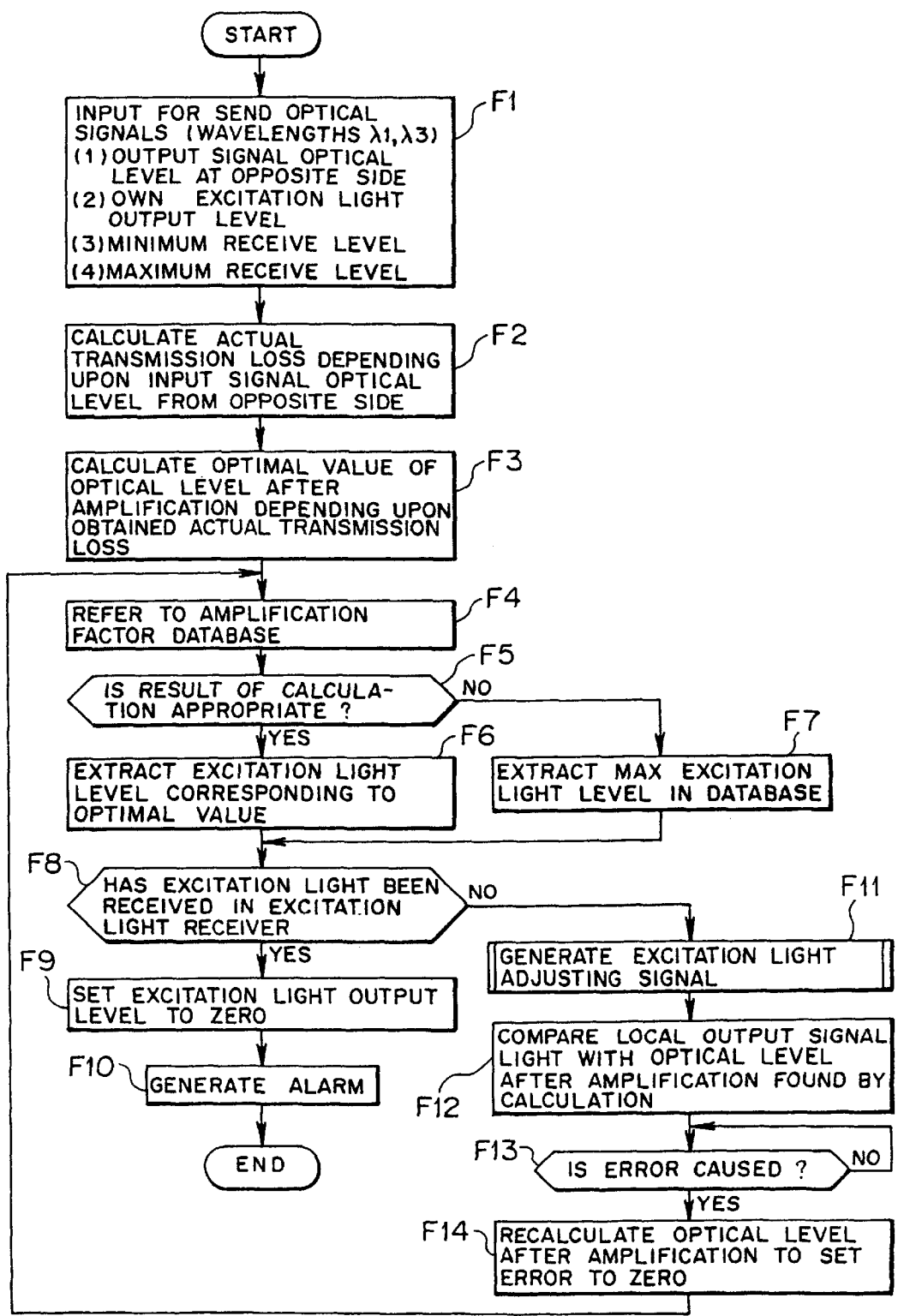
FIG. 44 is a flowchart for illustrating excitation light output level adjusting processing in the wavelength division multiplex optical transmission apparatus of the sixth embodiment.

Then, if neither of the excitation light signals λ2, λ4 has been received in excitation light receivers 21A, 21B (see NO route in Step F8 in FIG. 44), the optimal excitation light levels determined as described above are passed to the excitation light adjusting signal generating section 165 (see Step F11 in FIG. 44). Subsequently, as in the first modification of the first embodiment, the excitation light adjusting signal generating section 165 finds positional displacements of the ball lenses 154, corresponding to the optimal excitation light levels input from the optimal excitation light level decision section 163. The positional displacements are converted into values of voltages applied to the ceramic devices 155, and the voltages are applied to the ceramic devices 155.

This varies focus positions of the excitation light signals λ2, λ4 on the ball lenses 154 to adjust the optical output levels of the respective excitation light signals λ2, λ4 from the excitation light sources 14A, 14B to the above optimal excitation light levels (see Steps A11 to A13 in FIG. 11).

As described above, according to the wavelength division multiplex optical transmission apparatus 1 in the first modification of the sixth embodiment, the controls of the voltages applied to the ceramic devices 155 of the excitation light output level adjusting sections 15A, 15B vary the focus positions (refractive indexes) of the excitation light signals λ2, λ4 on the ball lenses 154. Therefore, it is possible to vary the optical output levels of the excitation light signals λ2, λ4 in an analog manner, and adjust the optical output levels of the excitation light signals λ2, λ4 more precisely than would be in the above-mentioned sixth embodiment.

(F2) Description of Second Modification of Sixth Embodiment

Figure 46:
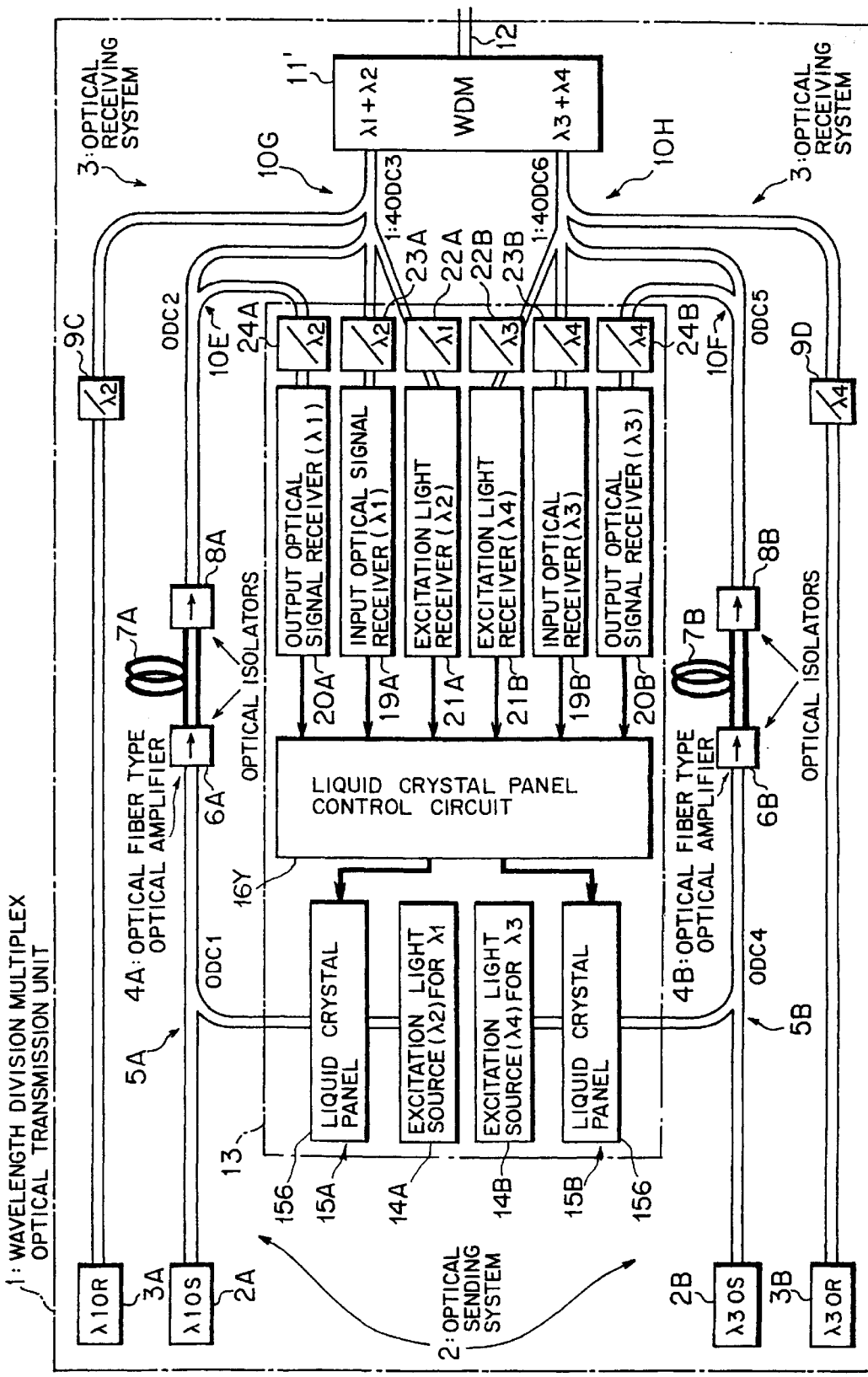
FIG. 46 is a block diagram showing a configuration of a wavelength division multiplex optical transmission apparatus serving as a second modification of the sixth embodiment.

FIG. 46 is a block diagram showing a configuration of a wavelength division multiplex optical transmission apparatus 1 serving as a second modification of the sixth embodiment. The transmission apparatus 1 shown in FIG. 46 is different from that shown in FIG. 42 in that excitation light output level adjusting sections 15A, 15B are respectively configured by using the liquid crystal panels 156 described in the second modification (see FIG. 12) of the first embodiment, and an excitation light output level control circuit (liquid crystal panel control circuit) 16Y is provided instead of the excitation light output level control circuit 16W.

Here, the above liquid crystal panel control circuit 16Y basically has the same configuration as that shown in FIG. 43. However, since the excitation light output level adjusting sections 15A, 15B are respectively configured by using the liquid crystal panels 156, an excitation light adjusting signal generating section 165 includes a liquid crystal panel applied voltage decision section 166C, liquid crystal panel applied voltage control sections 167C, 168C, and a liquid crystal panel applied voltage database 169C identical with those shown in FIG. 13.

That is, in the wavelength division multiplex optical transmission apparatus 1 in the second modification of the sixth embodiment, optical output levels of excitation light signals λ2, λ4 generated in excitation light sources 14A, 14B are respectively adjusted by the liquid crystal panels 156 in an optical output level control section 13 of the type adjusting the optical output levels of the excitation light signals λ2, λ4 according the optimal optical output levels P obtained depending upon the above-mentioned actual transmission losses $P_{LOSS}$, correcting the above optimal optical output levels P according to optical levels of send optical signals λ1, λ3 after actual optical amplification, and monitoring return optical signals of the excitation light signals λ2, λ4 to detect line disconnection.

Accordingly, in Step F11 described above referring to FIG. 44, excitation light output level adjusting processing of the transmission apparatus 1 in the modification is identical with the processing from Steps A14 to A16 described above referring to FIG. 14. That is, the control circuit 16Y first finds the actual transmission losses $P_{LOSS}$ of the send optical signals λ1, λ3 depending upon the various types of above-mentioned optical levels input through an optical level input section 161 and receive optical signals λ1, λ3 received in input optical signal receivers 19A, 19B, and finds the optimal optical output levels P depending upon the actual transmission losses $P_{LOSS}$ to determine optimal excitation light levels according to the obtained optimal optical output levels P (see Steps F1 to F7 in FIG. 44).

Then, if neither of the excitation light signals λ2, λ4 has been received in excitation light receivers 21A, 21B (if a decision of NO is given in Step F8 in FIG. 44), the optimal excitation light levels determined as described above are passed to the excitation light adjusting signal generating section 165 (see Step F11 in FIG. 44). Subsequently, as in the second modification of the first embodiment, the excitation light adjusting signal generating section 165 finds applied voltages to the liquid crystal panels 156, corresponding to the optimal excitation light levels input from the optimal excitation light level decision section 163 to apply the applied voltages to the respective liquid crystal panels 156.

This varies light transmittances of the liquid crystal panels to adjust the optical output levels of the excitation light signals λ2, λ4 from the excitation light sources 14A, 14B to the above optimal excitation light levels (see Steps A14 to A16 in FIG. 14).

As stated above, in the wavelength division multiplex optical transmission apparatus 1 in the second modification of the sixth embodiment, the variations in voltages applied to the liquid crystal panels 156 of the excitation light output level adjusting sections 15A, 15B can adjust the optical output levels of the excitation light signals λ2, λ4. Therefore, it is possible to vary the optical output levels of the excitation light signals λ2, λ4 in an analog manner, and adjust the optical output levels of the excitation light signals λ2, λ4 more precisely in a simpler configuration than would be in the above-mentioned sixth embodiment.

(F3) Description of Third Modification of Sixth Embodiment

Figure 47:
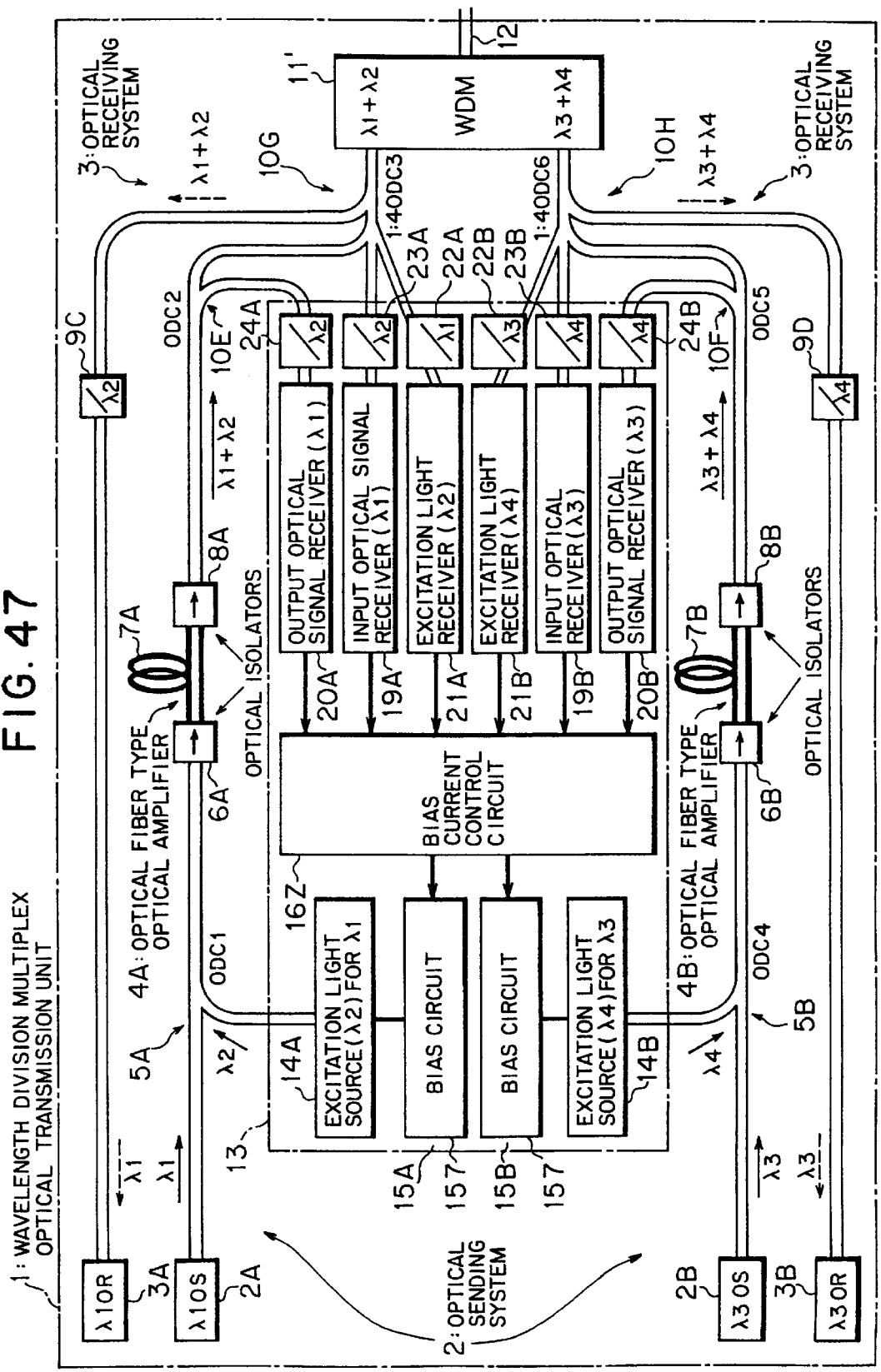
FIG. 47 is a block diagram showing a configuration of a wavelength division multiplex optical transmission apparatus serving as a third modification of the sixth embodiment.
Figure 48:
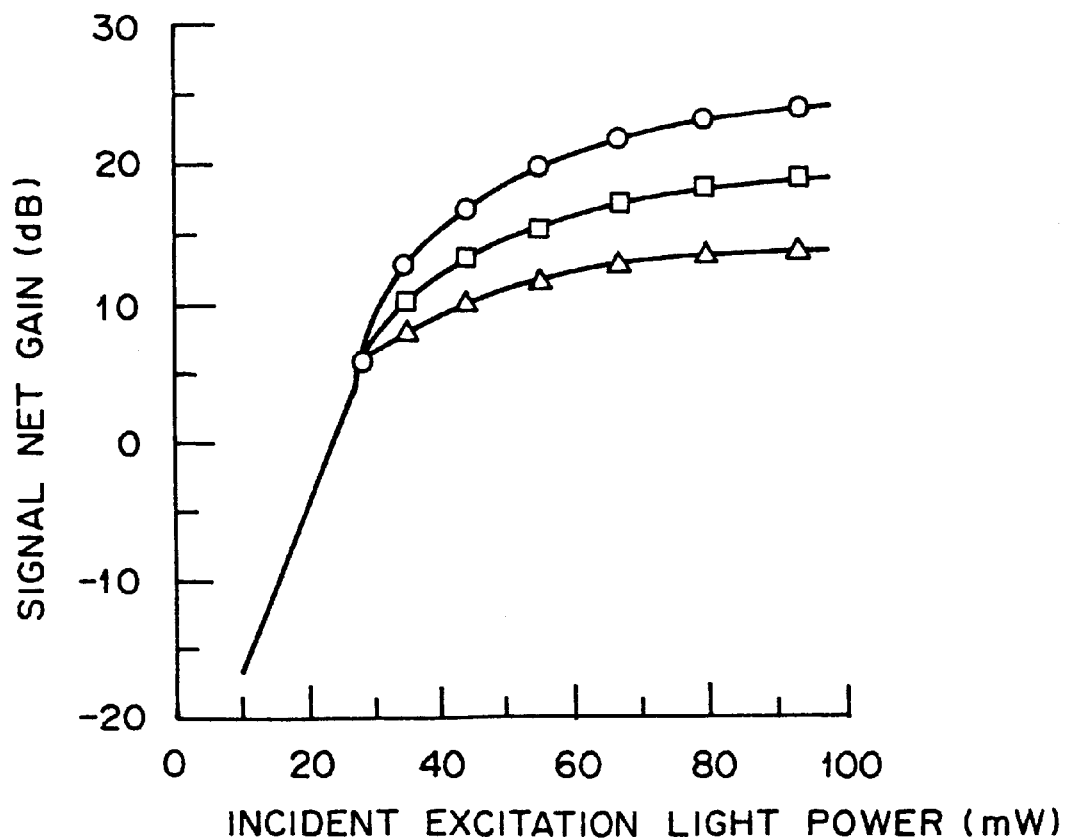
FIG. 48 is a diagram showing one illustrative correlation between an amplification factor (signal net gain) and incident excitation light power at a time of optical amplification.

FIG. 47 is a block diagram showing a configuration of a wavelength division multiplex optical transmission apparatus 1 serving as a third modification of the sixth embodiment. The transmission apparatus 1 shown in FIG. 47 is different from that shown in FIG. 42 in that excitation light output level adjusting sections 15A, 15B are respectively configured by using the bias circuits 157 described in the third modification (see FIG. 15) of the first embodiment, and an excitation light output level control circuit (bias current control circuit) 16Z is provided instead of the excitation light output level control circuit 16W.

Here, the above bias current control circuit 16Z basically has the same configuration as that shown in FIG. 43. However, since the excitation light output level adjusting sections 15A, 15B are respectively configured by using the bias circuits 157, an excitation light adjusting signal generating section 165 includes a bias current decision section 166D, bias circuit control sections 167D, 168D, and a bias current database 169D identical with those shown in FIG. 16.

That is, in the wavelength division multiplex optical transmission apparatus 1 in the third modification of the sixth embodiment, optical output levels of excitation light signals λ2, λ4 generated in excitation light sources 14A, 14B are respectively adjusted by the bias circuits 157 in an optical output level control section 13 of the type adjusting the optical output levels of the excitation light signals λ2, λ4 according the optimal optical output levels P obtained depending upon the above-mentioned actual transmission losses $P_{LOSS}$, correcting the above optimal optical output levels P according to optical levels of send optical signals λ1, λ3 after actual optical amplification, and monitoring return optical signals of the excitation light signals λ2, λ4 to detect line disconnection.

Accordingly, in Step F11 described above referring to FIG. 44, excitation light output level adjusting processing of the transmission apparatus 1 in the modification is identical with the processing from Steps A17 to A19 described above referring to FIG. 17. That is, the control circuit 16Z first finds the actual transmission losses $P_{LOSS}$ of the send optical signals λ1, λ3 depending upon the various types of above-mentioned optical levels input through an optical level input section 161, and receive optical signals λ1, λ3 received in input optical signal receivers 19A, 19B, and finds the optimal optical output levels P depending upon the actual transmission losses $P_{LOSS}$ to determine optimal excitation light levels according to the obtained optimal optical output levels P (see Steps F1 to F7 in FIG. 44).

Then, if neither of the excitation light signals λ2, λ4 has been received in excitation light receivers 21A, 21B (see NO route in Step F8 in FIG. 44), the optimal excitation light levels determined as described above are passed to the excitation light adjusting signal generating section 165 (see Step F11 in FIG. 44). Subsequently, as in the third modification of the first embodiment, the excitation light adjusting signal generating section 165 finds values of bias currents applied to the bias circuits 157, corresponding to the optimal excitation light levels input from the optimal excitation light level decision section 163 to feed the bias currents to the respective bias circuits 157.

This varies amounts of bias currents from the bias circuits 157 to the respective excitation light sources 14A, 14B to adjust the optical output levels of the respective excitation light signals $\lambda 2$, $\lambda 4$ generated in the excitation light sources 14A, 14B to the above optimal excitation light levels (see Steps A17 to A19 in FIG. 17).

As described above, in the wavelength division multiplex optical transmission apparatus 1 in the third modification of the sixth embodiment, the excitation light output level adjusting sections 15A, 15B are respectively configured as the bias circuits 157 which can vary the amounts of currents fed to the excitation light sources 14A, 14B. Therefore, it is possible to vary the optical output levels of the excitation light signals $\lambda 2$, $\lambda 4$ generated in the excitation light sources 14A, 14B directly and in an analog manner, and adjust the optical output levels of the excitation light signals $\lambda 2$, $\lambda 4$ more accurately and more precisely than would be in the above-mentioned sixth embodiment.

(G) Others

Moreover, though the above embodiments have been described with reference to only partial combinations of the following types of functions of controlling the optical output levels of the send optical signals $\lambda 1$, $\lambda 3$, it will be appreciated that all of the combinations can be realized, provided that either the item (1) or the item (2) serves as the standard for all the combinations [Type (1)+Type (3)=Third Embodiment, Type (2)+Type (3)+Type (4)=Sixth Embodiment, and so forth].

Type (1): Function of finding the theoretical optimal optical output levels P depending upon the input parameter information to control the optical output levels of the excitation light signals $\lambda 2$, $\lambda 4$ according to the optimal optical output levels P Type (2): Function of finding the theoretical optimal optical output levels P depending upon the actual transmission losses $P_{LOSS}$ with consideration given to the state (loss) of the optical transmission line 12 to control the optical output levels of the excitation light signals $\lambda 2$, $\lambda 4$ according to the optimal optical output levels P Type (3): Function of correcting the optimal optical output levels P according to the actual optical levels of the send optical signals $\lambda 1$, $\lambda 3$ after optical amplification Type (4): Function of detecting the disconnection state of the optical transmission line 12 by monitoring receive of the return optical signals of the excitation light signals $\lambda 2$, $\lambda 4$ Further, in the above-mentioned embodiments and modifications, illustrative descriptions have been given of the excitation light output level adjusting sections 15A, 15A including [1] the polarization sections 151-i and the optical switches 151, 152, [2] the ball lenses 154 and the ceramic devices 155, [3] the liquid crystal panels 156, or [4] the bias circuits 157. However, it is to be noted that the present invention should not be limited to this, and any circuit, device, or mechanism may be employed as long as it can vary the optical output levels of the excitation light signals $\lambda 2$, $\lambda 4$.

Besides, in the above-mentioned embodiments and modifications, descriptions have been given of a case where the present invention is applied to the transmission apparatus 1 of the type using the erbium-doped fiber type optical amplifiers 4A, 4B to perform the optical amplification of the send optical signals $\lambda 1$, $\lambda 3$ by the excitation light signals $\lambda 2$, $\lambda 4$. However, it must be noted that the present invention should not be limited to this, and may be applied to a transmission apparatus employing another optical amplification method.

Additionally, in the above-mentioned embodiments and modifications, the WDM coupler 11 (or the WDM coupler 11') is used to share the wavelength division multiplexing section and the wavelength division demultiplexing section between the optical sending system 2 and the optical receiving system 3. However, it will be appreciated that the wavelength division multiplexing section and the wavelength division demultiplexing section may be provided for each of the optical sending system 2 and the optical receiving system 3.

In addition, in the above-mentioned embodiments and modifications, the send optical signal for the wavelength division multiplex optical transmission has the two wavelengths $\lambda 1$ and $\lambda 3$. However, it is to be understood that the present invention should not be limited to this, and may be applied to wavelength division multiplex optical transmission for three or more wavelengths.

Further, it will be appreciated that the present invention should not be limited to the above-mentioned embodiments, and changes and variations may be made without departing from the spirit or scope of the following claims.

What is claimed is:

1. A wavelength division multiplex optical transmission apparatus in which a plurality of optical signals having different wavelengths are processed by wavelength division multiplexing, and are transmitted through an optical transmission line, the apparatus comprising:

an optical sending system having a plurality of optical sending sections to generate and transmit the optical signals having the different wavelengths, a plurality of optical amplifying sections to amplify the optical signals with the wavelengths from the optical sending sections, and a wavelength division multiplexing section to process by the wavelength division multiplexing and output to the optical transmission line the optical signals amplified in the optical amplifying sections;

an optical receiving system having a wavelength division demultiplexing section to demultiplex the wavelength division multiplexed optical signals transmitted through the optical transmission line into the optical signals with the wavelengths, and a plurality of optical receiving sections to receive the optical signals demultiplexed in the wavelength division demultiplexing section; and an optical output level control section to control, for the wavelengths, optical output levels of the optical signals output to the optical transmission line through the wavelength division multiplexing section by individually varying amplification factors of the optical amplifying sections in the optical sending system according to transmission distances of the optical signals with the wavelengths.

2. A wavelength division multiplex optical transmission apparatus in which a plurality of optical signals having different wavelengths are processed by wavelength division multiplexing, and are transmitted through an optical transmission line, the apparatus comprising:

an optical sending system having a plurality of optical sending sections to generate and transmit the optical signals having the different wavelengths, a plurality of optical amplifying sections to amplify the optical signals with the wavelengths from the optical sending sections, and a wavelength division multiplexing section to process by the wavelength division multiplexing and output to the optical transmission line the optical signals amplified in the optical amplifying sections;

an optical receiving system having a wavelength division demultiplexing section to demultiplex the wavelength division multiplexed optical signals transmitted through the optical transmission line into the optical signals with the wavelengths, and a plurality of optical receiving sections to receive the optical signals demultiplexed in the wavelength division demultiplexing section; and an optical output level control section to control, for the wavelengths, optical output levels of the optical signals output to the optical transmission line through the wavelength division multiplexing section by individually varying amplification factors of the optical amplifying sections in the optical sending system;

wherein the optical output level control section comprises:

a plurality of excitation light sources to generate excitation light signals for varying the amplification factors in the optical amplifying sections;

a plurality of excitation light output level adjusting sections which can adjust optical output levels of the excitation light signals generated in the excitation light sources; and an excitation light output level operation control section to find optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals.

3. A wavelength division multiplex optical transmission apparatus according to claim 2, wherein the excitation light output level operation control section comprises:

a parameter input section to take as inputs predetermined parameter information about the optical transmission line, containing at least information about the transmission distances of the optical signals with the wavelengths, to be output to the optical transmission line;

an optimal optical output level operation section to find by predetermined arithmetic operations optimal optical output levels of the optical signals according to the transmission distances of the optical signals with the wavelengths depending upon the parameter information input through the parameter input section; and an excitation light adjusting signal generating section to generate excitation light adjusting signals for adjusting the optical output levels of the excitation light signals depending upon the optimal optical output levels obtained by the optimal optical output level operation section.

4. A wavelength division multiplex optical transmission apparatus according to claim 3, wherein the excitation light output level adjusting sections each comprise a polarization section which can vary a polarization factor of the excitation optical signal from the excitation light source, and can adjust the polarization factor of the excitation optical signal by varying a polarization factor of the polarization section, and the excitation light adjusting signal generating section of the excitation light output level operation control section being provided to generate polarization factor adjusting signals for adjusting the polarization factors of the polarization sections as the excitation light adjusting signals for the excitation light output level adjusting sections.

5. A wavelength division multiplex optical transmission apparatus according to claim 3, wherein the excitation light output level adjusting sections each comprise a lens which can vary a refractive index of the excitation light signal according to an incident position of the excitation light signal from the excitation light source, and can vary the incident position of the excitation light signal on the lens to vary the refractive index of the excitation light signal so as to vary the optical output level of the excitation light signal, and the excitation light adjusting signal generating section of the excitation light output level operation control section being provided to generate lens incident position adjusting signals for adjusting the incident positions of the excitation light signals on the lenses as the excitation light adjusting signals for the excitation light output level adjusting sections.

6. A wavelength division multiplex optical transmission apparatus according to claim 3, wherein the excitation light output level adjusting sections each comprise a liquid crystal section which can vary a transmission factor of the excitation light signal from the excitation light source according to an applied voltage, and can vary the applied voltage to the liquid crystal section so as to vary the optical output level of the excitation light signal, and the excitation light adjusting signal generating section of the excitation light output level operation control section being provided to generate applied voltage adjusting signals for adjusting the applied voltages to the liquid crystal sections as the excitation light adjusting signals for the excitation light output level adjusting sections.

7. A wavelength division multiplex optical transmission apparatus according to claim 3, wherein the excitation light output level adjusting sections each comprise a bias circuit which can vary a level of the excitation light signal generated in the excitation light source according to amounts of fed bias current, and can vary the amounts of bias current to the bias circuit so as to vary the optical output level of the excitation light signal, and the excitation light adjusting signal generating section of the excitation light output level operation control section being provided to generate bias current adjusting signals for adjusting the amounts of bias currents to the bias circuits as the excitation light adjusting signals for the excitation light output level adjusting sections.

8. A wavelength division multiplex optical transmission apparatus in which a plurality of optical signals having different wavelengths are processed by wavelength division multiplexing, and are transmitted through an optical transmission line, the apparatus comprising:

an optical sending system having a plurality of optical sending sections to generate and transmit the optical signals having the different wavelengths, a plurality of optical amplifying sections to amplify the optical signals with the wavelengths from the optical sending sections, and a wavelength division multiplexing section to process by the wavelength division multiplexing and output to the optical transmission line the optical signals amplified in the optical amplifying sections;

an optical receiving system having a wavelength division demultiplexing section to demultiplex the wavelength division multiplexed optical signals transmitted through the optical transmission line into the optical signals with the wavelengths, and a plurality of optical receiving sections to receive the optical signals demultiplexed in the wavelength division demultiplexing section; and an optical output level control section to control, for the wavelengths, optical output levels of the optical signals output to the optical transmission line through the wavelength division multiplexing section by individually varying amplification factors of the optical amplifying sections in the optical sending system;

wherein the optical output level control section comprises:

a plurality of excitation light sources to generate excitation light signals for varying the amplification factors in the optical amplifying sections;

a plurality of excitation light output level adjusting sections which can adjust optical output levels of the excitation light signals generated in the excitation light sources;

an excitation light output level operation control section to find optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals; and a plurality of input signal light receiving sections to respectively receive the optical signals with the wavelengths, input through the optical transmission line and demultiplexed in the wavelength division demultiplexing section, and the excitation light output level operation control section comprising:

a transmission loss operation section to find by predetermined arithmetic operations transmission loss information of the optical signals actually transmitted through the optical transmission line for a predetermined transmission distance depending upon the optical signals with the wavelengths, received in the input signal light receiving sections;

an optimal optical output level operation section to find by predetermined arithmetic operations optimal optical output levels of the optical signals with the wavelengths depending upon the transmission loss information obtained by the transmission loss operation section; and an excitation light adjusting signal generating section to generate excitation light adjusting signals for adjusting the optical output levels of the excitation light signals depending upon the optimal excitation light levels obtained by the optimal optical output level operation section.

9. A wavelength division multiplex optical transmission apparatus according to claim 8, wherein the excitation light output level adjusting sections each comprise a polarization section which can vary a polarization factor of the excitation optical signal from the excitation light source, and can adjust the polarization factor of the excitation optical signal by varying a polarization factor of the polarization section, and the excitation light adjusting signal generating section of the excitation light output level operation control section being provided to generate polarization factor adjusting signals for adjusting the polarization factors of the polarization sections as the excitation light adjusting signals for the excitation light output level adjusting sections.

10. A wavelength division multiplex optical transmission apparatus according to claim 8, wherein the excitation light output level adjusting sections each comprise a lens which can vary a refractive index of the excitation light signal according to an incident position of the excitation light signal from the excitation light source, and can vary the incident position of the excitation light signal on the lens to vary the refractive index of the excitation light signal so as to vary the optical output level of the excitation light signal, and the excitation light adjusting signal generating section of the excitation light output level operation control section being provided to generate lens incident position adjusting signals for adjusting the incident positions of the excitation light signals on the lenses as the excitation light adjusting signals for the excitation light output level adjusting sections.

11. A wavelength division multiplex optical transmission apparatus according to claim 8, wherein the excitation light output level adjusting sections each comprise a liquid crystal section which can vary a transmission factor of the excitation light signal from the excitation light source according to an applied voltage, and can vary the applied voltage to the liquid crystal section so as to vary the optical output level of the excitation light signal, and the excitation light adjusting signal generating section of the excitation light output level operation control section being provided to generate applied voltage adjusting signals for adjusting the applied voltages to the liquid crystal sections as the excitation light adjusting signals for the excitation light output level adjusting sections.

12. A wavelength division multiplex optical transmission apparatus according to claim 8, wherein the excitation light output level adjusting sections each comprise a bias circuit which can vary a level of the excitation light signal generated in the excitation light source according to amounts of fed bias current, and can vary the amounts of bias current to the bias circuit so as to vary the optical output level of the excitation light signal, and the excitation light adjusting signal generating section of the excitation light output level operation control section being provided to generate bias current adjusting signals for adjusting the amounts of bias currents to the bias circuits as the excitation light adjusting signals for the excitation light output level adjusting sections.

13. A wavelength division multiplex optical transmission apparatus in which a plurality of optical signals having different wavelengths are processed by wavelength division multiplexing, and are transmitted through an optical transmission line, the apparatus comprising:

an optical sending system having a plurality of optical sending sections to generate and transmit the optical signals having the different wavelengths, a plurality of optical amplifying sections to amplify the optical signals with the wavelengths from the optical sending sections, and a wavelength division multiplexing section to process by the wavelength division multiplexing and output to the optical transmission line the optical signals amplified in the optical amplifying sections;

an optical receiving system having a wavelength division demultiplexing section to demultiplex the wavelength division multiplexed optical signals transmitted through the optical transmission line into the optical signals with the wavelengths, and a plurality of optical receiving sections to receive the optical signals demultiplexed in the wavelength division demultiplexing section; and an optical output level control section to control, for the wavelengths, optical output levels of the optical signals output to the optical transmission line through the wavelength division multiplexing section by individually varying amplification factors of the optical amplifying sections in the optical sending system;

wherein the optical output level control section comprises:

a plurality of excitation light sources to generate excitation light signals for varying the amplification factors in the optical amplifying sections;

a plurality of excitation light output level adjusting sections which can adjust optical output levels of the excitation light signals generated in the excitation light sources;

an excitation light output level operation control section to find by arithmetic operations optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals; and a plurality of output signal light receiving sections to respectively receive parts of the optical signals with the wavelengths, to be output to the optical transmission line through the wavelength division multiplexing section after amplification in the optical amplifying sections, and the excitation light output level operation control section comprising:

a transmission loss operation section to find by predetermined arithmetic operations transmission loss information of the optical signals actually transmitted through the optical transmission line for a predetermined transmission distance depending upon the optical signals with the wavelengths, received in the input signal light receiving sections;

an optimal optical output level operation section to find by predetermined arithmetic operations optimal optical output levels of the optical signals with the wavelengths depending upon the transmission loss information obtained by the transmission loss operation section;

an excitation light adjusting signal generating section to generate excitation light adjusting signals for the excitation light output level sections depending upon the optimal excitation light levels obtained by the optimal optical output level operation section;

a level comparing section to compare the optimal optical output levels with optical signal levels of the optical signals received in the output signal light receiving sections; and a level error correcting section to correct, if errors are caused between the respective levels as a result of comparison in the level comparing section, generation processing for the excitation light adjusting signals so as to minimize the errors.

14. A wavelength division multiplex optical transmission apparatus according to claim 13, wherein the excitation light output level adjusting sections each comprise a polarization section which can vary a polarization factor of the excitation optical signal from the excitation light source, and can adjust the polarization factor of the excitation optical signal by varying a polarization factor of the polarization section, and the excitation light adjusting signal generating section of the excitation light output level operation control section being provided to generate polarization factor adjusting signals for adjusting the polarization factors of the polarization sections as the excitation light adjusting signals for the excitation light output level adjusting sections.

15. A wavelength division multiplex optical transmission apparatus according to claim 13, wherein the excitation light output level adjusting sections each comprise a lens which can vary a refractive index of the excitation light signal according to an incident position of the excitation light signal from the excitation light source, and can vary the incident position of the excitation light signal on the lens to vary the refractive index of the excitation light signal so as to vary the optical output level of the excitation light signal, and the excitation light adjusting signal generating section of the excitation light output level operation control section being provided to generate lens incident position adjusting signals for adjusting the incident positions of the excitation light signals on the lenses as the excitation light adjusting signals for the excitation light output level adjusting sections.

16. A wavelength division multiplex optical transmission apparatus according to claim 13, wherein the excitation light output level adjusting sections each comprise a liquid crystal section which can vary a transmission factor of the excitation light signal from the excitation light source according to an applied voltage, and can vary the applied voltage to the liquid crystal section so as to vary the optical output level of the excitation light signal, and the excitation light adjusting signal generating section of the excitation light output level operation control section being provided to generate applied voltage adjusting signals for adjusting the applied voltages to the liquid crystal sections as the excitation light adjusting signals for the excitation light output level adjusting sections.

17. A wavelength division multiplex optical transmission apparatus according to claim 13, wherein the excitation light output level adjusting sections each comprise a bias circuit which can vary a level of the excitation light signal generated in the excitation light source according to amounts of fed bias current, and can vary the amounts of bias current to the bias circuit so as to vary the optical output level of the excitation light signal, and the excitation light adjusting signal generating section of the excitation light output level operation control section being provided to generate bias current adjusting signals for adjusting the amounts of bias currents to the bias circuits as the excitation light adjusting signals for the excitation light output level adjusting sections.

18. A wavelength division multiplex optical transmission apparatus in which a plurality of optical signals having different wavelengths are processed by wavelength division multiplexing, and are transmitted through an optical transmission line, the apparatus comprising:

an optical sending system having a plurality of optical sending sections to generate and transmit the optical signals having the different wavelengths, a plurality of optical amplifying sections to amplify the optical signals with the wavelengths from the optical sending sections, and a wavelength division multiplexing section to process by the wavelength division multiplexing and output to the optical transmission line the optical signals amplified in the optical amplifying sections;

an optical receiving system having a wavelength division demultiplexing section to demultiplex the wavelength division multiplexed optical signals transmitted through the optical transmission line into the optical signals with the wavelengths, and a plurality of optical receiving sections to receive the optical signals demultiplexed in the wavelength division demultiplexing section; and an optical output level control section to control, for the wavelengths, optical output levels of the optical signals output to the optical transmission line through the wavelength division multiplexing section by individually varying amplification factors of the optical amplifying sections in the optical sending system;

wherein the optical output level control section comprises:

a plurality of excitation light sources to generate excitation light signals for varying the amplification factors in the optical amplifying sections;

a plurality of excitation light output level adjusting sections which can adjust optical output levels of the excitation light signals generated in the excitation light sources;

an excitation light output level operation control section to find by arithmetic operations optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals; and excitation light signal receiving sections which can receive the excitation light signals returning from the optical transmission line through the wavelength division demultiplexing section when the optical transmission line is in a disconnection state, the optical sending system being provided to output both the optical signals from the optical amplifying sections and the excitation light signals from the excitation light sources to the optical transmission line through the wavelength division multiplexing section, and the excitation light output level operation control section comprising:

a parameter input section to take as inputs predetermined parameter information about the optical transmission line, containing at least information about the transmission distances of the optical signals with the wavelengths, to be output to the optical signals with the wavelengths, to be output to the optical transmission line;

an optimal optical output level operation section to find by predetermined arithmetic operations optimal optical output levels of the optical signals according to the transmission distances of the optical signals with the wavelengths, generated in the optical sending sections depending upon the parameter information input through the parameter input section;

an excitation light adjusting signal generating section to generate excitation light adjusting signals for adjusting the optical output levels of the excitation light signals depending upon the optimal optical output levels obtained by the optimal optical output level operation section;

an excitation light adjusting signal generating section to generate excitation light adjusting signals for adjusting the optical output levels of the excitation light signals depending upon the optimal optical output levels obtained by the optimal optical output level operation section;

an excitation light reception decision section to decide whether or not the excitation light signals have been received in the excitation light signal receiving sections;

a disconnection state control section to decide that the optical transmission line is in the disconnection state when it is decided in the excitation light reception decision section that the excitation light signals have been received, and control generation processing for the excitation light adjusting signals so as to set the optical output levels of the excitation light signals to zeros; and an alarm generating section to give an alarm indicating that the optical transmission line is in the disconnection state when it is decided in the excitation light reception decision section that the excitation light signals have been received.

19. A wavelength division multiplex optical transmission apparatus according to claim 18, wherein the excitation light output level adjusting sections each comprise a polarization section which can vary a polarization factor of the excitation optical signal from the excitation light source, and can adjust the polarization factor of the excitation optical signal by varying a polarization factor of the polarization section, and the excitation light adjusting signal generating section of the excitation light output level operation control section being provided to generate polarization factor adjusting signals for adjusting the polarization factors of the polarization sections as the excitation light adjusting signals for the excitation light output level adjusting sections.

20. A wavelength division multiplex optical transmission apparatus according to claim 18, wherein the excitation light output level adjusting sections each comprise a lens which can vary a refractive index of the excitation light signal according to an incident position of the excitation light signal from the excitation light source, and can vary the incident position of the excitation light signal on the lens to vary the refractive index of the excitation light signal so as to vary the optical output level of the excitation light signal, and the excitation light adjusting signal generating section of the excitation light output level operation control section being provided to generate lens incident position adjusting signals for adjusting the incident positions of the excitation light signals on the lenses as the excitation light adjusting signals for the excitation light output level adjusting sections.

21. A wavelength division multiplex optical transmission apparatus according to claim 18, wherein the excitation light output level adjusting sections each comprise a liquid crystal section which can vary a transmission factor of the excitation light signal from the excitation light source according to an applied voltage, and can vary the applied voltage to the liquid crystal section so as to vary the optical output level of the excitation light signal, and the excitation light adjusting signal generating section of the excitation light output level operation control section being provided to generate applied voltage adjusting signals for adjusting the applied voltages to the liquid crystal sections as the excitation light adjusting signals for the excitation light output level adjusting sections.

22. A wavelength division multiplex optical transmission apparatus according to claim 18, wherein the excitation light output level adjusting sections each comprise a bias circuit which can vary a level of the excitation light signal generated in the excitation light source according to amounts of fed bias current, and can vary the amounts of bias current to the bias circuit so as to vary the optical output level of the excitation light signal, and the excitation light adjusting signal generating section of the excitation light output level operation control section being provided to generate bias current adjusting signals for adjusting the amounts of bias currents to the bias circuits as the excitation light adjusting signals for the excitation light output level adjusting sections.

23. A wavelength division multiplex optical transmission apparatus in which a plurality of optical signals having different wavelengths are processed by wavelength division multiplexing, and are transmitted through an optical transmission line, the apparatus comprising:

an optical sending system having a plurality of optical sending sections to generate and transmit the optical signals having the different wavelengths, a plurality of optical amplifying sections to amplify the optical signals with the wavelengths from the optical sending sections, and a wavelength division multiplexing section to process by the wavelength division multiplexing and output to the optical transmission line the optical signals amplified in the optical amplifying sections;

an optical receiving system having a wavelength division demultiplexing section to demultiplex the wavelength division multiplexed optical signals transmitted through the optical transmission line into the optical signals with the wavelengths, and a plurality of optical receiving sections to receive the optical signals demultiplexed in the wavelength division demultiplexing section; and an optical output level control section to control, for the wavelengths, optical output levels of the optical signals output to the optical transmission line through the wavelength division multiplexing section by individually varying amplification factors of the optical amplifying sections in the optical sending system;

wherein the optical output level control section comprises:

a plurality of excitation light sources to generate excitation light signals for varying the amplification factors in the optical amplifying sections;

a plurality of excitation light output level adjusting sections which can adjust optical output levels of the excitation light signals generated in the excitation light sources;

an excitation light output level operation control section to find by arithmetic operations optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals;

a plurality of input signal light receiving sections to respectively receive the optical signals with the wavelengths, input through the optical transmission line and demultiplexed in the wavelength division demultiplexing section; and excitation light signal receiving sections which can receive the excitation light signals returning from the optical transmission line through the wavelength division demultiplexing section when the optical transmission line is in a disconnection state, the optical sending system being provided to output both the optical signals from the optical amplifying sections and the excitation light signals from the excitation light sources to the optical transmission line through the wavelength division multiplexing section, and the excitation light output level operation control section comprising:

a transmission loss operation section to find by predetermined arithmetic operations transmission loss information of the optical signals actually transmitted through the optical transmission line for a predetermined transmission distance depending upon the optical signals with the wavelengths, received in the input signal light receiving sections;

an optimal optical output level operation section to find by predetermined arithmetic operations optimal optical output levels of the optical signals with the wavelengths depending upon the transmission loss information obtained by the transmission loss operation section; and an excitation light adjusting signal generating section to generate excitation light adjusting signals for adjusting the optical output levels of the excitation light signals depending upon the optimal excitation light levels obtained by the optimal optical output level operation section;

an excitation light adjusting signal generating section to generate excitation light adjusting signals for adjusting the optical output levels of the excitation light signals depending upon the optimal optical output levels obtained by the optimal optical output level operation section;

an excitation light reception decision section to decide whether or not the excitation light signals have been received in the excitation light signal receiving sections;

a disconnection state control section to decide that the optical transmission line is in the disconnection state when it is decided in the excitation light reception decision section that the excitation light signals have been received, and control generation processing for the excitation light adjusting signals so as to set the optical output levels of the excitation light signals to zeros; and an alarm generating section to give an alarm indicating that the optical transmission line is in the disconnection state when it is decided in the excitation light reception decision section that the excitation light signals have been received.

24. A wavelength division multiplex optical transmission apparatus according to claim 23, wherein the excitation light output level adjusting sections each comprise a polarization section which can vary a polarization factor of the excitation optical signal from the excitation light source, and can adjust the polarization factor of the excitation optical signal by varying a polarization factor of the polarization section, and the excitation light adjusting signal generating section of the excitation light output level operation control section being provided to generate polarization factor adjusting signals for adjusting the polarization factors of the polarization sections as the excitation light adjusting signals for the excitation light output level adjusting sections.

25. A wavelength division multiplex optical transmission apparatus according to claim 23, wherein the excitation light output level adjusting sections each comprise a lens which can vary a refractive index of the excitation light signal according to an incident position of the excitation light signal from the excitation light source, and can vary the incident position of the excitation light signal on the lens to vary the refractive index of the excitation light signal so as to vary the optical output level of the excitation light signal, and the excitation light adjusting signal generating section of the excitation light output level operation control section being provided to generate lens incident position adjusting signals for adjusting the incident positions of the excitation light signals on the lenses as the excitation light adjusting signals for the excitation light output level adjusting sections.

26. A wavelength division multiplex optical transmission apparatus according to claim 23, wherein the excitation light output level adjusting sections each comprise a liquid crystal section which can vary a transmission factor of the excitation light signal from the excitation light source according to an applied voltage, and can vary the applied voltage to the liquid crystal section so as to vary the optical output level of the excitation light signal, and the excitation light adjusting signal generating section of the excitation light output level operation control section being provided to generate applied voltage adjusting signals for adjusting the applied voltages to the liquid crystal sections as the excitation light adjusting signals for the excitation light output level adjusting sections.

27. A wavelength division multiplex optical transmission apparatus according to claim 23, wherein the excitation light output level adjusting sections each comprise a bias circuit which can vary a level of the excitation light signal generated in the excitation light source according to amounts of fed bias current, and can vary the amounts of bias current to the bias circuit so as to vary the optical output level of the excitation light signal, and the excitation light adjusting signal generating section of the excitation light output level operation control section being provided to generate bias current adjusting signals for adjusting the amounts of bias currents to the bias circuits as the excitation light adjusting signals for the excitation light output level adjusting sections.

28. A wavelength division multiplex optical transmission apparatus in which a plurality of optical signals having different wavelengths are processed by wavelength division multiplexing, and are transmitted through an optical transmission line, the apparatus comprising:

an optical sending system having a plurality of optical sending sections to generate and transmit the optical signals having the different wavelengths, a plurality of optical amplifying sections to amplify the optical signals with the wavelengths from the optical sending sections, and a wavelength division multiplexing section to process by the wavelength division multiplexing and output to the optical transmission line the optical signals amplified in the optical amplifying sections;

an optical receiving system having a wavelength division demultiplexing section to demultiplex the wavelength division multiplexed optical signals transmitted through the optical transmission line into the optical signals with the wavelengths, and a plurality of optical receiving sections to receive the optical signals demultiplexed in the wavelength division demultiplexing section; and an optical output level control section to control, for the wavelengths, optical output levels of the optical signals output to the optical transmission line through the wavelength division multiplexing section by individually varying amplification factors of the optical amplifying sections in the optical sending system;

wherein the optical output level control section comprises:

a plurality of excitation light sources to generate excitation light signals for varying the amplification factors in the optical amplifying sections;

a plurality of excitation light output level adjusting sections which can adjust optical output levels of the excitation light signals generated in the excitation light sources;

an excitation light output level operation control section to find by arithmetic operations optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals;

a plurality of input signal light receiving sections to respectively receive the optical signals with the wavelengths, input through the optical transmission line and demultiplexed in the wavelength division demultiplexing section; and a plurality of output signal light receiving sections to respectively receive parts of the optical signals with the wavelengths, to be output to the optical transmission line through the wavelength division multiplexing section after amplification in the optical amplifying sections;

excitation light signal receiving sections which can receive the excitation light signals returning from the optical transmission line through the wavelength division demultiplexing section when the optical transmission line is in a disconnection state; and the optical sending system being provided to output both the optical signals from the optical amplifying sections and the excitation light signals from the excitation light sources to the optical transmission line through the wavelength division multiplexing section, and the excitation light output level operation control section comprising:

a transmission loss operation section to find by predetermined arithmetic operations transmission loss information of the optical signals actually transmitted through the optical transmission line for a predetermined transmission distance depending upon the optical signals with the wavelengths, received in the input signal light receiving sections;

an optimal optical output level operation section to find by predetermined arithmetic operations optimal optical output levels of the optical signals with the wavelengths depending upon the transmission loss information obtained by the transmission loss operation section;

an excitation light adjusting signal generating section to generate excitation light adjusting signals for adjusting the optical output levels of the excitation light signals depending upon the optimal excitation light levels obtained by the optimal optical output level operation section;

a level comparing section to compare the optimal optical output levels with optical signal levels of the optical signals received in the output signal light receiving sections;

a level error correcting section to correct, if errors caused between the levels as a result of comparison in the level comparing section, generation processing for the excitation light adjusting signals so as to minimize the errors;

an excitation light reception decision section to decide whether or not the excitation light signals have been received in the excitation light signal receiving sections;

a disconnection state control section to decide that the optical transmission line is in the disconnection state when it is decided in the excitation light reception decision section that the excitation light signals have been received, and control generation processing for the excitation light adjusting signals so as to set the optical output levels of the excitation light signals to zeros; and an alarm generating section to give an alarm indicating that the optical transmission line is in the disconnection state when it is decided in the excitation light reception decision section that the excitation light signals have been received.

29. A wavelength division multiplex optical transmission apparatus according to claim 28, wherein the excitation light output level adjusting sections each comprise a polarization section which can vary a polarization factor of the excitation optical signal from the excitation light source, and can adjust the polarization factor of the excitation optical signal by varying a polarization factor of the polarization section, and the excitation light adjusting signal generating section of the excitation light output level operation control section being provided to generate polarization factor adjusting signals for adjusting the polarization factors of the polarization sections as the excitation light adjusting signals for the excitation light output level adjusting sections.

30. A wavelength division multiplex optical transmission apparatus according to claim 28, wherein the excitation light output level adjusting sections each comprise a lens which can vary a refractive index of the excitation light signal according to an incident position of the excitation light signal from the excitation light source, and can vary the incident position of the excitation light signal on the lens to vary the refractive index of the excitation light signal so as to vary the optical output level of the excitation light signal, and the excitation light adjusting signal generating section of the excitation light output level operation control section being provided to generate lens incident position adjusting signals for adjusting the incident positions of the excitation light signals on the lenses as the excitation light adjusting signals for the excitation light output level adjusting sections.

31. A wavelength division multiplex optical transmission apparatus according to claim 28, wherein the excitation light output level adjusting sections each comprise a liquid crystal section which can vary a transmission factor of the excitation light signal from the excitation light source according to an applied voltage, and can vary the applied voltage to the liquid crystal section so as to vary the optical output level of the excitation light signal, and the excitation light adjusting signal generating section of the excitation light output level operation control section being provided to generate applied voltage adjusting signals for adjusting the applied voltages to the liquid crystal sections as the excitation light adjusting signals for the excitation light output level adjusting sections.

32. A wavelength division multiplex optical transmission apparatus according to claim 28, wherein the excitation light output level adjusting sections each comprise a bias circuit which can vary a level of the excitation light signal generated in the excitation light source according to amounts of fed bias current, and can vary the amounts of bias current to the bias circuit so as to vary the optical output level of the excitation light signal, and the excitation light adjusting signal generating section of the excitation light output level operation control section being provided to generate bias current adjusting signals for adjusting the amounts of bias currents to the bias circuits as the excitation light adjusting signals for the excitation light output level adjusting sections.

33. A wavelength division multiplex optical transmission apparatus in which a plurality of optical signals having different wavelengths are processed by wavelength division multiplexing, and are transmitted through an optical transmission line, the apparatus comprising:

an optical sending system having a plurality of optical sending sections to generate and transmit the optical signals having the different wavelengths, and a wavelength division multiplexing section to process by the wavelength division multiplexing and output to the optical transmission line the optical signals with the wavelengths from the optical sending sections; and an optical output level adjusting section to control, for the wavelengths, optical output levels of the optical signals with the wavelengths, sent tot the optical transmission line before the wavelength division multiplexing by the wavelength division multiplexing section in the optical sending system according to transmission distances of the optical signals with the wavelengths.

34. A wavelength division multiplex optical transmission apparatus according to claim 33, wherein the optical output level adjusting section comprises:

a plurality of optical amplifying sections interposed between the optical sending sections and the wavelength division multiplexing section to amplify the optical signals with the wavelengths from the optical sending sections; and an optical output level control section to control, for the wavelengths, optical output levels of the optical signals output to the optical transmission line through the wavelength division multiplexing section by individually varying amplification factors in the optical amplifying sections.

35. A wavelength division multiplex optical transmission apparatus in which a plurality of optical signals having different wavelengths are processed by wavelength division multiplexing, and are transmitted through an optical transmission line, the apparatus comprising:

an optical sending system having a plurality of optical sending sections to generate and transmit the optical signals having the different wavelengths, and a wavelength division multiplexing section to process by the wavelength division multiplexing and output to the optical transmission line the optical signals with the wavelengths from the optical sending sections; and an optical output level adjusting section to control, for the wavelengths, optical output levels of the optical signals with the wavelengths, sent to the optical transmission line before the wavelength division multiplexing by the wavelength division multiplexing section in the optical sending system; wherein the optical output level adjusting section comprises:

a plurality of optical amplifying sections interposed between the optical sending sections and the wavelength division multiplexing section to amplify the optical signals with the wavelengths from the optical sending sections;

an optical output level control section to control, for the wavelengths, optical output levels of the optical signals output to the optical transmission line through the wavelength division multiplexing section by individually varying amplification factors in the optical amplifying sections; wherein the optical output level control section comprises:

a plurality of excitation light sources to generate excitation light signals for varying the amplification factors in the optical amplifying sections;

a plurality of excitation light output level adjusting sections which can adjust optical output levels of the excitation light signals generated in the excitation light sources; and an excitation light output level operation control section to find optimal optical output levels of the optical signals according to transmission distances of the optical signals with the wavelengths, generated in the optical sending sections, and control the excitation light output level adjusting sections according to the optimal optical output levels to adjust the optical output levels of the excitation light signals.

36. A wavelength division multiplex optical transmission apparatus according to claim 35, wherein the excitation light output level operation control section comprises:

a parameter input section to take as inputs predetermined parameter information about the optical transmission line, containing at least information about the transmission distances of the optical signals with the wavelengths, to be output to the optical transmission line;

an optimal optical output level operation section to find by predetermined arithmetic operations optimal optical output levels of the optical signals according to the transmission distances of the optical signals with the wavelengths depending upon the parameter information input through the parameter input section; and an excitation light adjusting signal generating section to generate excitation light adjusting signals for adjusting the optical output levels of the excitation light signals depending upon the optimal optical output levels obtained by the optimal optical output level operation section.

37. A wavelength division multiplex optical transmission apparatus according to claim 36, wherein the excitation light output level adjusting sections each comprise a polarization section which can vary a polarization factor of the excitation optical signal from the excitation light source, and can adjust the polarization factor of the excitation optical signal by varying a polarization factor of the polarization section, and the excitation light adjusting signal generating section of the excitation light output level operation control section being provided to generate polarization factor adjusting signals for adjusting the polarization factors of the polarization sections as the excitation light adjusting signals for the excitation light output level adjusting sections.

38. A wavelength division multiplex optical transmission apparatus according to claim 36, wherein the excitation light output level adjusting sections each comprise a lens which can vary a refractive index of the excitation light signal according to an incident position of the excitation light signal from the excitation light source, and can vary the incident position of the excitation light signal on the lens to vary the refractive index of the excitation light signal so as to vary the optical output level of the excitation light signal, and the excitation light adjusting signal generating section of the excitation light output level operation control section being provided to generate lens incident position adjusting signals for adjusting the incident positions of the excitation light signals on the lenses as the excitation light adjusting signals for the excitation light output level adjusting sections.

39. A wavelength division multiplex optical transmission apparatus according to claim 36, wherein the excitation light output level adjusting sections each comprise a liquid crystal section which can vary a transmission factor of the excitation light signal from the excitation light source according to an applied voltage, and can vary the applied voltage to the liquid crystal section so as to vary the optical output level of the excitation light signal, and the excitation light adjusting signal generating section of the excitation light output level operation control section being provided to generate applied voltage adjusting signals for adjusting the applied voltages to the liquid crystal sections as the excitation light adjusting signals for the excitation light output level adjusting sections.

40. A wavelength division multiplex optical transmission apparatus according to claim 36, wherein the excitation light output level adjusting sections each comprise a bias circuit which can vary a level of the excitation light signal generated in the excitation light source according to amounts of fed bias current, and can vary the amounts of bias current to the bias circuit so as to vary the optical output level of the excitation light signal, and the excitation light adjusting signal generating section of the excitation light output level operation control section being provided to generate bias current adjusting signals for adjusting the amounts of bias currents to the bias circuits as the excitation light adjusting signals for the excitation light output level adjusting sections.

* * * * *